United States Patent [19]

Ishida et al.

[11] Patent Number: 5,832,141
[45] Date of Patent: Nov. 3, 1998

[54] IMAGE PROCESSING METHOD AND APPARATUS USING SEPARATE PROCESSING FOR PSEUDOHALF TONE AREA

[75] Inventors: Yoshihiro Ishida; Shinichiro Koga; Nobuyuki Shigeeda, all of Kawasaki, Japan

[73] Assignee: Canon Kabushiki Kaisha, Tokyo, Japan

[21] Appl. No.: 826,876

[22] Filed: Apr. 7, 1997

Related U.S. Application Data

[63] Continuation of Ser. No. 326,531, Oct. 20, 1994, abandoned.

[30] Foreign Application Priority Data

Oct. 26, 1993 [JP] Japan .................................. 5-267103
Jun. 17, 1994 [JP] Japan .................................. 6-135886
Jun. 17, 1994 [JP] Japan .................................. 6-135887

[51] Int. Cl.⁶ ................................................. H04N 1/387
[52] U.S. Cl. ..................... 382/298; 358/448; 358/451; 358/462; 358/450
[58] Field of Search .......................... 358/447, 448, 358/450, 451, 462, 464; 382/266, 267, 268, 290, 292, 298, 284; H04N 1/40, 1/387

[56] References Cited

U.S. PATENT DOCUMENTS 4,296,405 10/1981 Rich ............................. 340/146.3 AG
4,307,377 12/1981 Pferd et al. .................... 340/146.3 AE (List continued on next page.)

FOREIGN PATENT DOCUMENTS

| 0 206 853 | 12/1986 | European Pat. Off. . |
| 0208355 | 1/1987 | European Pat. Off. . |
| 0364264 | 4/1990 | European Pat. Off. . |
| 0378754 | 7/1990 | European Pat. Off. . |

(List continued on next page.)

OTHER PUBLICATIONS

Matsumoto et al., "Examination of Image Quality Evaluation in Facsimile Resolution Conversion," Journal of Society of Image Electronics, vol. 12, No. 5, pp. 354–362, 1983.

Arai et al. "Examination of Facsimile Line Density Conversion," Journal of Society of Image Electronics, vol. 7, No. 1, pp. 11–18, 1978.

Imanaka et al. "Improvement of Image Quality of Facsimile Received Image by Smoothing Processing," Draft of Annual Meeting of Society of Image Electronics No. 18, 1991 pp. 69–72.

"Development of Copying Machine Priced 800,000 Yen Which Can Express 16,700,000 Colors", Nikkei Electronics, May 25, 1992 (No. 555) pp. 195–214.

(List continued on next page.)

Primary Examiner—Kim Yen Vu
Attorney, Agent, or Firm—Fitzpatrick, Cella, Harper & Scinto

[57] ABSTRACT

In variably magnifying and outputting an image, proper variable magnification processing is performed with respect to a character/line draw component and a pseudo-halftone component, respectively. A binary image acquired by a binary image acquiring unit is supplied to an image area separating unit, in which the binary image is separated into a character/line draw area and a pseudo-halftone area. An image in the character/line draw area is supplied to an outline variable magnification unit, which performs extraction of outline vector data, smoothing processing thereof, and reproduction processing of a binary image. An image in the pseudo-halftone area is supplied to a pseudo-halftone image variable magnification unit, in which the image is subjected to multivalue conversion processing in units of pixels, variable magnification processing by thinning or interpolation of pixels, and binarization again. A synthesizing unit synthesizes binary images output from these variable magnification unit and outputs the synthesized image to a binary image output unit.

35 Claims, 40 Drawing Sheets

5,832,141
Page 2

U.S. PATENT DOCUMENTS

| | | | |
|---|---|---|---|
| 4,524,456 | 6/1985 | Araki et al. | 382/56 |
| 4,545,067 | 10/1985 | Juvin | 382/21 |
| 4,566,124 | 1/1986 | Yamamoto et al. | 382/21 |
| 4,628,532 | 12/1986 | Stone et al. | 382/21 |
| 4,668,995 | 5/1987 | Chen et al. | 358/282 |
| 4,686,580 | 8/1987 | Kato et al. | |
| 4,797,945 | 1/1989 | Suzuki et al. | 382/56 |
| 4,953,114 | 8/1990 | Sato | 382/50 |
| 5,007,098 | 4/1991 | Kumagai | 382/21 |
| 5,023,919 | 6/1991 | Wataya | 382/54 |
| 5,050,222 | 9/1991 | Lee | 382/21 |
| 5,073,959 | 12/1991 | Sugiura et al. | 382/22 |
| 5,073,960 | 12/1991 | Nakai et al. | 382/22 |
| 5,093,870 | 3/1992 | Watanabe | 382/47 |
| 5,126,838 | 6/1992 | Ohsawa et al. | 358/75 |
| 5,197,108 | 3/1993 | Watanabe | 382/47 |
| 5,214,718 | 5/1993 | Khosla | 382/22 |
| 5,227,871 | 7/1993 | Funada et al. | 358/75 |
| 5,231,677 | 7/1993 | Mita et al. | 382/22 |
| 5,235,436 | 8/1993 | Sakamoto et al. | 358/462 |
| 5,257,119 | 10/1993 | Funada et al. | 358/438 |
| 5,270,837 | 12/1993 | Chen et al. | 358/467 |
| 5,296,939 | 3/1994 | Suzuki | 358/453 |
| 5,304,988 | 4/1994 | Seto | 341/141 |
| 5,309,521 | 5/1994 | Matsukawa | 382/22 |
| 5,317,679 | 5/1994 | Ueda et al. | 395/132 |
| 5,363,202 | 11/1994 | Udagawa et al. | 358/501 |
| 5,430,525 | 7/1995 | Ohta et al. | 355/201 |
| 5,459,587 | 10/1995 | Fukushima | 358/462 |
| 5,515,179 | 5/1996 | Yamakawa et al. | 382/266 |
| 5,535,007 | 7/1996 | Kim | 358/451 |
| 5,541,741 | 7/1996 | Suzuki | 358/450 |
| 5,566,003 | 10/1996 | Hara et al. | 358/448 |

FOREIGN PATENT DOCUMENTS

| | | |
|---|---|---|
| 0407213 | 1/1991 | European Pat. Off. |
| 0415648 | 3/1991 | European Pat. Off. |
| 0451722 | 10/1991 | European Pat. Off. |
| 0482862 | 4/1992 | European Pat. Off. |
| 0553762 | 8/1993 | European Pat. Off. |
| 0554985 | 8/1993 | European Pat. Off. |
| 0206853 | 12/1986 | France |
| 61-099461 | 9/1986 | Japan |
| A1106671 | 4/1989 | Japan |
| 4157578 | 5/1992 | Japan |
| 5174140 | 7/1993 | Japan |
| 6-12490 | 1/1994 | Japan |
| 2183429 | 6/1987 | United Kingdom |
| 2201562 | 9/1988 | United Kingdom |

OTHER PUBLICATIONS

B. G. Batchelor et al., IEEE Proceedings, Computers and Digital Techniques, vol. 127, Part E, No. 4, Jul. 1980, "Fast generation of chain code", pp. 143–147.

Computer Vision, Graphics, and Image Processing, W. H. H. J. Lunscher et al., vol. 38, No. 3, Jun. 1987, pp. 229–257, "Fast Binary–Image Boundary Extraction".

Computer Vision, Graphics and Image Processing, D. W. Capson, vol. 28, No. 1, Oct. 1984, pp. 109–125, "An Improved Algorithm for the Sequential Extraction of Boundaries from a Raster Scan".

COARSE CONTOUR VECTOR LOOP EXPRESSING IMAGE

○— HORIZONTAL LINE
HORIZONTAL VECTOR

△ VERTICAL LINE
VERTICAL VECTOR

FIG. 23

| Label | Cell | Description |
|---|---|---|
| NUMBER OF LOOPS IN IMAGE | N | NUMBER OF CLOSED LOOPS |
| TABLE OF NUMBER OF VERTEXES IN EACH LOOP | $L_1$ | NUMBER OF VERTEXES IN FIRST LOOP |
| | $L_2$ | NUMBER OF VERTEXES IN SECOND LOOP |
| | ⋮ | ⋮ |
| | $L_{i-1}$ | NUMBER OF VERTEXES IN (i-1)TH LOOP |
| | $L_i$ | NUMBER OF VERTEXES IN iTH LOOP |
| | $L_{i+1}$ | NUMBER OF VERTEXES IN (i+1)TH LOOP |
| | ⋮ | ⋮ |
| | $L_{N-1}$ | NUMBER OF VERTEXES IN (N-1)TH LOOP |
| | $L_N$ | NUMBER OF VERTEXES IN NTH LOOP |
| VERTEX COORDINATE TABLE — TABLE OF VERTEX COORDINATES IN FIRST LOOP | $x_{11}$ | FIRST VERTEX COORDINATES IN FIRST LOOP |
| | $y_{11}$ | |
| | $x_{12}$ | SECOND VERTEX COORDINATES IN FIRST LOOP |
| | $y_{12}$ | |
| | ⋮ | ⋮ |
| | $x_{1j-1}$ | (j-1)TH VERTEX COORDINATES IN FIRST LOOP |
| | $y_{1j-1}$ | |
| | $x_{1j}$ | jTH VERTEX COORDINATES IN FIRST LOOP |
| | $y_{1j}$ | |
| | $x_{1j+1}$ | (j+1)TH VERTEX COORDINATES IN FIRST LOOP |
| | $y_{1j+1}$ | |
| | ⋮ | ⋮ |
| | $x_{1L_1-1}$ | (L1-1)TH VERTEX COORDINATES IN FIRST LOOP |
| | $y_{1L_1-1}$ | |
| | $x_{1L_1}$ | L1TH VERTEX COORDINATES IN FIRST LOOP |
| | $y_{1L_1}$ | |
| TABLE OF VERTEX COORDINATES IN SECOND LOOP | $x_{21}$ | FIRST VERTEX COORDINATES IN SECOND LOOP |
| | $y_{21}$ | |
| | ⋮ | ⋮ |
| | $x_{2L_2}$ | L2TH VERTEX COORDINATES IN SECOND LOOP |
| | $y_{2L_2}$ | |
| | ⋮ | ⋮ |
| TABLE OF VERTEX COORDINATES IN NTH LOOP | $x_{N1}$ | FIRST VERTEX COORDINATES IN NTH LOOP |
| | $y_{N1}$ | |
| | ⋮ | ⋮ |
| | $x_{NL_N}$ | LNTH VERTEX COORDINATES IN NTH LOOP |
| | $y_{NL_N}$ | |

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | (1) | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

| 1 | 1 | 1 | 1 | 1 | 1 |
|---|---|---|---|---|---|
| 1 | 2 | 2 | 2 | 2 | 1 |
| 1 | 2 | (4) | 4 | 2 | 1 |
| 1 | 2 | 4 | 4 | 2 | 1 |
| 1 | 2 | 2 | 2 | 2 | 1 |
| 1 | 1 | 1 | 1 | 1 | 1 |

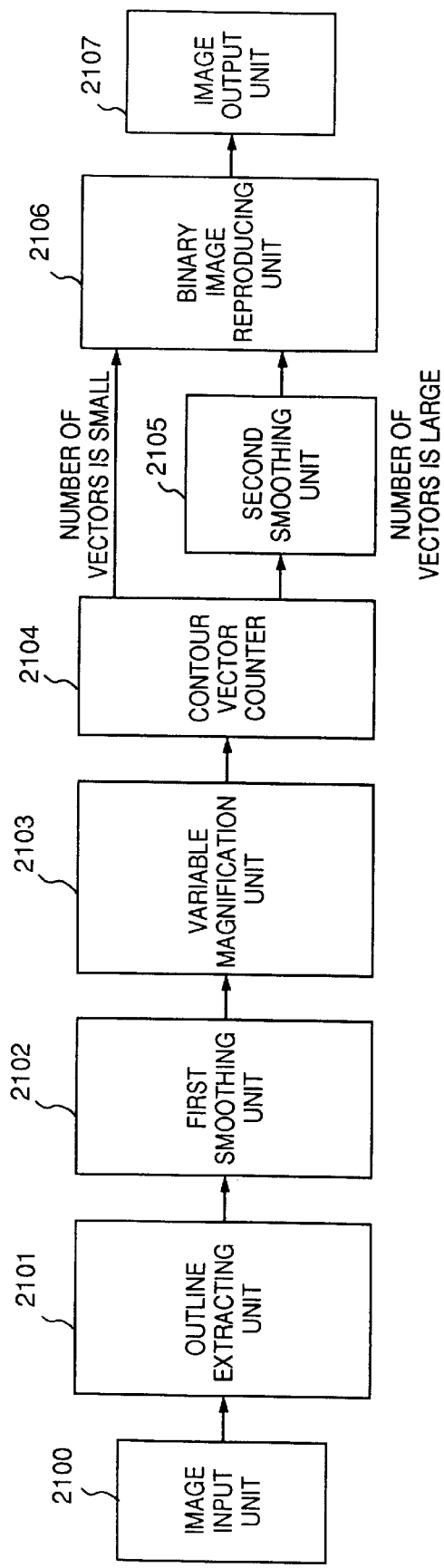

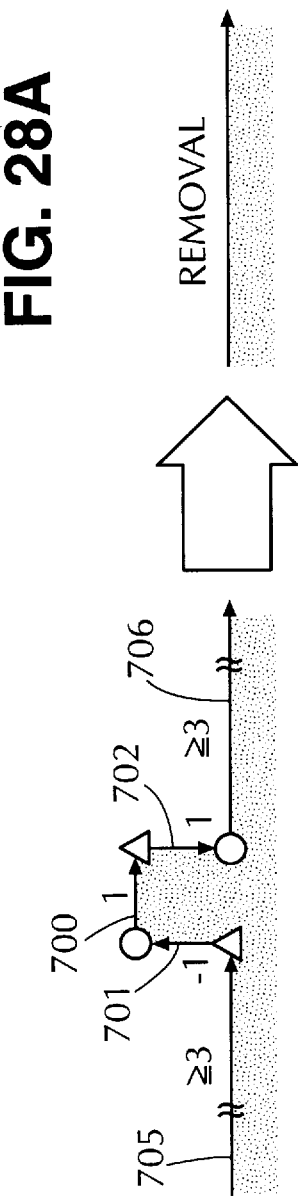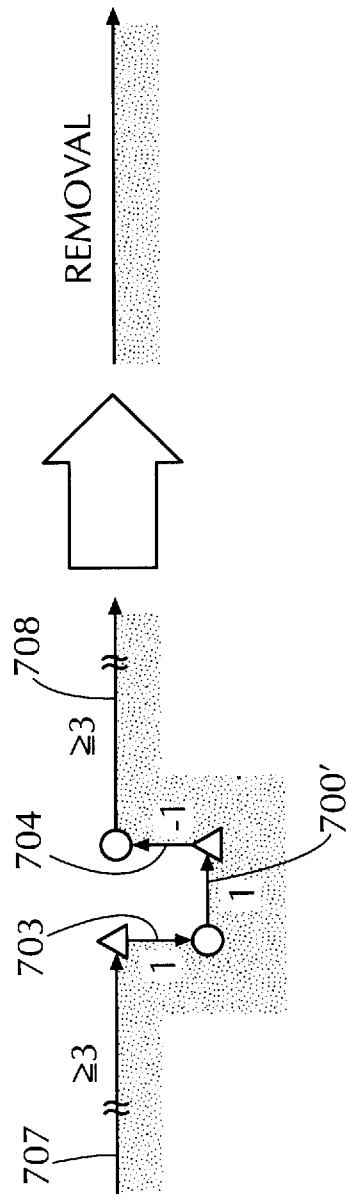

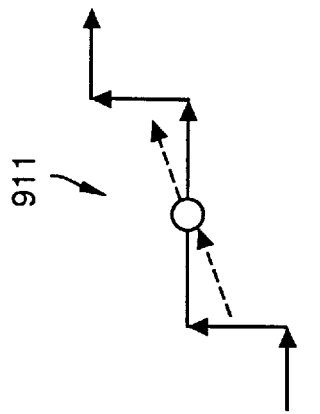
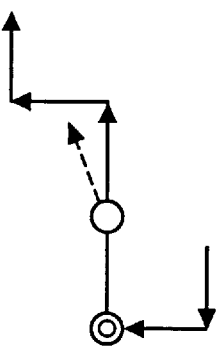
FIG. 30
FIG. 31
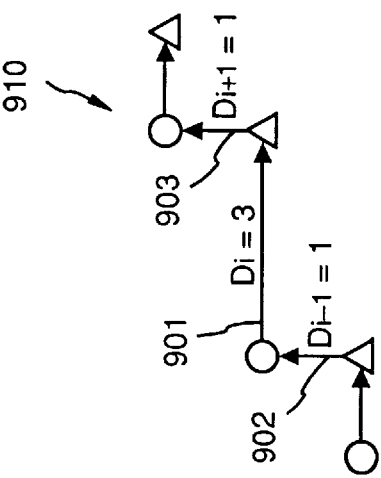
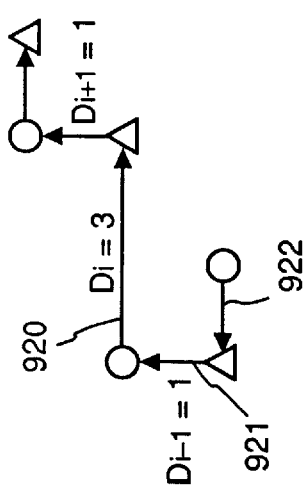

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | ① | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

| 1 | 1 | 1 | 1 | 1 | 1 |
|---|---|---|---|---|---|
| 1 | 2 | 2 | 2 | 2 | 1 |
| 1 | 2 | ④ | 4 | 2 | 1 |
| 1 | 2 | 4 | 4 | 2 | 1 |
| 1 | 2 | 2 | 2 | 2 | 1 |
| 1 | 1 | 1 | 1 | 1 | 1 |

IMAGE PROCESSING METHOD AND APPARATUS USING SEPARATE PROCESSING FOR PSEUDOHALF TONE AREA

This application is a continuation of application Ser. No. 08/326,531 filed Oct. 20, 1994, now abandoned.

BACKGROUND OF THE INVENTION

The present invention relates to an image processing method and apparatus which extract the contours of a bit map image such as a binary image, and execute smoothing and variable magnification processing.

As a resolution conversion technique for a digital binary image in an image processing or image communication apparatus, an SPC (Selective Processing Conversion) method, a projection method, or the like has been proposed or used. In the SPC method, in accordance with the variable magnification of an image, each pixel of an original image is used the number of times corresponding to the magnification, or pixels are periodically thinned out, thereby performing resolution conversion (Matsumoto and Kobayashi, "Study on the Effect of the Resolution Conversion on Picture Quality", The Journal of The Institute of Image Electronics Engineers of Japan, vol. 12, No. 5, pp. 354–362, 1983). In the projection method, an original image is projected onto a conversion image plane having a different line density, and the integral value of each pixel within the plane is binarized by threshold logic, thereby determining the value of each pixel of a conversion image (Arai and Yasuda, "A Study on Facsimile Line-Density Conversion Scheme", The Journal of The Institute of Image Electronics Engineers of Japan, vol. 7, No. 1, pp. 11–18, 1978).

As resolution conversion and smoothing techniques for a binary image, smoothing performed by referring to a pattern of pixels around a target pixel (Imanaka, et al., "Improvement in Image Quality by Smoothing Processing of Facsimile Reception Image", The Proceedings of the Institute of Image Electronics Engineers Conference, No. 18, 1991) and the like have been proposed and used for an image processing communication apparatus and various peripheral units.

In the above resolution conversion method, however, in performing conversion at a high magnification, a curved portion of an image becomes a stepped portion. That is, a deterioration in image quality cannot be avoided. In addition, the resolution conversion and smoothing techniques performed by referring to an adjacent pixel pattern are effective only for fixed magnifications, e.g., ×2 and ×4, with respect to a target pixel in the main scanning and sub-scanning directions of an image.

In order to solve the above problems, there is provided an outline smoothing method, in which the link of a black image (in a case wherein a binary image is constituted by a white or black image) is extracted as vector data instead of directly processing a binary image in the form of a bit map, and processing such as variable magnification/smoothing is subsequently performed with respect to contour vector data, thereby obtaining a high-quality image.

In such variable magnification processing, if contour vector data is given as coordinate data, each coordinate data may be magnified in accordance with a desired magnification. In performing smoothing processing afterward, pattern matching is performed between a target vector, of the extracted vectors, which is to be subjected to smoothing processing and a contour vector adjacent to the target vector so as to redefine the contour vector, thereby performing removal of isolated points, notches, and the like, smoothing of jagged (jagged pattern) smoothing processing, and the like.

By using the above outline smoothing method, an image having relatively high quality can be obtained at an arbitrary magnification between a low magnification and a high magnification. In this method, however, the contour of an image is extracted as vector data. For this reason, in processing a pseudo-halftone image produced when, for example, a photographic image is expressed as a binary image, even isolated pixels and fine curves necessary for halftone expression are subjected to smoothing/variable magnification processing upon extraction of contour vectors. Therefore, the density of a pseudo-halftone image cannot be maintained after resolution conversion, resulting in a deterioration in image quality.

Isolated pixels and fine curves in halftone expression are produced to delicately express the pixel density and curves of an image as halftone densities from a macroscopic viewpoint. Ideally, therefore, this density value is kept unchanged after resolution conversion. In the above outline smoothing method, however, since such isolated points and fine curves are removed or smoothed, the density value of a pseudo-halftone image changes after resolution conversion.

In addition, in outline processing, since an image is treated as vector data using coordinate values, the amount of vector data becomes very large as compared with the capacity for original image data when an original image constituted by a large number of isolated points and black-coupled elements each consisting of a small number of pixels, such as a pseudo-halftone image, is to be processed. As a result, for example, the required memory amount increases or the processing time is extremely prolonged.

SUMMARY OF THE INVENTION

The present invention has been made in consideration of the above problems, and has as its object to provide an image processing apparatus and method which can obtain a high-quality image as a result of variable magnification processing by performing proper variable magnification processing of character/line draw components and pseudo-halftone components, respectively. In addition, it is an object of the present invention to provide an image processing apparatus and method which can reduce the memory capacity consumption while such processing is performed.

The present invention has been made in consideration of the prior art, and has as its another object to provide an image processing method and apparatus which can maintain the halftone density of image data even after smoothing processing or resolution conversion.

It is still another object of the present invention to provide an image processing method and apparatus which can maintain the density of image data after resolution conversion by performing resolution conversion so as not to perform smoothing processing with respect to, e.g., isolated pixels and corner portions of image data.

The present invention has been made in consideration of the prior art, and has as its still another object to provide an image processing method and apparatus which can obtain a high-quality magnified image even when a determination error occurs with respect to a character/line draw component and a pseudo-halftone component.

It is still another object of the present invention to provide an image processing method and apparatus which form two images from an input image by performing proper variable magnification processing with respect to character/line draw components and pseudo-halftone components, respectively, and selecting/synthesizing the two images upon image area determination.

It is still another object of the present invention to provide an image processing method and apparatus in which black pixels input for variable magnification suitable for character/line draw components are limited to a black pixel determined as a character/line draw component and black pixels adjacent thereto, thereby suppressing an increase in required memory capacity and processing time even while such processing is performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 23 is a view showing a data format after the second smoothing processing;

FIG. 25 is a view showing an area referred to by an inverse quantization processing unit and coefficients set in the area in the seventh embodiment of the present invention;

FIG. 26 is a view showing another area referred to by the inverse quantization processing unit and other coefficients set in the area in the seventh embodiment;

FIG. 27 is a block diagram showing the schematic arrangement of an image processing apparatus using an outline smoothing method according to the eighth embodiment of the present invention;

FIGS. 28A and 28B are views for explaining smoothing processing in a first smoothing unit;

FIG. 30 is a view for explaining smoothing processing in the first smoothing unit;

FIG. 31 is a view for explaining smoothing processing in the first smoothing unit;

FIG. 41 is a view for explaining inverse quantization processing in a pseudo-halftone variable magnification unit;

FIG. 42 is a view for explaining inverse quantization processing in the pseudo-halftone variable magnification unit;

DETAILED DESCRIPTION OF THE PREFERRED EMBODIMENTS

The assignee of the present application has already made the following proposals as Japanese Patent Application Nos. 3-345062 and 4-169581.

In each of these proposals, when a binary image is to be variably magnified and output, the contour information of the binary image is extracted, and a magnified image is formed on the basis of the extracted contour information instead of variably magnifying the binary image itself. It is an object of each proposal to obtain an image with high quality.

More specifically, in Japanese Patent Application No. 3-345062, outline vectors are extracted from a binary image, a magnifying operation is performed at a desired (arbitrary) magnification in the state of the extracted outline vector expression to form smoothly magnified outline vectors, and a binary image is reproduced from the smoothly magnified outline vectors. With this operation, a high-quality digital binary image magnified at a desired magnification is obtained.

Figure 14:
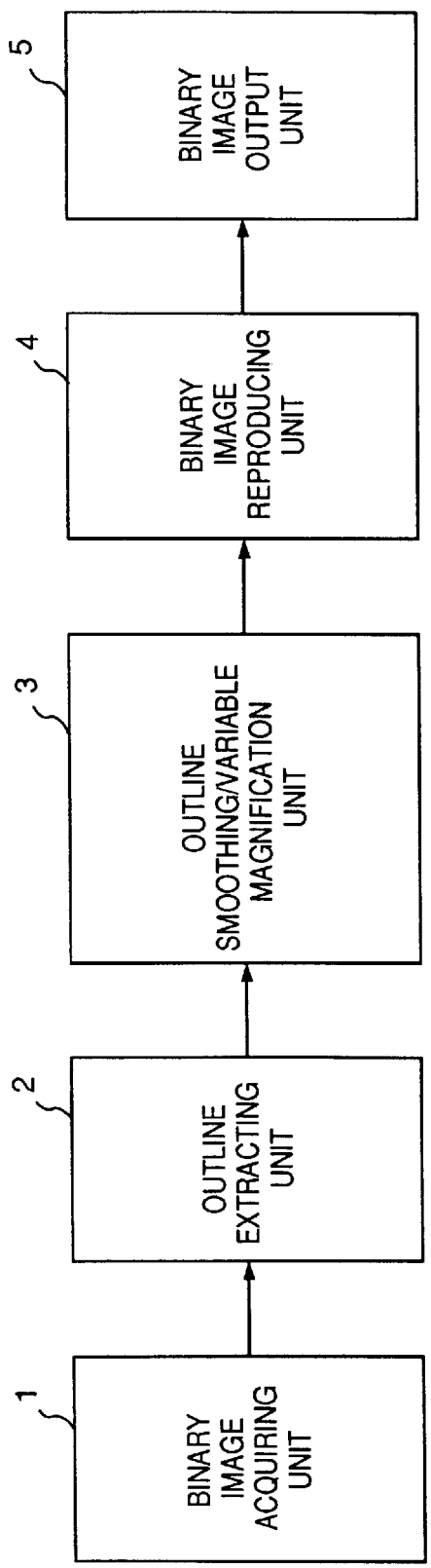
FIG. 14 is a block diagram for explaining outline vector extraction processing.

The main part of this proposal will be briefly described below. FIG. 14 is a block diagram most properly representing the characterstic features disclosed in Japanese Patent Application No. 3-345062.

Referring to FIG. 14, reference numeral 1 denotes a binary image acquiring unit for acquiring a digital binary image to be subjected to variable magnification processing, and outputting a binary image according to a raster scanning scheme; 2, an outline extracting unit for extracting coarse contour vectors (outline vectors before smoothing/variable magnification processing) from the binary image of the raster scanning scheme; 3, an outline smoothing/variable magnification unit for performing smoothing/variable magnification processing of the coarse contour vectors in the form of vector data; 4, a binary image reproducing unit for reproducing binary image data of the raster scanning scheme from outline vector data; and 5, a binary image output unit for displaying the binary image data of the raster scanning scheme, producing a hard copy, or outputting the data to a communication line or the like.

Figure 15:
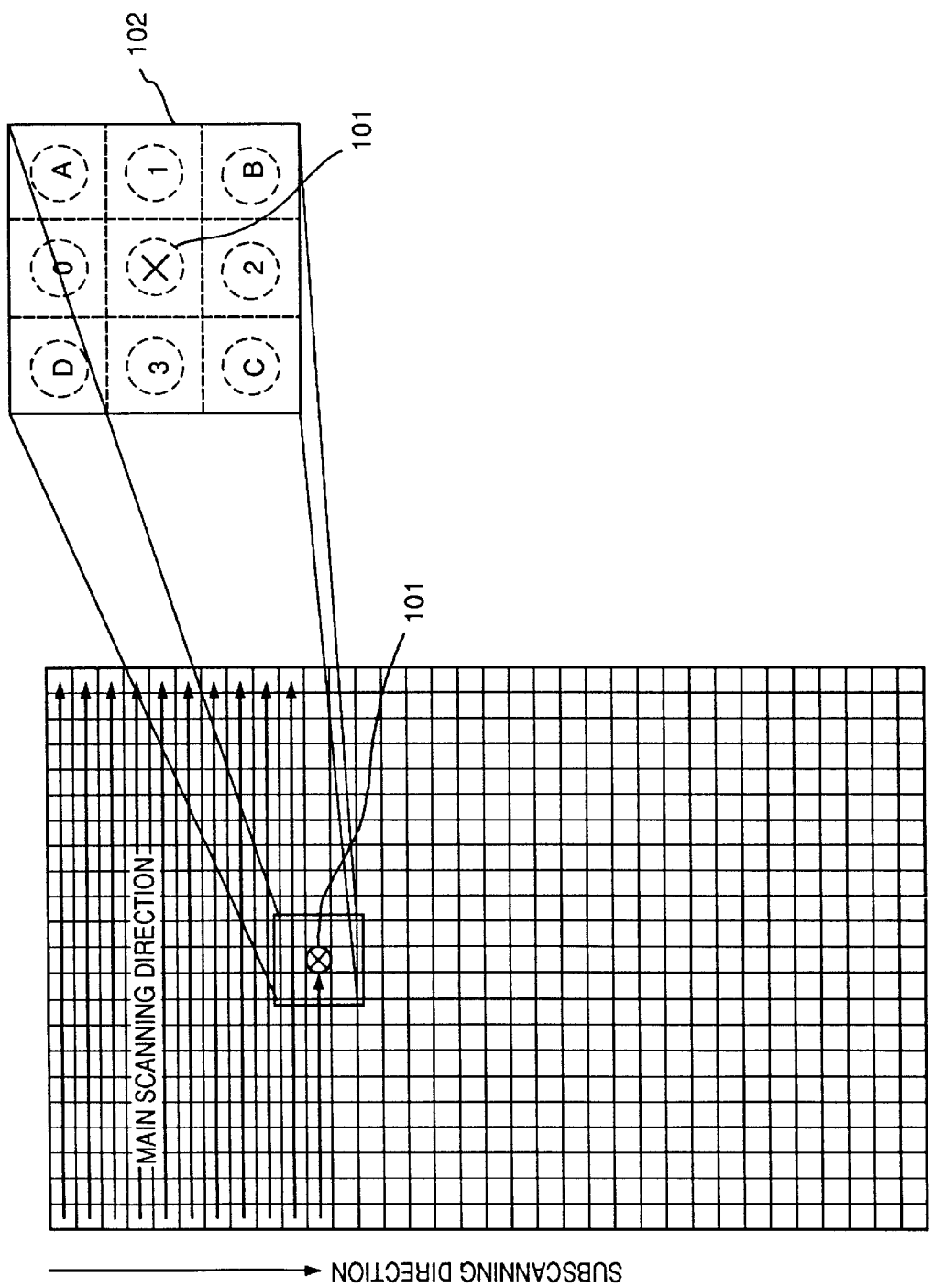
FIG. 15 is a view for explaining outline vector extraction processing.

For example, the binary image acquiring unit 1 is constituted by a known raster scanning type binary image output unit for reading an original image as a binary image and outputting the read image according to the raster scanning scheme. For example, the outline extracting unit 2 is constituted by a device disclosed in Japanese Patent Application No. 2-281958 previously proposed by the assignee of the present application. FIG. 15 shows a scanning form for raster scanning type binary image data output from the binary image acquiring unit 1, and also a scanning form for raster scanning type binary image data received by the outline extracting unit 2. In this form, the outline extracting unit 2 receives raster scanning type binary image data output from the binary image acquiring unit 1. Referring to FIG. 15, reference numeral 101 denotes a given pixel of a binary image during a raster scanning operation; and 102, a nine-pixel area including eight pixels adjacent to the pixel 101. The above outline extracting unit disclosed in Japanese Patent Application No. 2-281958 switches target pixels in the raster scanning order, and detects a contour side vector (horizontal or vertical vector) between each target pixel and each adjacent pixel in a nine-pixel area denoted by reference numeral 102 in accordance with the state of each pixel (white or black pixel). If a contour side vector is present, the outline extracting unit extracts the start coordinates and direction data of the side vector, and sequentially extracts coarse contour vectors while updating the relationship in connection between these side vectors.

Figure 16:
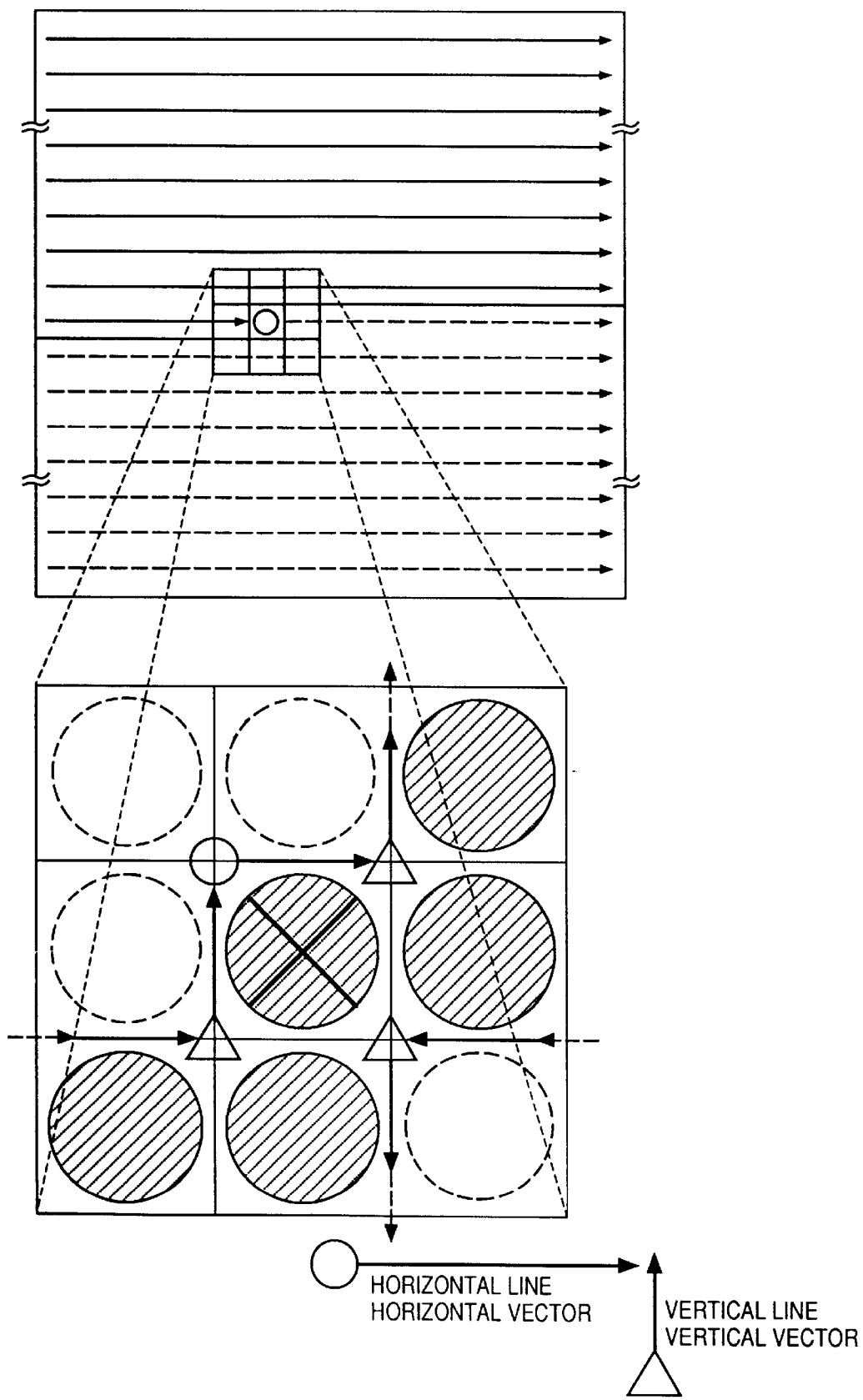
FIG. 16 is a view for explaining outline vector extraction processing.

FIG. 16 shows a state wherein contour side vectors between a target pixel and pixels adjacent to the target pixel are extracted. Referring to FIG. 16, a mark Δ represents the start point of a vertical vector (or the end point of a horizontal vector), and a mark ○ represents the start point of a horizontal vector (or the end point of a vertical vector).

Figure 17:
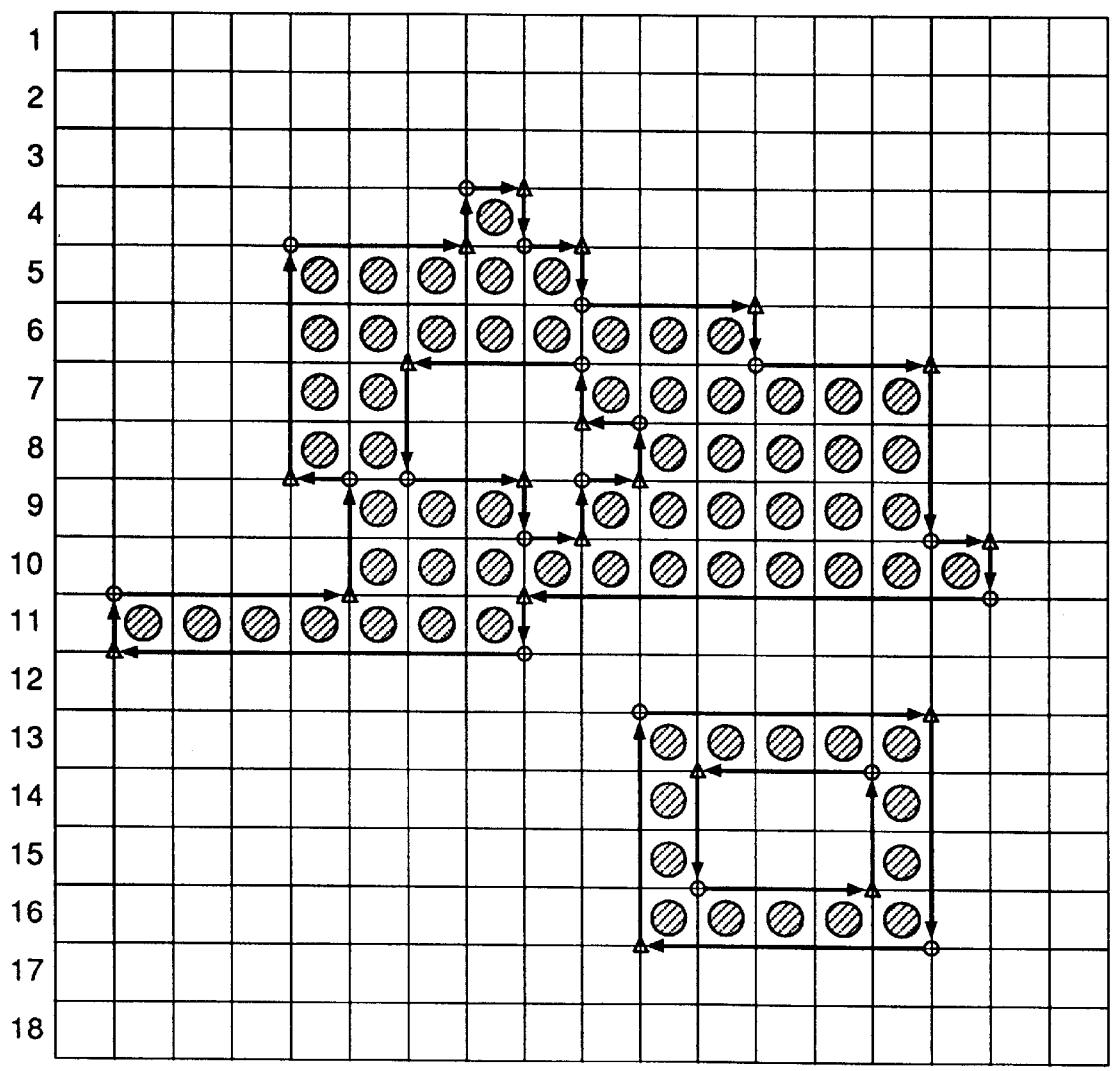
FIG. 17 is a view for explaining outline vector extraction processing.

FIG. 17 shows coarse contour vector loops extracted by the outline extracting unit described above. In this case, each square defined by the matrix indicates a pixel position of an input image; each blank square, a white pixel; and each hatched mark ○, a black pixel. Similar to FIG. 16, each mark Δ represents the start point of a vertical vector; and each mark ○, the start point of a horizontal vector.

As is apparent from the case shown in FIG. 17, the outline extracting unit extracts areas where black pixels are coupled to each other as coarse contour vectors alternately (always alternately) continuous with each other, although horizontal and vertical vectors differ in length. Note that in this case, extraction processing is performed such that a black pixel area is located on the right side with respect to the direction of the extraction processing. In addition, the start point coordinates of each coarse contour vector are extracted as the middle position of each pixel of an input image. That is, when the position of each pixel is expressed by integers (x,y), the start point of an extracted vector is expressed by values obtained by adding or subtracting 0.5 to or from the respective coordinate values. More specifically, a line portion having a width corresponding to one pixel in an original image is also extracted as a coarse contour vector having a significant width.

Figure 18:
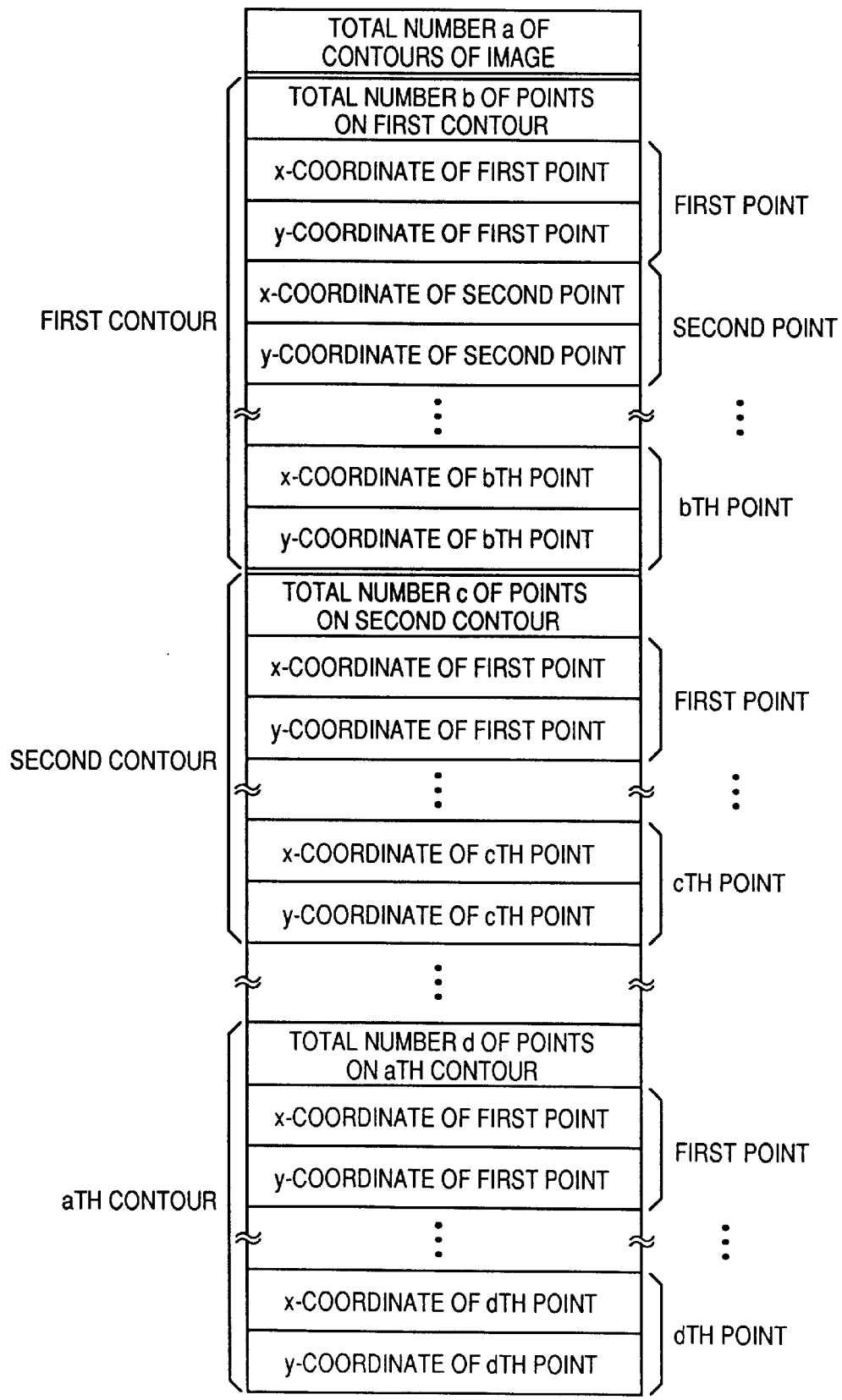
FIG. 18 is a view showing the format of extracted coarse contour vector data.

The coarse contour vector group extracted in this manner is output from the outline extracting unit 2 in FIG. 14 according to a data format like the one shown in FIG. 18. That is, the coarse contour vector group is constituted by a total number a of coarse contour loops extracted from an image, and a group of coarse contour loop data of the first contour loop to the ath contour loop. Each coarse contour loop data is constituted by the total number of the start points of contour side vectors (equivalent to the total number of contour side vectors) present in the coarse contour loop, and a sequence of the values (the start points of horizontal and vertical vectors are alternately arranged) of the start point coordinates (x- and y-coordinates) of the respective contour side vectors in the order of constituting the loop.

Figure 19:
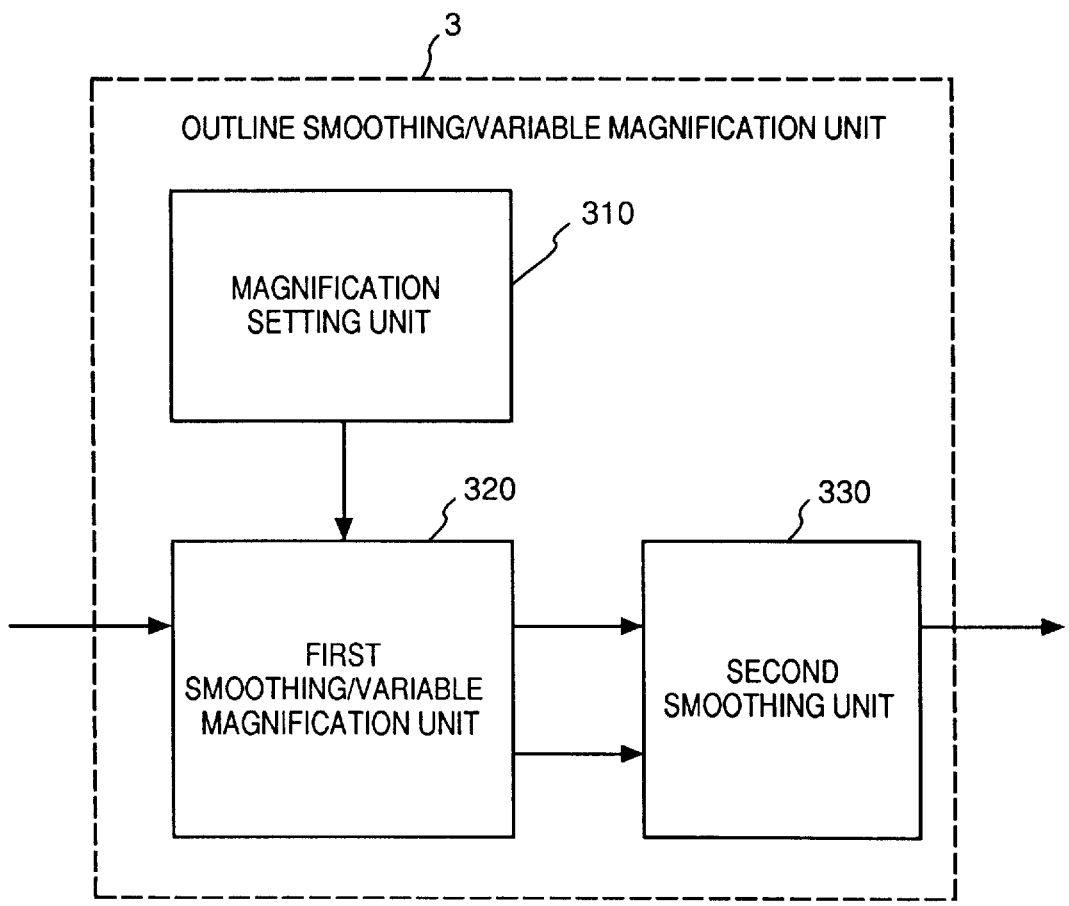
FIG. 19 is a block diagram showing the arrangement of an outline smoothing/variable magnification unit.

The outline smoothing/variable magnification unit 3 shown in FIG. 14 receives the coarse contour vector data (FIG. 18) output from the outline extracting unit 2, and performs variable magnification processing for smoothing and a desired magnification in the form of outline vector data (coordinate value). FIG. 19 shows the arrangement of the outline smoothing/variable magnification unit 3 in more detail. Referring to FIG. 19, reference numeral 310 denotes a magnification setting unit; and 320, a first smoothing/variable magnification unit.

The first smoothing/variable magnification unit 320 performs smoothing and variable magnification processing of input coarse contour data at a magnification set by the magnification setting unit 310. A second smoothing unit 330 further performs smoothing of the processing result to obtain a final output.

The magnification setting unit 310 may supply a value set by a dip switch, a dial switch, or the like in advance to the first smoothing/variable magnification unit 320, or may supply a value externally provided via an I/F (interface). That is, the magnification setting unit 310 is a unit for providing information designating specific magnifications respectively in the main scanning (horizontal) direction and the sub-scanning (vertical) direction with respect to an image size supplied as input data.

The first smoothing/variable magnification unit 320 receives magnification information from the magnification setting unit 310 and performs smoothing/variable magnification processing.

Figure 20:
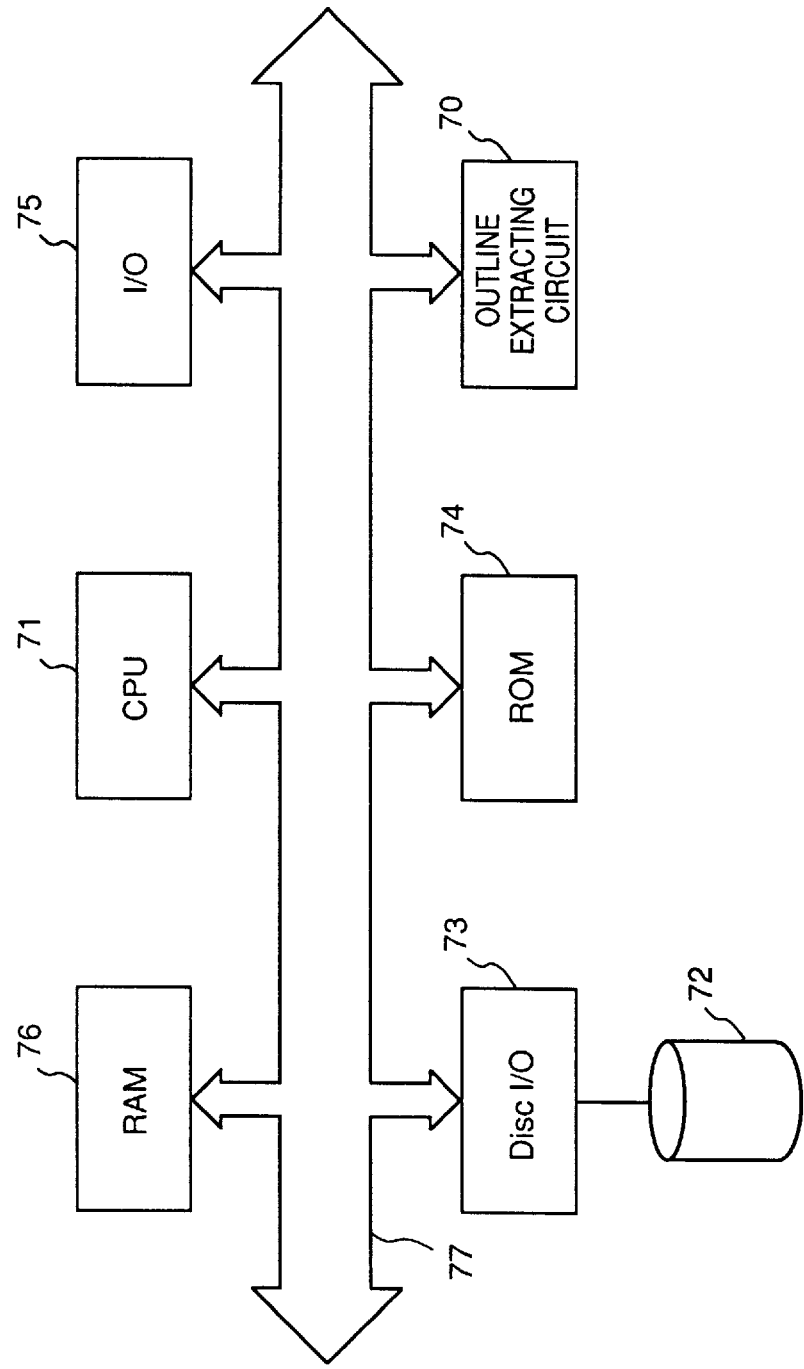
FIG. 20 is a block diagram showing the arrangement of a system.

FIG. 20 shows a hardware arrangement for realizing outline smoothing/variable magnification processing. Referring to FIG. 20, reference numeral 71 denotes a CPU; 72, a disc unit; 73, a disc I/O; 74, a ROM for storing operation procedures executed by the CPU 71; 75, an I/O port; 76, a RAM (random access memory); and 77, a bus connected to each of the above blocks.

The output (shown in FIG. 15) from the outline extracting unit is stored, as a file (coarse contour vector data), in the disc unit 72 according to the data format shown in FIG. 18.

Figure 21:
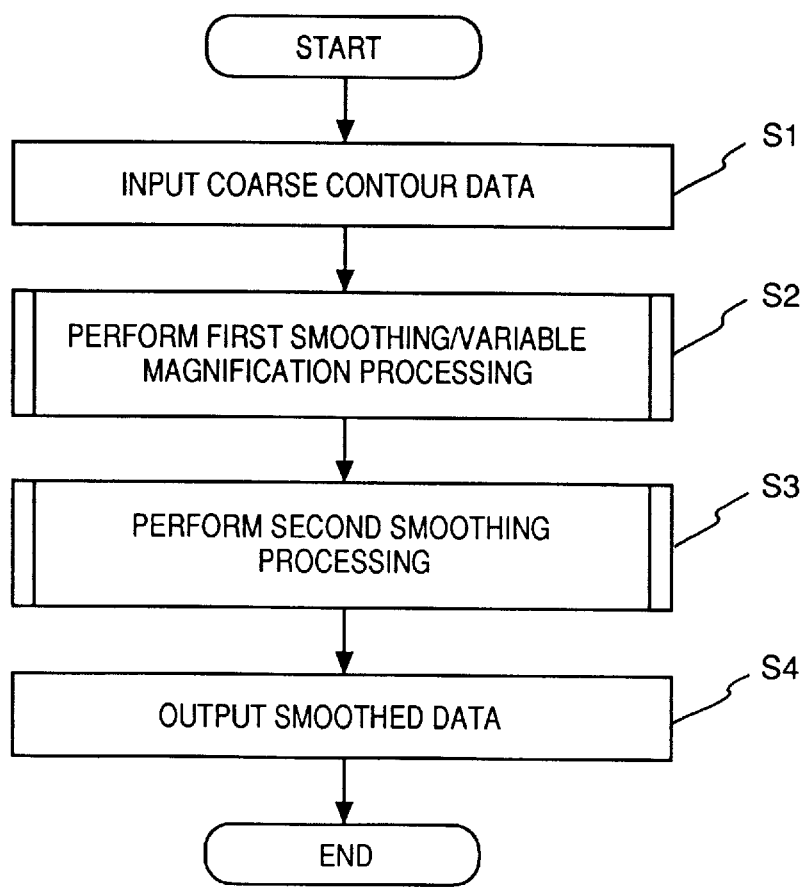
FIG. 21 is a flow chart showing a procedure for image processing.

The CPU 71 operates in accordance with the procedure shown in FIG. 21 to execute outline smoothing/variable magnification processing.

In step Sl, the CPU 71 reads out coarse contour data from the disc unit 72 via the disc I/O 73, and loads it in a working memory area (not shown) of the RAM 76. In step S2, the CPU 71 performs first smoothing/variable magnification processing.

The first smoothing processing is performed for each closed loop of the coarse contour data. Each contour side (horizontal or vertical vector) vector of each coarse contour data is sequentially set as a target vector, and at most three continuous side vectors before and after each target contour side vector (i.e., at most a total of seven side vectors, i.e., three sides before the target side and three sides after the target side) are classified into a pattern according to a combination of the lengths and directions of the side vectors. A contour point after the first smoothing processing as the first smoothing result with respect to each target side is defined with respect to each pattern. The CPU 71 then outputs additive information (to be referred to as corner point information hereinafter) indicating the coordinate value of each contour point after the first smoothing processing and whether the contour point is a point at a corner. In this case, a "point at a corner" unit a point located at a significant corner, and is discriminated from points derived from noise and points derived from jagged portions and notches caused by other factors. A contour point (to be referred to as a corner point hereinafter) after the first smoothing processing which is determined as a corner point is treated as a point which is not smoothed by the second smoothing processing, i.e., treated as a fixed point. In other words, a contour point (to be referred to as a non-corner point hereinafter) after the first smoothing processing which is not determined as a corner point is further smoothed by the second smoothing processing.

Figure 22:
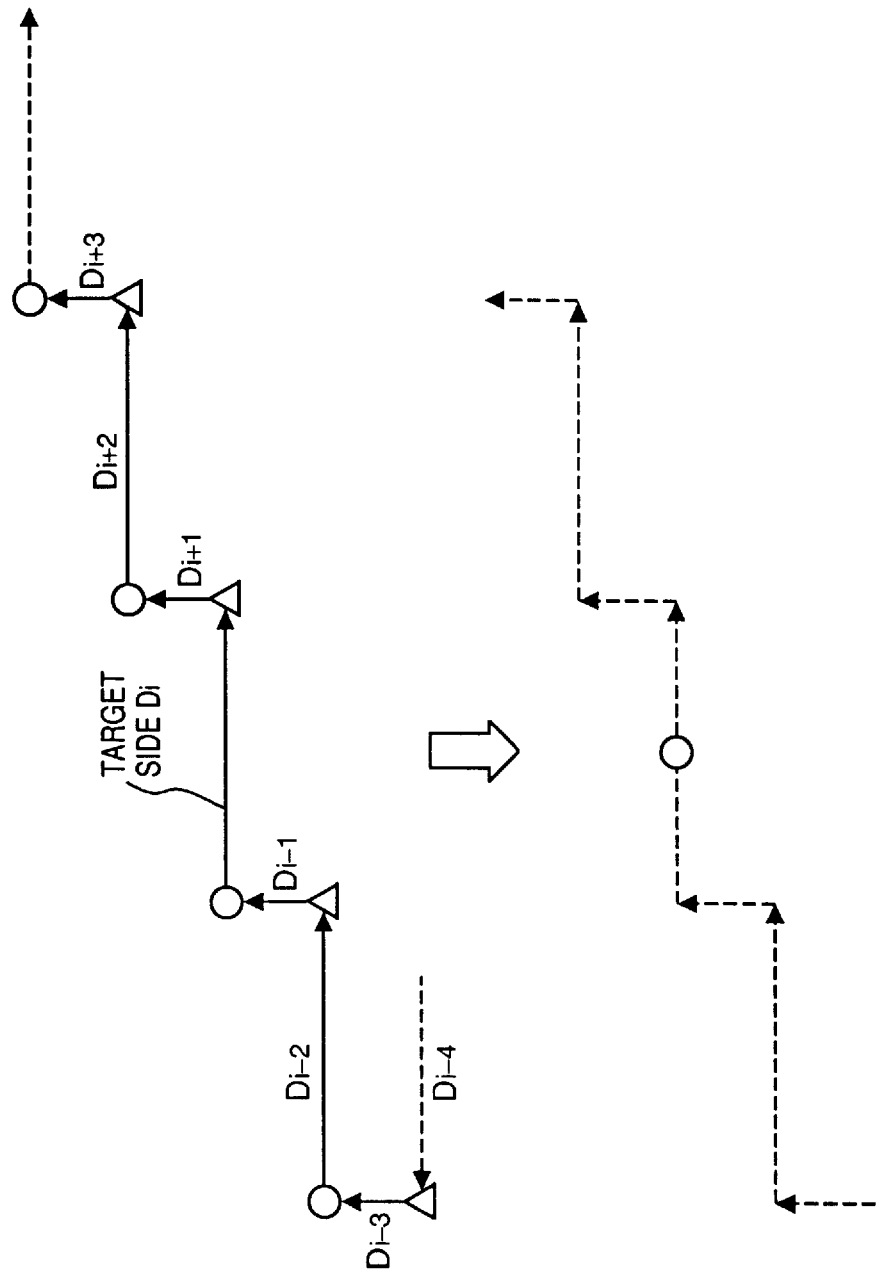
FIG. 22 is a view showing an example of the first smoothing processing.

FIG. 22 shows this state, i.e., a target coarse contour side vector Di, three side vectors Di–1, Di–2, and Di–3 before the target coarse contour side vector, three side vectors Di+1, Di+2, and Di+3 after the target coarse contour side vector, and a contour point after the first smoothing processing which is defined with respect to the target edge Di. That is, a vector (an oblique vector is allowed) connecting contours redefined in this manner is formed.

FIGS. 28A to 31 show contour vector patterns and examples of how corresponding target contour vectors are redefined.

FIG. 28A shows a case wherein a target vector 700 located in the middle of five continuous contour vectors has a length of "1", vectors 701 and 702 immediately before and after the target vector 700 respectively have lengths of "–1" and "1", and each of vectors 705 and 706 two vectors before and after the target vector 700 has a length of "3" or more.

FIG. 28B shows a case wherein a target vector 700 located in the middle of five continuous contour vectors has a length of "1", vectors 703 and 704 immediately before and after the target vector 700 respectively have lengths of "1" and "–1", and each of vectors 707 and 708 two vectors before and after the target vector 700 has a length of "3" or more. Each of FIGS. 28A and 28B shows a one-pixel notch unique to a binary image obtained by binarizing data read by an image reader or the like. In this case, when a contour vector is redefined, a contour point is defined upon elimination of the notch portion, thereby removing the notch.

Figure 29:
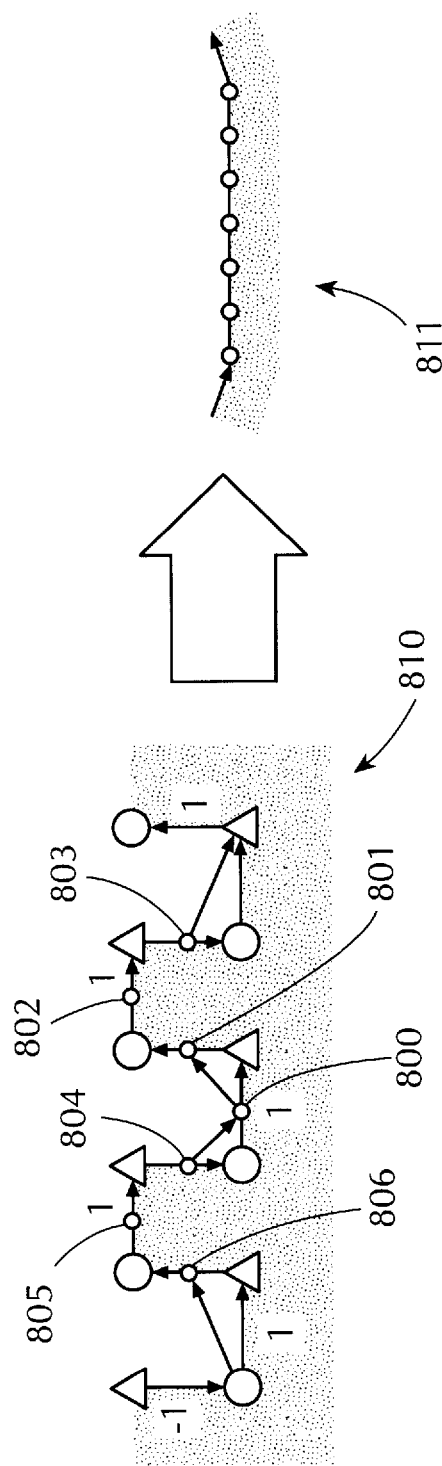
FIG. 29 is a view for explaining smoothing processing in the first smoothing unit.

Referring to FIG. 29, reference numeral 810 denotes an image in which notches are continuously produced. In this case, all the contour vectors have a length of "1". Contour vectors 805 and 802 two vectors before and after a target vector 800 point in the same direction. Contour vectors 805 and 802 immediately before and after the target vector point in different directions, and so do contour vectors 806 and 803 three vectors before and after the target vector.

Assume that a target vector is a horizontal vector. In this case, the x-coordinate value of the target vector is set to have the same value as that of the middle point of the target vector, and the y-coordinate value of the target vector is set to have the same value as that of the middle point of a contour vector immediately before the target vector, thereby defining a contour point after the first smoothing processing. Assume that a target vector is a vertical vector. In this case, the x-coordinate value of the target vector is set to have the same value as that of the middle point of a contour vector immediately before the target vector, and the y-coordinate value of the target vector is set to have the same value as that of the middle point of the target vector, thereby defining a contour point after the first smoothing processing. Referring FIG. 29, reference numeral 811 denotes a contour obtained by smoothing the image 810.

FIG. 30 is a view for explaining processing for making a moderately inclined portion more moderate.

Assume that a target contour vector 901 has a length of "3", and both contour vectors before and after the target vector 901 point in the same direction and have a length of "1". In addition, assume that both contour vectors two vectors before and after the target vector 901 point in the same direction and have a length of "1". In this case, the middle point of the target contour vector 901 is redefined as a contour point. With this operation, a stepped portion denoted by reference numeral 910 in FIG. 30 is smoothed as indicated by a dotted line 911 in FIG. 30.

FIG. 31 is a view for explaining processing for obtaining a sharp image by further smoothing inclined line portion and retaining a corner portion intact at a position near a point of contact between the inclined line portion and the fine corner portion. In this case, a target vector 920 is smoothed in the same manner as in FIG. 30. However, since a contour vector 921 immediately before the target vector 920 and a contour vector 922 before the contour vector 921 indicate that a pixel indicated by a mark ⊙ is located at a corner portion (corner point), this contour point is not subjected to the second smoothing processing (to be described later). Therefore, a portion, of the target vector 920, extending from its middle point in the main scanning direction is smoothed, as indicated by the dotted line in FIG. 31.

The above description is associated with pixel patterns to be subjected to the first smoothing processing, which is a general description of the processing executed by a smoothing unit 102 in this embodiment. Note that smoothing may be performed with respect to patterns other than those described above in practice. The processing in this first smoothing unit is the process of smoothing an image by pattern matching. Owing to this processing, thickening, thinning, or the like of an image may occur in a small area corresponding to about one pixel at most.

The contents of the first smoothing processing have been described above. Data after the first smoothing processing are sequentially constructed on a predetermined area of the RAM 76. The processing in step S2 in FIG. 21 is completed in this manner, and the CPU 71 performs the second smoothing processing in step S3.

In the second smoothing processing, data after the first smoothing processing is input and processed. That is, the CPU 71 receives data indicating the number of closed loops, data indicating the number of contour points of each closed loop, the coordinate value data string of contour points of each closed loop after the first smoothing processing, and the additive information data string of the contour points of each closed loop after the first smoothing processing, and outputs contour point data after the second smoothing processing.

As shown in FIG. 23, the contour data after the second smoothing processing is constituted by the number of closed loops, a contour point count table for each closed loop, and the coordinate value data of the contour points of each closed loop after the second smoothing processing.

The second smoothing processing will be briefly described below with reference to FIG. 24. Similar to the first smoothing processing, in the second smoothing processing, processing is performed in units of contour loops, while processing is performed in units of contour points in each contour loop.

If a target contour point is a corner point, an input contour point coordinate value is used as contour point coordinate data which has undergone the second smoothing processing with respect to the target contour point. That is, no change is made.

If a target contour point is a non-corner point, a coordinate value obtained from the weighted mean of the coordinate values of contour points before and after the target contour point and the coordinate value of the target contour point is used as a contour point coordinate value which has undergone the second smoothing processing with respect to the target contour point. More specifically, letting $Pi(xi,yi)$ be the target input contour point as the non-corner point, $Pi-1(Xi-1,yi-1)$ be the contour point immediately before the target contour point in the input contour loop, $Pi+1(xi+1,yi+1)$ be the contour point immediately after the target contour point, and $Qi(x'i,y'i)$ of the contour point which has undergone the second smoothing processing with respect to the target input contour point $Pi$, $$x'i=ki-1\cdot xi-1+ki\cdot xi+ki+1\cdot xi+1 \quad y'i=ki-1\cdot yi-1+ki\cdot yi+ki+1\cdot yi+1 \quad (1)$$

In this case, $ki-1=ki+1=¼$ and $ki=½$.

Figure 24:
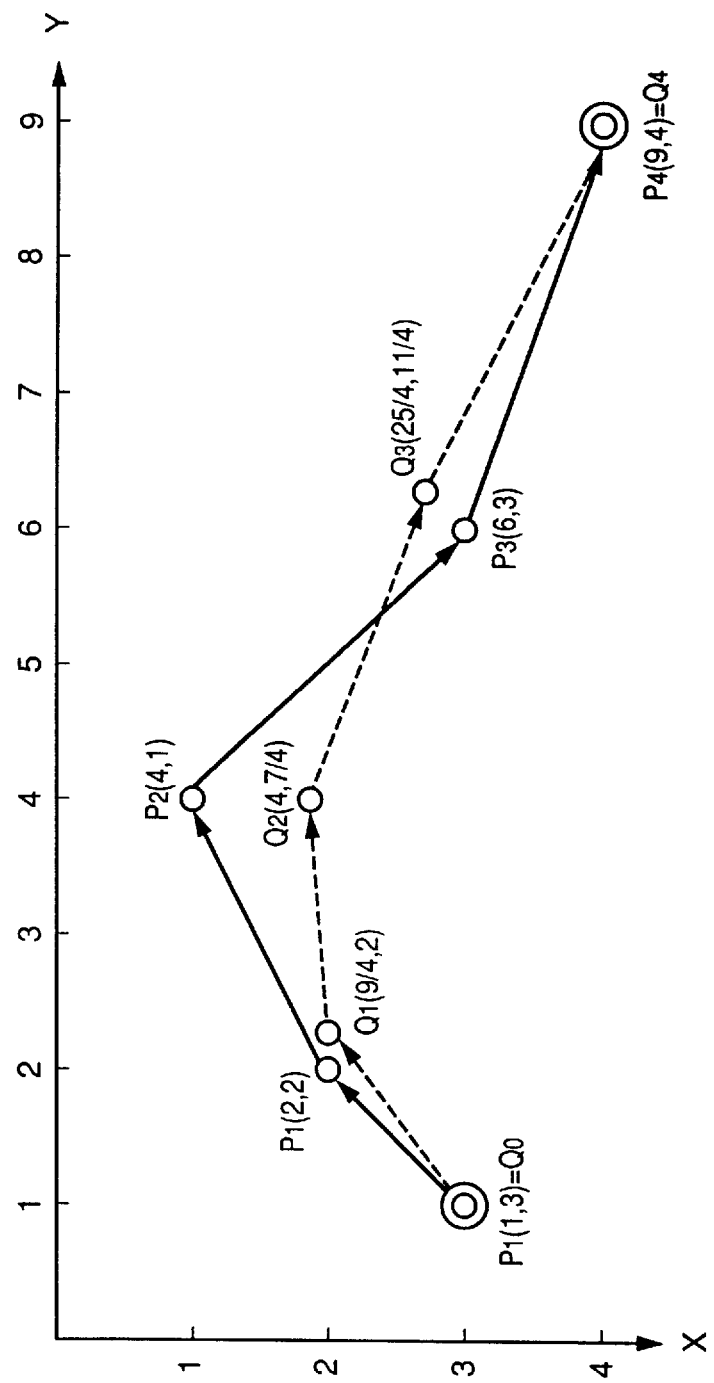
FIG. 24 is a view showing an example of the second smoothing processing.

Referring to FIG. 24, points P0, P1, P2, P3, and P4 form a part of a series of continuous contour points, as input data, which have undergone the first smoothing processing, points P0 and P4 are corner points, and points P1, P2, and P3 are non-corner points. The processing results obtained at this time are respectively indicated by points Q0, Q1, Q2, Q3, and Q4. Since the points P0 and P4 are corner points, their coordinate values are used as the coordinate values of the points Q0 and Q4 without any modification. The point Q1 has coordinate values calculated from the points P0, P1, and P2 according to the above equations. Similarly, the points Q2 and Q3 respectively have coordinate values calculated from the points P1, P2, and P3 and the points P2, P3, and P4 according to the above equations.

The CPU 71 performs the second smoothing processing with respect to the contour data in a predetermined area of the RAM 76, which has undergone the first smoothing processing, in the above-described manner. In the second smoothing processing, processing is sequentially performed for each loop in an order of the first loop, the second loop, the third loop . . . . When processing with respect to all loops is completed, the second smoothing processing is ended. In each loop, processing is sequentially performed in an order of the first point, the second point, the third point . . . . When the processing indicated by equations (1) is completed with respect all the contour points in one loop, the processing of this loop is ended, and the next loop is processed.

Assume that L contour points are present in a loop. In this case, a point before the first point is the Lth point, and a point after the Lth point is the first point. The contour point data obtained by the second smoothing processing has the same total number of loops as that of the contour data after the first smoothing processing, with the number of contour points on each loop remaining the same. The CPU 71 outputs the above result to another area of the RAM 76 or the disc unit 72 according to the format shown in FIG. 23, and completes the second smoothing processing (step S3).

The flow then advances to step S4 to transfer the data obtained by the second smoothing processing to the binary image reproducing unit 4 via the I/O port 75, thereby completing the series of operations shown in FIG. 21.

For example, the binary image reproducing unit 4 can be constituted by a device disclosed in Japanese Patent Application No. 3-172098 proposed by the assignee of the present application. This device can output a binary image according to the raster scanning scheme, which image is formed by painting an area enclosed with a vector graphic pattern expressed by contour data, obtained by the second smoothing processing and transferred via an I/O, on the basis of the contour data. In addition, according to the description of this proposal, binary image data is visualized by using a binary image output unit such as a video printer.

The proposal disclosed in Japanese Patent Application No. 4-169581 is an improvement on Japanese Patent Application No. 3-345062 described above. This proposal aims at preventing an image magnified at a low magnification from excessive thickening. More specifically, in the outline extracting unit in Japanese Patent Application No. 3-345062, a boundary located midway between white and black pixels of an original image is set as a target subjected for vector extraction. In the improved proposal, however, a vector is extracted at a position located between white and black pixels and closer to the black pixel (i.e., a black pixel area is set to be smaller in width than a white pixel area), and outline smoothing is performed in accordance with this vector extraction.

In the above case, although characters, line drawings, tables, graphic patterns, and the like can be processed to obtain good results, a deterioration in image quality may occur in pseudo-halftone images formed by the dither method, the error diffusion method, and the like.

More specifically, in the above case, attention is paid to each black pixel area in a white (background) area in a binary image, and contour vectors are extracted at the boundaries between white pixel areas and black pixel areas. Processing is then performed in units of contour vector loops. For this reason, removal of noise and smoothing are performed for even isolated points and black pixel coupled components constituted by several pixels coupled to each other in a scalelike form, which points and components are unique to a pseudo-halftone image. Therefore, an apparent density obtained by an area gradation expression of a pseudo-halftone image may change, and a unique texture is further emphasized, resulting in a deterioration in image quality.

In addition, in outline processing, an image is treated as vector data using coordinate values. For this reason, in processing an original image, such as a pseudo-halftone image, which is constituted by many isolated point and black pixel coupled components, each consisting of a small number of pixels, the vector data amount considerably increases as compared with the capacity of the original image data, or the processing time is extremely prolonged.

The first embodiment of the present invention can solve the above problems.

The first embodiment of the present invention will be described in detail below with reference to the accompanying drawings.

Figure 1:
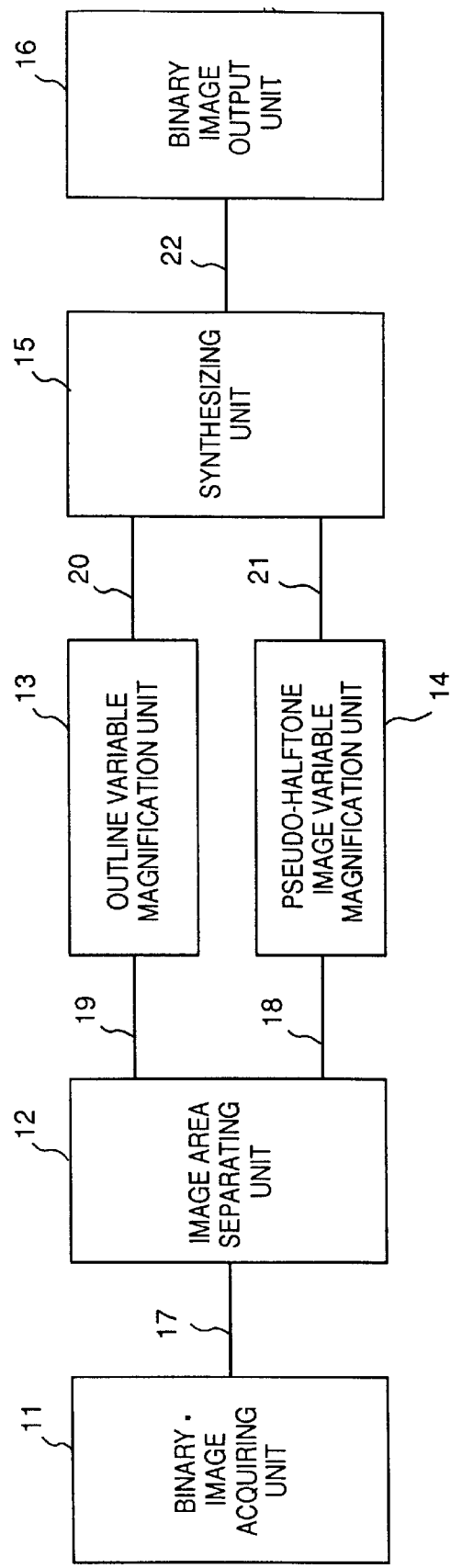
FIG. 1 is a block diagram showing the arrangement of an image processing apparatus according to the first embodiment of the present invention.

FIG. 1 is a block diagram showing the arrangement of an apparatus of this embodiment. Referring to FIG. 1, reference numeral 11 denotes a binary image acquiring unit for acquiring a digital binary image subjected to variable magnification processing, and outputting a binary image 17 of the raster scanning scheme; 12, an image area separating unit for separating the binary image data (signal) 17 of the raster scanning scheme from the binary image acquiring unit 11 into pseudo-halftone component image data 18 and other component image data (to be referred to as character/line draw component image data hereinafter) 19; 13, an outline variable magnification unit for extracting outline vectors from an input image, performing smoothing/variable magnification processing in the form of the extracted outline vector data, and reproducing, as binary image data of the raster scanning scheme, a binary image expressed by outline vector data obtained by the smoothing/variable magnification processing, thereby obtaining a magnified image; 14, a pseudo-halftone image variable magnification unit which operates according to a scheme different from that for the outline variable magnification unit 13; 15, a synthesizing unit for synthesizing an output 20 from the outline variable magnification unit 13 and an output 21 from the pseudo-halftone image variable magnification unit 14 to generate a magnified image 22 with respect to the overall binary image data 17 of the raster scanning scheme; and 16, a binary image output unit for displaying the obtained magnified image, producing a hard copy, or outputting the image data to a communication line or the like.

The binary image acquiring unit 11 is constituted by a known raster scanning type binary image output unit for reading an image by using, e.g., an image reader, and outputting binary image data according to the raster scanning scheme. Note that binary image acquiring unit 11 may be a unit for loading data from a storage medium in which binary image data is stored, or a unit for converting an image photographed by a still camera into a binary image as long as a binary image can be obtained.

Figure 2:
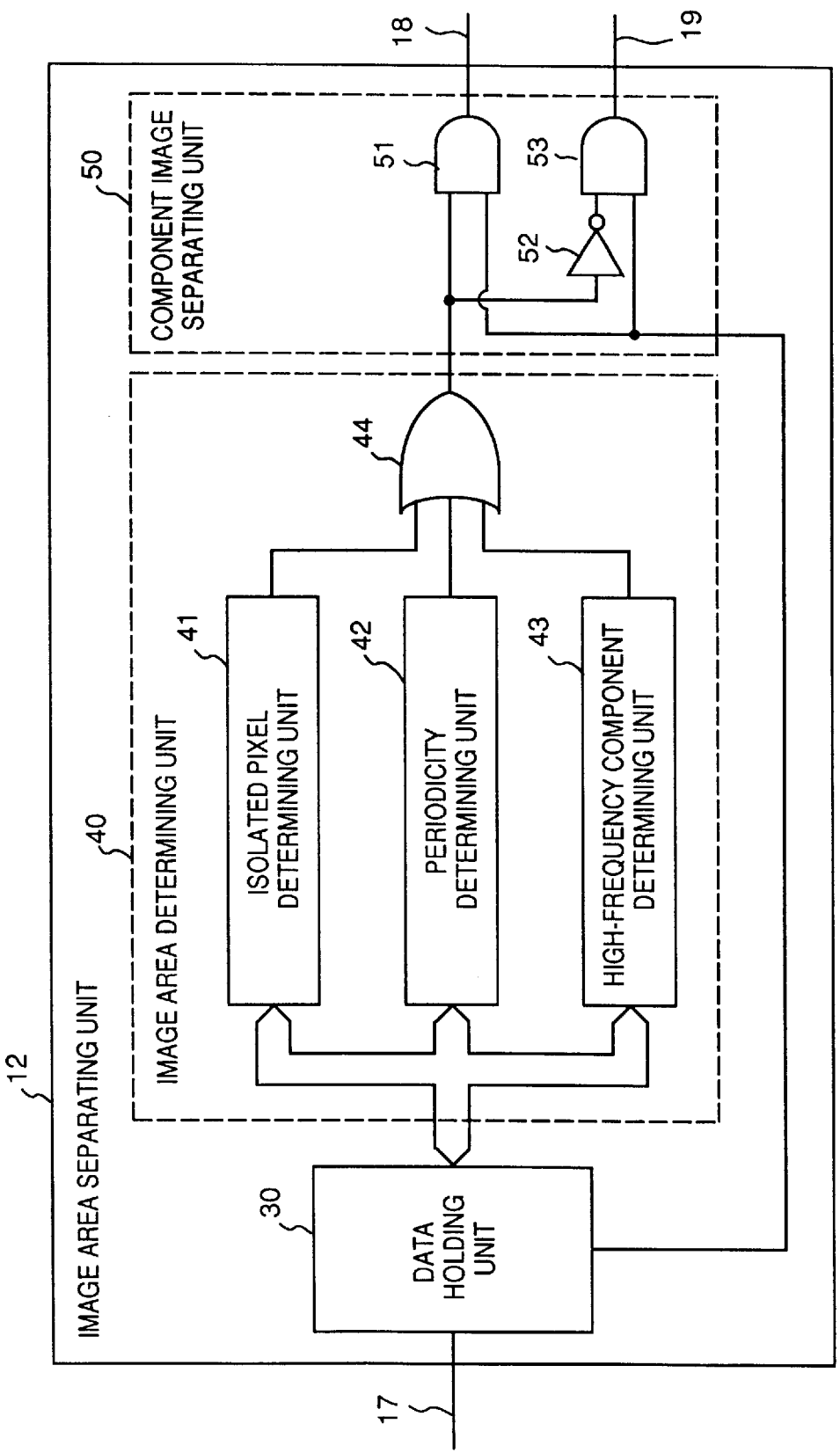
FIG. 2 is a block diagram showing the arrangement of an image area separating unit in FIG. 1.

FIG. 2 shows the arrangement of the image area separating unit 12. Referring to FIG. 2, reference numeral 30 denotes a data holding unit for sequentially updating/holding each pixel value in each small area which is required for image separation processing. For example, the data holding unit 30 holds data corresponding to 8×8 pixels at maximum, i.e., 64 pixels around a target pixel, with respect to digital binary image data input according to the raster scanning scheme. The data holding unit 30 updates its contents in synchronism with an update operation with respect to the position of a target pixel (sequentially moved according to the raster scanning scheme).

Figure 7:
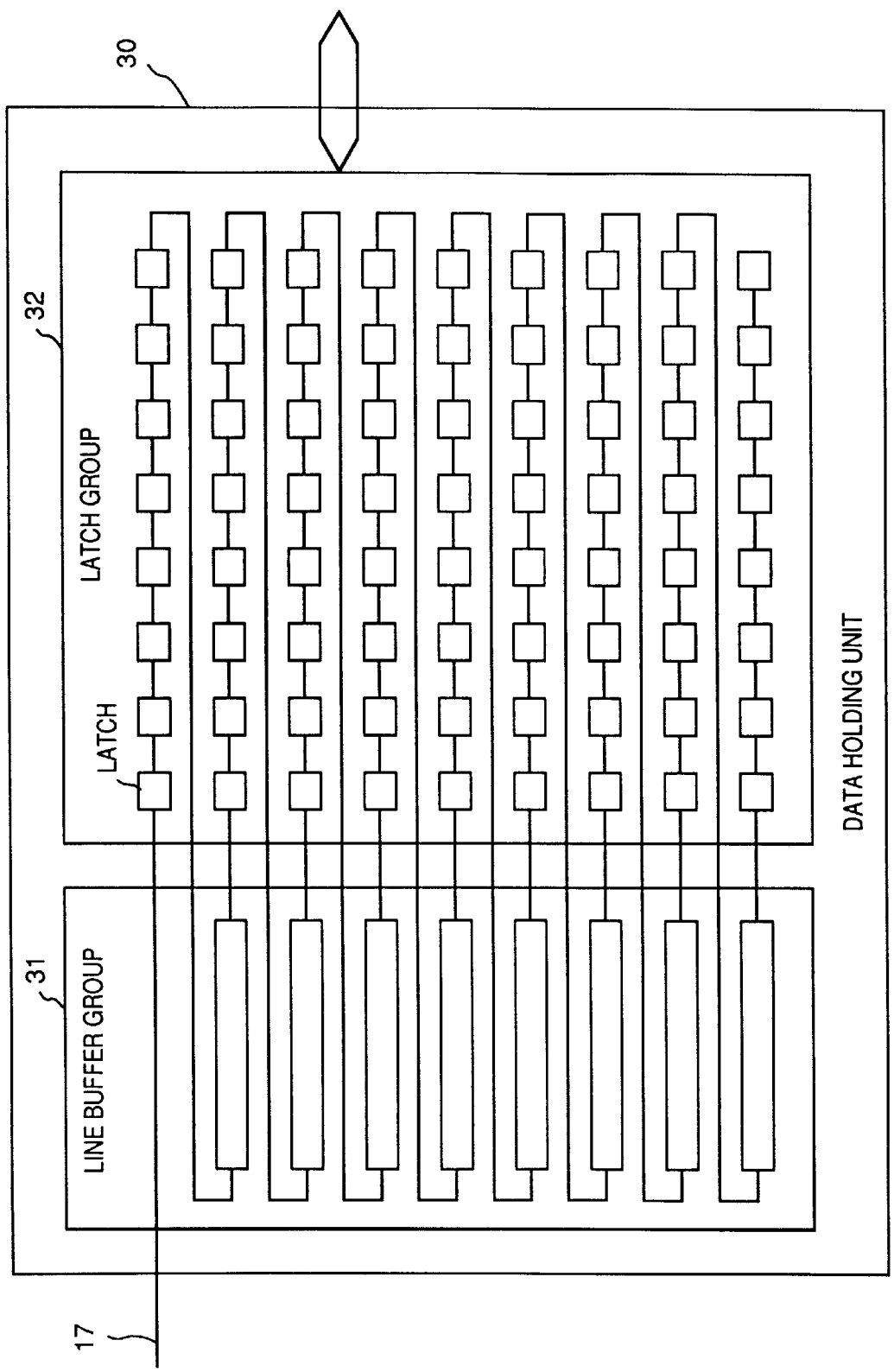
FIG. 7 is a block diagram showing the arrangement of a data holding unit of the image area separating unit.

FIG. 7 shows an arrangement of the data holding unit 30. Reference numeral 31 denotes a line buffer group, constituted by FIFOs, for holding data corresponding to seven rasters (scanning lines) immediately before the currently input raster; and 32, a latch group for storing/holding a total of 64 data, eight-pixel data per raster. Referring to FIG. 2, reference numeral 40 denotes an image area determining unit for determining, on the basis of the data of a pixel group including a target pixel and constituting a small area, which is output from the data holding unit 30, whether the target pixel in the small area should be considered as a pixel in a pseudo-halftone area. The image area determining unit 40 is constituted by three types of determining sections, i.e., an isolated pixel determining unit 41, a periodicity determining unit 42, and a high-frequency component determining unit 43, for respectively determining whether different conditions are satisfied. If at least one of the above conditions is satisfied, it is determined that the target pixel is a pixel in the pseudo-halftone area.

Figure 3:
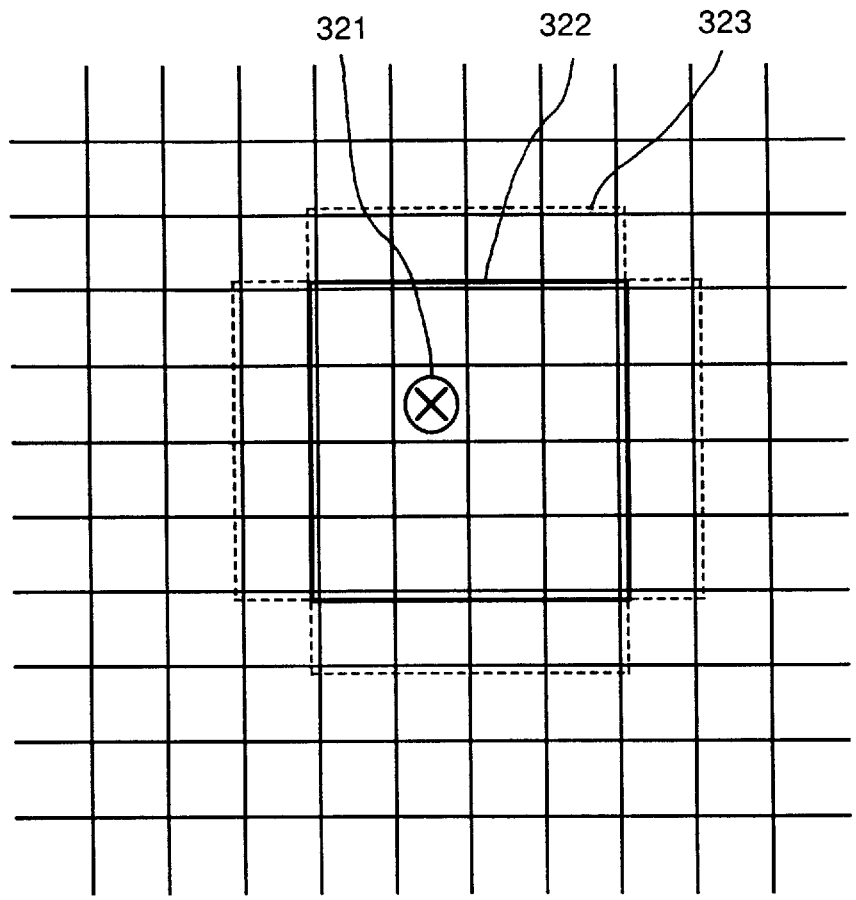
FIG. 3 is a view for explaining processing performed by an isolated pixel determining unit of the image area separating unit.
Figure 4:
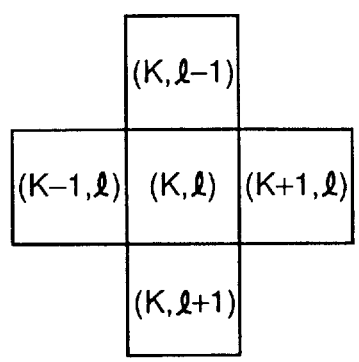
FIG. 4 is a view showing an area to be referred to by the isolated pixel determining unit.

The isolated pixel determining unit 41 performs determination processing with respect to each of 16 pixels in a 4×4 pixel area denoted by reference numeral 322 in FIG. 3, i.e., a width of four pixels in the main scanning direction and a width of four pixels in the subscanning direction. More specifically, as shown in FIG. 4, the isolated pixel determining unit 41 detects whether four pixels, i.e., upper, lower, left, and right pixels (a position (k,l−1) is an upper position; a position (k,l+1), a lower position; a position (k−1,l), a left position; and a position (k+1,l), a right position) are pixels of the same color (i.e., white or black pixels), and also differ in color from a pixel at a position (k,l). If each pixel in a 4×4 pixel area is set at the position (k,l), 16 results are obtained. If two or more results of these results satisfy the above condition, it is determined that a representative pixel 321 in the 4×4 pixel area 322 is in an isolated pixel area. That is, if the pixel 321 is a target pixel, it is checked whether two or more isolated pixels (i.e., an isolated pixel is a black or white pixel isolated from other pixels in the vertical and horizontal directions) are present in the 16 pixels in the adjacent pixel area 322. If two or more isolated pixels are present, it is determined that the target pixel 321 is located within an isolated pixel area. In determining whether each of the 16 pixels in the adjacent pixel area 322 is an isolated pixel, the isolated pixel determining unit 41 refers to each pixel value of an area (enclosing the 4×4 pixel area 322) consisting of 32 pixels enclosed with a broken line 323.

Assume that in determining an isolated pixel, the pixel value at a position (i,j) is V(i,j), V(i,j)=1 indicates a black pixel, and V(i,j)=0 indicates a white pixel. In this case, a determination result R(k,l) can be obtained by a logic circuit for executing the following logical expression:

$$R(k, l) = (V(k, l) \cdot NOTV(k, l-1) \cdot NOTV(k-1, l) \cdot$$
$$NOTV(k, l+1) \cdot NOTV(k+1, l)) + (NOTV(k, 1) \cdot V(k, l-1) \cdot$$
$$V(k-1, l) \cdot V(k, l+1) \cdot V(k+1, l))$$

In this expression, "·" indicates logical AND; "+", logical OR; and "NOT", inversion (negation) of logical value. The order of priority of operations is "NOT">"·">"+" (NOT is operated first).

Of the two terms of the right side of the above expression, the first term is operated to determine whether it is true that a target pixel is black and all adjacent pixels are not black pixels (i.e., all adjacent pixels are white pixels). The second term is operated to determine whether it is true that a target pixel is white, and all adjacent pixels are not white pixels (i.e., all adjacent pixels are black pixels). If one of the terms is true, the result (true=1) is returned to R(k,l). If it is determined that both the terms are false, the result (false=0) is returned to R(k,l).

In this manner, results "1" (indicating "true" determined by the above determination processing) of 16 results R(k,l) may be counted. In this case, 16 results R(k,l) may be input according to an LUT (look-up table) scheme, and "1" may be output when two or more of the results indicate "1".

The periodicity determining unit 42 determines whether four pixels (e.g., pixels A, B, C, and D indicated by hatching in FIG. 5), of 64 pixels in an 8×8 pixel area 324 having a width of eight pixels in the main scanning direction and a width of eight pixels in the subscanning directions, which are separated from each other by four pixels in the main scanning direction and/or separated from each other by four pixels in the subscanning direction have the same pixel value. The periodicity determining unit 42 performs such determination processing except for a case wherein all the 64 pixels are white or black pixels.

Figure 5:
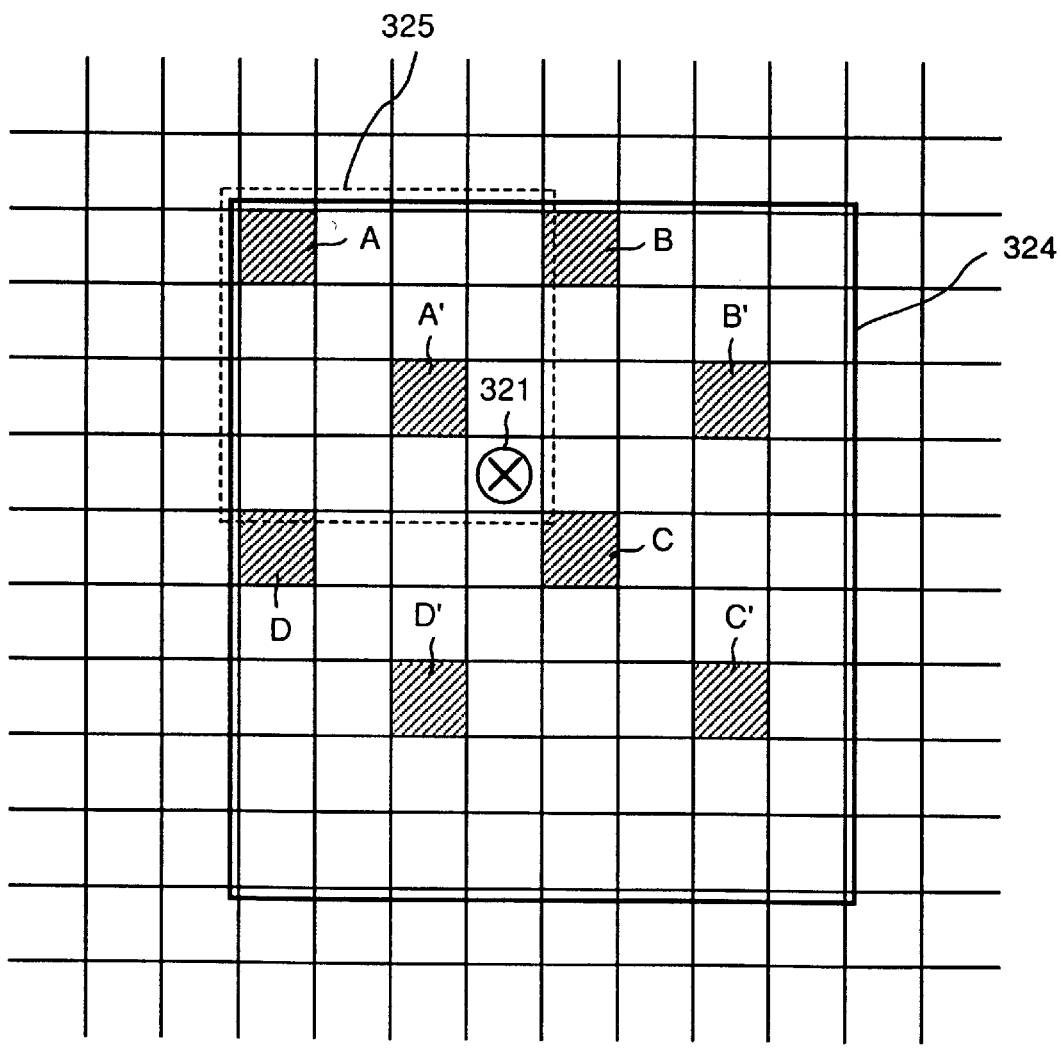
FIG. 5 is a view for explaining the contents of processing performed by a periodicity determining unit of the image area separating unit.

In a 64×64 pixel area, 16 combinations of four pixels having a relative position relationship like the one between the pixels A, B, C, and D can be defined. For example, a combination of pixels A', B', C', and D' shown in FIG. 5 is one of such combinations. That is, when the pixel A can be set at 16 positions in an area enclosed with a broken line 325, the positions of the pixels B, C, and D can be set accordingly while each pixel is kept relatively separated from the pixel A by four pixels in the main scanning and subscanning directions. Therefore, a total of 16 combinations are set. In this embodiment, it is checked for each of these 16 combinations whether the pixel values of four pixels are the same. It is also checked whether the above condition is satisfied in 14 or more combinations. If YES is obtained in this determination step, it is determined, except for a case wherein all the 64 pixels are white or black pixels, that a periodic portion (i.e., a dither portion) is present. If the value of the pixel A is expressed as V(m,n), the values of the pixels B, C, and D can be expressed as V(m+4,n), V(m+4,n+4), and V(m,n+4), respectively. A determination result S(m,n) indicating whether all the four pixels A, B, C, and D have the same pixel value can be given by the following logical expression. The meaning of this logical expression is apparent from the above description.

$$S(m,n)=V(m,n)\cdot V(m+4,n)\cdot V(m+4,n+4)\cdot V(m,n+4)+\text{NOT}(V(m,n)+V(m+4,n)+V(m+4,n+4)+V(m,n+4))$$

Of 16 results S(m,n) obtained in this manner, results indicating "1" are counted to check whether the number of such results is 14 or more. It is also checked whether all the 64 pixels have the same pixel value (the logical AND of all the 64 input pixel values is "1" or the logical OR thereof is "0"). In this case as well, instead of counting results, 16 results S(m,n) may be input by using an LUT, and "1" is output when 14 or more of the results indicate "1".

Figure 6:
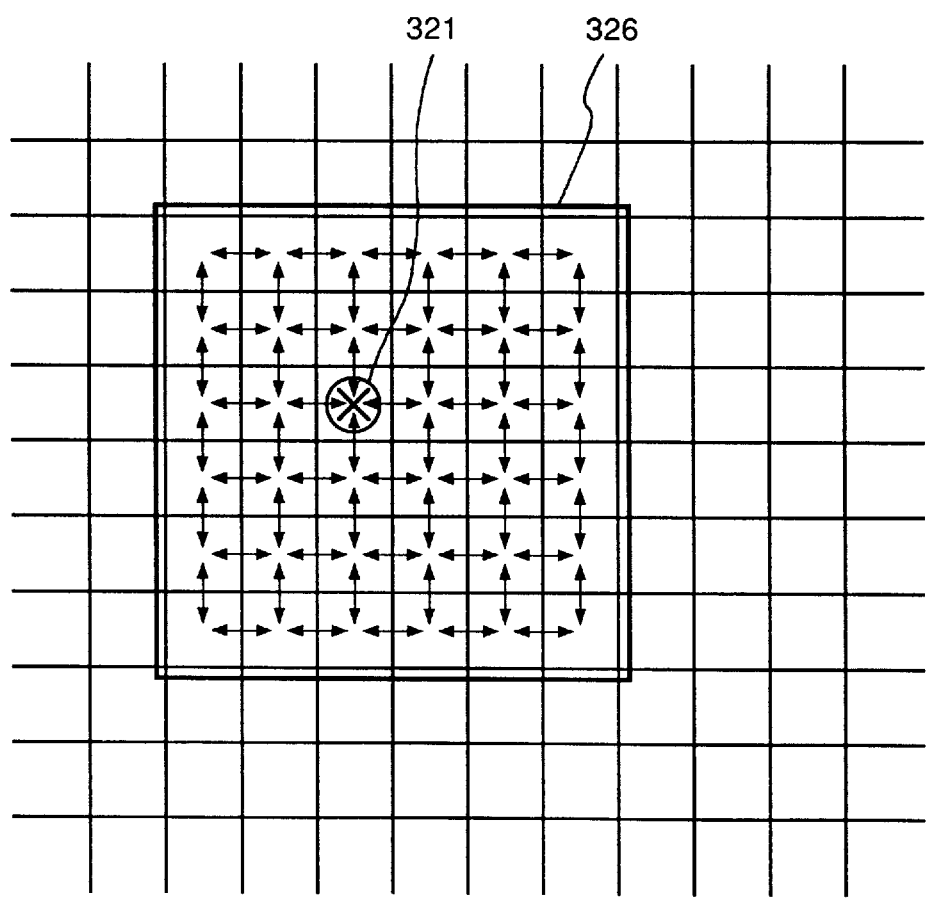
FIG. 6 is a view for explaining processing performed by a high-frequency component determining unit of the image area separating unit.

Consider 36 pixels in a 6×6 pixel area (denoted by reference numeral 326 in FIG. 6) having a width of six pixels in the main scanning direction and a width of six scanning lines in the subscanning direction. In this case, there are a total of 60 combinations of two pixels, i.e., 30 combinations (indicated by two-headed arrows in FIG. 6 in the horizontal direction) of two pixels adjacent to each other in the horizontal (main scanning) direction and 30 combinations (indicated by two-headed arrows in FIG. 6 in the vertical direction) of two pixels adjacent to each other in the vertical (subscanning) direction. The high-frequency component determining unit 43 checks whether there are 28 or more combinations of two adjacent pixels, of the 60 combinations, which have different pixel values. If there are 28 or more such combinations, the high-frequency component determining unit 43 determines that the area 326 is a high-frequency component area. Whether two different pixels have different pixel values can be easily determined by calculating the exclusive OR of the pixel values of the two pixels. 60 results are totalized by using a counter or several LUTs (e.g., four LUTs, each for totalizing 15 results) and an adder, and whether a totalization result is 28 or more can be determined by using a comparator. Referring back to FIG. 2, reference numeral 44 denotes a three-input OR circuit 44 for receiving outputs from the isolated pixel determining unit 41, the periodicity determining unit 42, and the high-frequency component determining unit 43 and outputting the logical OR of the outputs, as an output from the image area determining unit 40. That is, the OR circuit 44 (the image area determining unit 40) outputs a signal indicating that a target area is in a pseudo-halftone area when it is determined that the target pixel is located in at least one of the following areas: an isolated pixel area, a periodic pixel area, and a high-frequency component area.

A component image separating unit 50 receives an output signal from the image area determining unit 40 and a binary signal representing a target pixel, in the data holding unit 30, which is synchronized with the output signal (synchronization is established by a synchronization control circuit (not shown)), calculates/outputs the logical AND of the two inputs through an AND gate 51, and outputs the logical AND as the pseudo-halftone component image data 18. In addition, the logical NOT of the signal from the image area determining unit 40 is performed by a NOT circuit 52, and the logical AND of the resultant signal and the pixel value signal representing the target pixel is calculated by an AND gate 53 to be output as the character/line draw component image signal 19.

That is, if it is determined that a target pixel is black and located in a pseudo-halftone area, the target pixel (black pixel) is recognized as a pseudo-halftone component pixel. If it is determined that a target pixel is a black pixel and is not located in a pseudo-halftone area, the target pixel is recognized as a character/line draw component pixel. If a target pixel is a white pixel, both the signals 18 and 19 become "0".

The above description is associated with the arrangement of the image area separating unit 12 and the contents of processing performed by the unit 12. Note that the threshold values respectively used by the determining sections 41 to 43 in the image area separating unit 12 are not limited to those described above, but change in accordance with, e.g., the resolution of an input image and other states.

Figure 10:
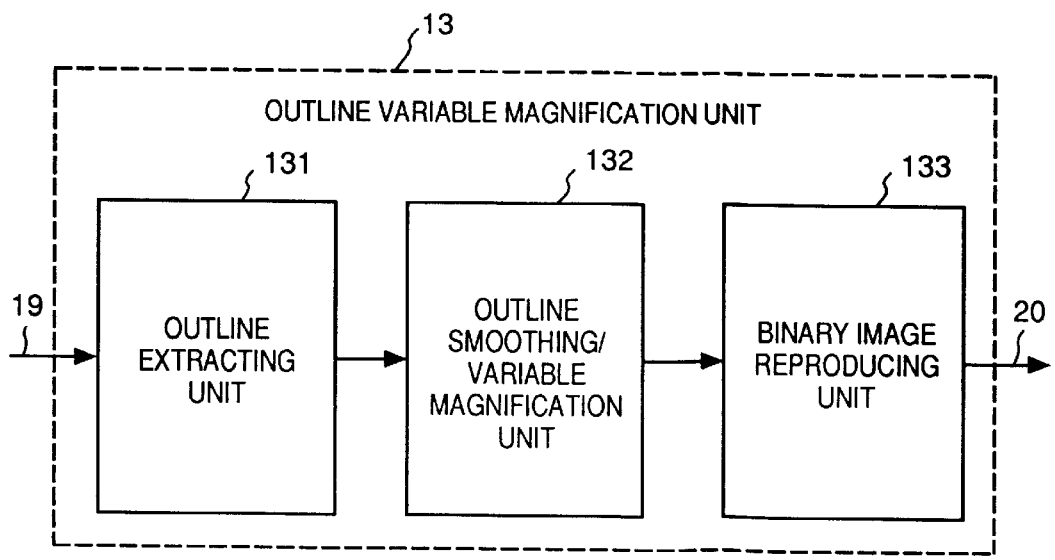
FIG. 10 is a block diagram showing the arrangement of an outline variable magnification unit in FIG. 1.

The outline variable magnification unit 13 in FIG. 1 can be constituted by, e.g., a device disclosed in Japanese Patent Application No. 3-345062 (filed by the assignee of the present application in Dec. 26, 1991). As shown in FIG. 10, the outline variable magnification unit 13 is constituted by an outline extracting unit 131, an outline smoothing/variable magnification unit 132, and a binary image reproducing unit 133. More specifically, in the outline variable magnification unit 13, the character/line draw component image signal 19 is received, and outline vectors (coarse contour vectors) are extracted from an image determined as a character/line draw component by the outline extracting unit 131. Outline vectors smoothly magnified at a desired (arbitrary) magnification in the state of the extracted outline vector expression are formed by the outline smoothing/variable magnification unit 132. A binary image is then reproduced from the smoothly magnified outline vectors by the binary image reproducing unit 133. With this processing, a high-quality character/line draw component image magnified at a desired (arbitrary) magnification is formed.

The pseudo-halftone variable magnification unit 14 receives the pseudo-halftone component signal 18, and magnifies an image, determined as a pseudo-halftone component, at a desired magnification (equal to a magnification used by the outline variable magnification unit), thereby generating a high-quality magnified pseudo-halftone image.

Figure 8:
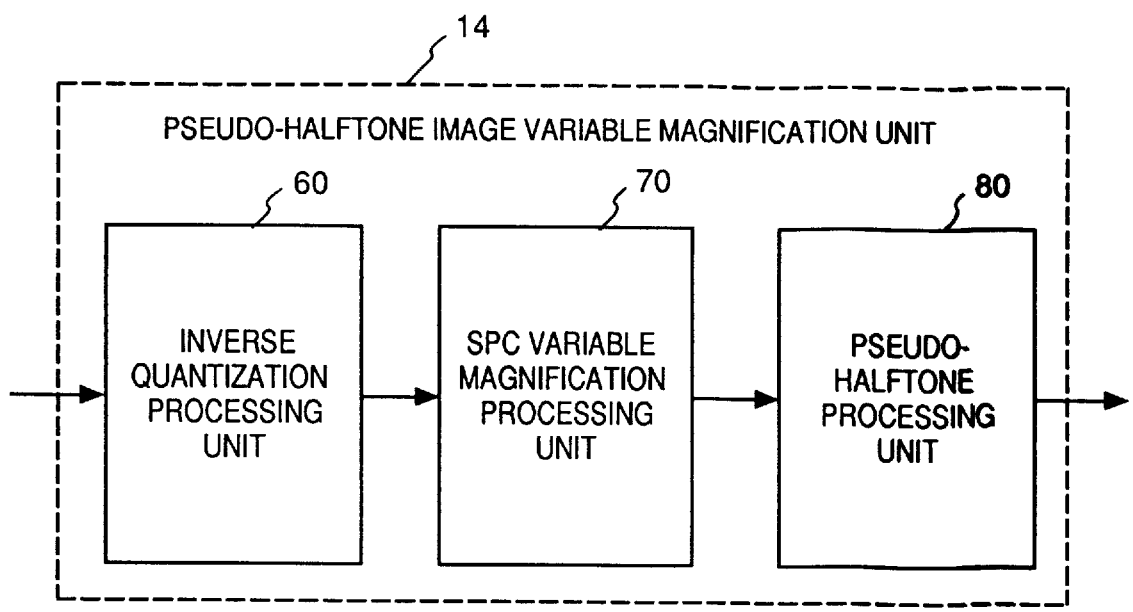
FIG. 8 is a block diagram showing the arrangement of a pseudo-halftone image variable magnification unit in FIG. 1.
Figure 9:
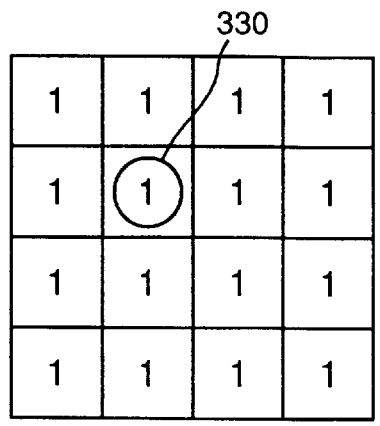
FIG. 9 is a view for explaining inverse quantization processing in the pseudo-halftone image variable magnification unit.

FIG. 8 shows the details of the pseudo-halftone variable magnification unit 14. Reference numeral 60 denotes an inverse quantization processing unit for temporarily restoring a pseudo-halftone image as a binary image to a multivalue image. As shown in FIG. 9, the inverse quantization processing unit 60 refers to, e.g., 16 adjacent pixels around a target pixel 330 to calculate the sum total of the product of the 16 pixels and 16 corresponding coefficients, and obtains a multivalue pixel value temporarily restored from the target pixel on the basis of the calculation result.

When, for example, a binary pixel is to be converted into a multivalue pixel value corresponding to eight bits (256 gradations), the input binary data (indicating "0" or "1") of 16 pixels may be multiplied by 256/16 (=16) ("0" or "16" is obtained as a result), and the sum total of the 16 products may be used as the multivalue data of the target pixel. In this case, the multivalue data of each target pixel takes a value, "0", "16", "32", . . . . As is apparent, a coefficient by which a binary pixel is multiplied may be weighted.

In this inverse quantization processing, processing is performed while the target pixel position is sequentially moved in the raster scanning order, as in the processing performed by the image area separating unit. That is, multivalue outputs obtained by inverse quantization are output in the raster scanning order. In addition, the sum total of the products of 16 pixels around a target pixel and 16 corresponding coefficients can also be obtained by counting black pixels in a 16-pixel area (in this case, the calculation result is reproduced in 17 gradation levels from "0" to "16".

The output, i.e., the multivalue pixel data, from the inverse quantization processing unit 60 is magnified at a desired magnification (equal to a magnification used by the outline variable magnification unit) by an SPC variable magnification processing unit 70. SPC variable magnification processing is basically known variable magnification processing of repeatedly outputting the same input pixel value to enlarge an image or thinning the same input pixel value to reduce an image, the number of times corresponding to a desired magnification. For example, this processing is disclosed in Matsumoto, Kobayashi, et al., "Study on the Effect of the Resolution Conversion on Picture Quality", The Proceedings of the Institute of Image Electronics Engineers National Conference, No. 27, 1982). In an enlarging operation, pixels are interpolated. In this case, the density of a pixel (interpolation pixel) to be interpolated may be calculated by adding the pixel data of two pixels on both sides of the interpolating position, and dividing the sum by two.

A pseudo-halftone processing unit 80 binarizes the multivalue image data, which has undergone SPC variable magnification, again to obtain magnified binary image data. The pseudo-halftone processing unit 80 is constituted by, e.g., a known error diffusion processing circuit or a dither processing circuit. These pseudo-halftone processes are disclosed in, for example, "Color Hard Copy Image Processing Technique", TRICEPS, WHITE SERIES, No. 114 (1990), pp. 33–48.

The output (binary data) from the pseudo-halftone processing unit 80 serves an output from the pseudo-halftone image variable magnification unit 14, to a signal line 21.

The binary image data obtained from a signal line 20 upon outline variable magnification processing and the binary image obtained from the signal line 21 upon different variable magnification processing are synthesized by the synthesizing unit 15.

Figure 11:
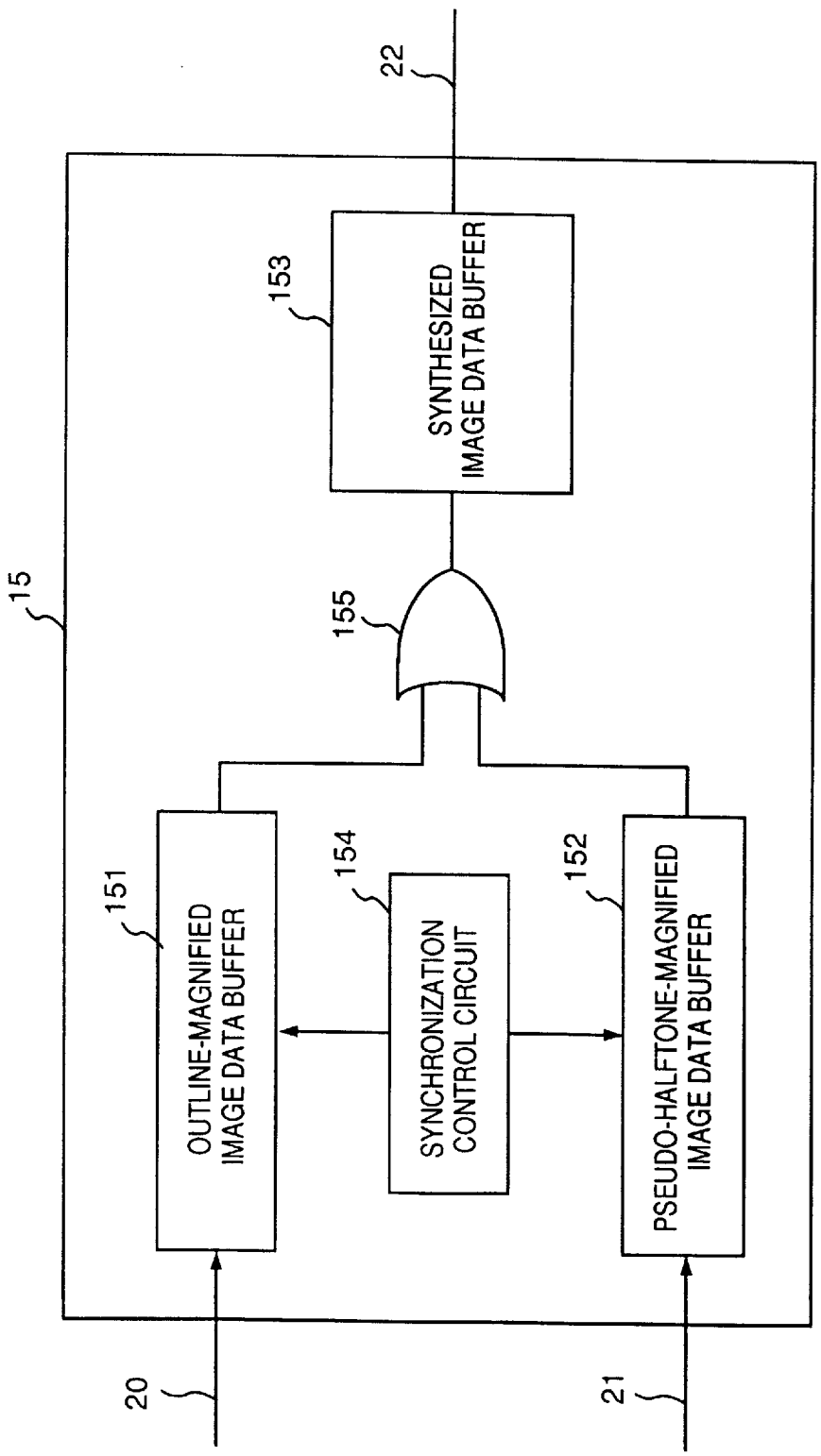
FIG. 11 is a block diagram showing the arrangement of a synthesizing unit in FIG. 1.

FIG. 11 shows the arrangement of the synthesizing unit 15. Referring to FIG. 11, reference numeral 151 denotes an image data buffer for image data which has undergone outline variable magnification processing. The image data buffer 151 serves to hold binary image data obtained from the outline variable magnification unit 13 via the signal line 20 upon outline variable magnification processing. Reference numeral 152 denotes an image data buffer for image data which has undergone pseudo-halftone variable magnification processing. The image data buffer 152 serves to hold the binary image obtained from the pseudo-halftone image variable magnification unit 14 via the signal line 21 upon variable magnification processing. Reference numeral 153 denotes a synthesized image data buffer for temporarily holding image data obtained by synthesizing image data from the image data buffers 151 and 152; 154, a synchronization control circuit for performing synchronization control according to the raster scanning scheme to synchronously read out image data obtained by outline variable magnification processing and stored in the buffer 151 and image stored in the buffer 152. The magnified binary image data read out from the buffers 151 and 152 by the control of the synchronization control circuit 154 according to the raster scanning scheme are logically ORed by an OR circuit 155 for each pair of corresponding pixels. As a result, the binary image data are synthesized and temporarily stored in the image data buffer 153 according to the raster scanning scheme.

The binary image output unit 16 is constituted by a hard copy apparatus such as a laser beam printer or a thermal printer for receiving image data, obtained by variable magnification processing and stored in the image data buffer 153 in the synthesizing unit 15, via a signal line 22. The binary image output unit 16 records binary image data on a paper sheet and outputs it as a hard copy.

Second Embodiment

The binary image acquiring unit 11 in the above embodiment (first embodiment) need not be an image reader but may be a binary image receiving unit, such as the receiving unit of a facsimile apparatus, which receives a binary image from an external unit by using a communication unit. The binary image output unit 16 in the above embodiment need not be a hard copy unit but may be a binary image transmitting unit, such as the transmitting unit of a facsimile apparatus, which outputs a binary image (as coded data) to an external unit by using a communication unit. The binary image output unit 16 may be an interface unit for outputting binary image data to an external storage unit such as a magnetic disc, a display unit such as a display, or the like.

In addition, the binary image acquiring unit may be an interface unit for receiving binary image data from an external storage unit such as a magnetic disc or an optical disc.

Third Embodiment

Figure 12:
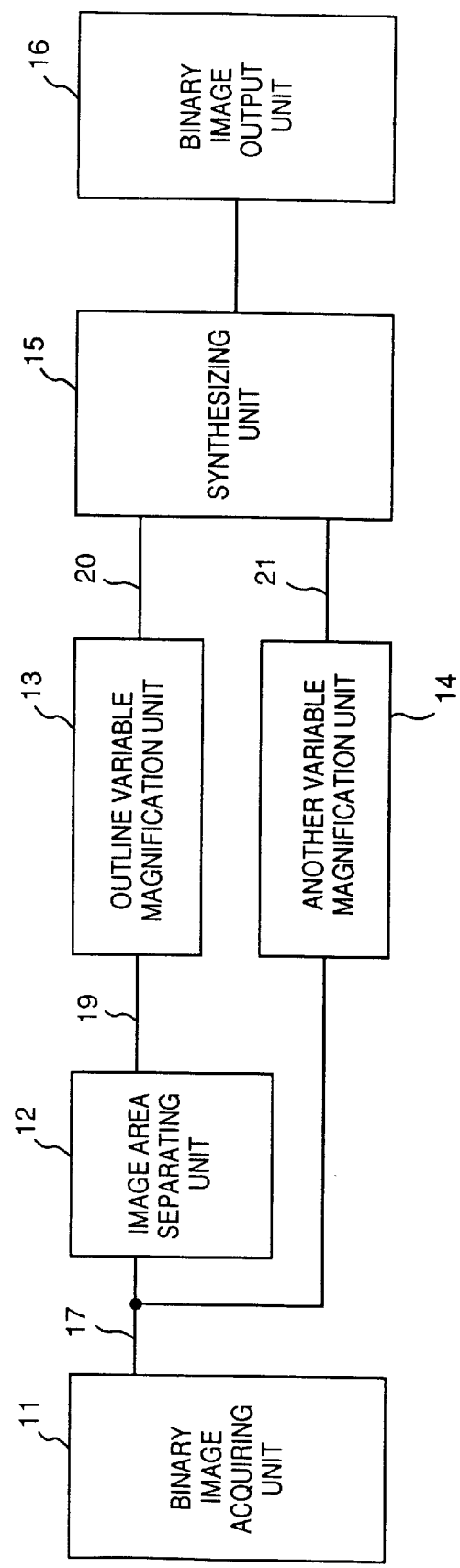
FIG. 12 is a block diagram showing the arrangement of an apparatus according to the third embodiment of the present invention.

The present invention can be realized by an arrangement shown in FIG. 12 in place of the arrangement of the first embodiment. That is, the output 17 from the binary image acquiring unit 11 may be directly input to the pseudo-halftone image variable magnification unit 14 in the first embodiment, instead of the output 18 from the image area separating unit 12. The effect obtained by this arrangement may be inferior to the effect obtained in the first embodiment. If, however, there are merits in terms of cost and processing speed depending on device design, the relationship in arrangement with other components, the manner of arranging other variable magnification unit, and the like, this arrangement may be employed.

Fourth Embodiment

Figure 13:
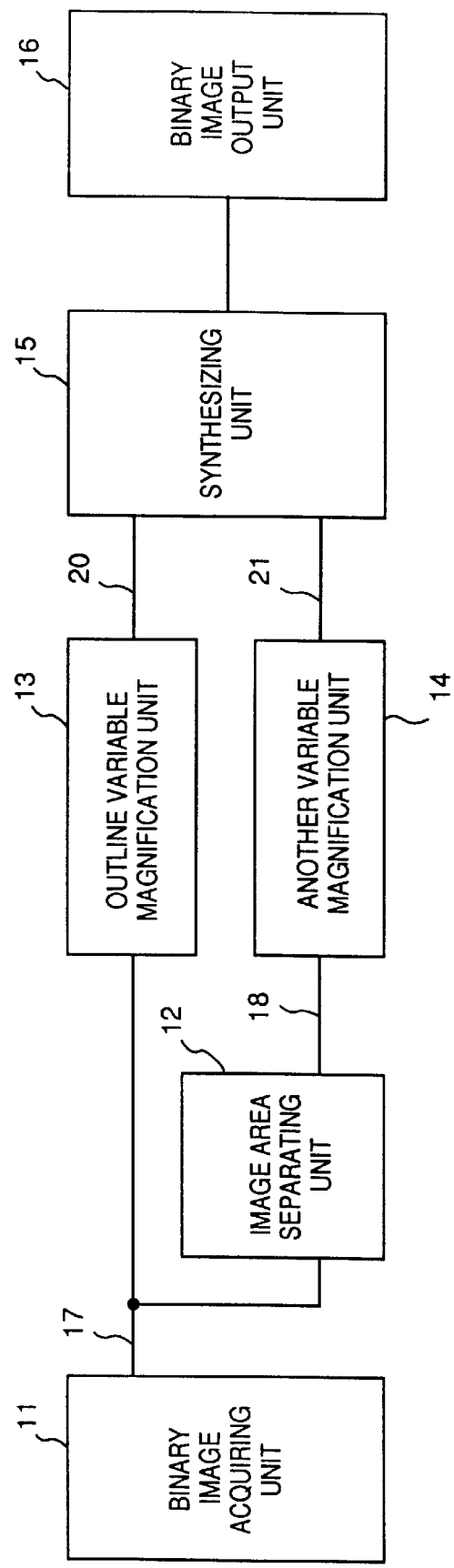
FIG. 13 is a block diagram showing the arrangement of an apparatus according to the fourth embodiment of the present invention.

The present invention can be realized by an arrangement shown in FIG. 13 in place of the arrangement of the first embodiment. That is, the output 17 from the binary image acquiring unit 11 may be directly input to the outline variable magnification unit 13 in the first embodiment, instead of the output 19 from the image area separating unit 12. Other operations are the same as those in the first embodiment. The effect obtained in this arrangement may be slightly inferior to the effect obtained in the first embodiment. If, however, there are merits in terms of cost and processing speed depending on device design, the relationship in arrangement with other components, the manner of arranging other variable magnification unit, and the like, this arrangement may be employed.

Fifth Embodiment

The pseudo-halftone processing unit 80 constituting the pseudo-halftone image variable magnification unit 14 of the above-described embodiments may use a mean density retention method (MD method) described in NIKKEI ELECTRONICS, 1992. 5. 25 Issue (No. 555), pp. 207–210.

Sixth Embodiment

The pseudo-halftone image variable magnification unit 14 may simply magnify the pseudo-halftone component image 18, as binary image data, by SPC processing without temporarily converting the image 18 into a multivalue image by inverse quantization, and outputs, as the output 21, the binary image data obtained by the SPC variable magnification processing.

In this case, the corresponding portion is simplified so that fairly good image quality can be realized at a low cost.

Seventh Embodiment

The coefficient matrix in the inverse quantization processing unit in the pseudo-halftone image variable magnification unit 14 in each of the first to fifth embodiments is not limited to a size of 4×4 pixels like the one described with reference to FIG. 9. For example, the coefficient matrix may have a size of 8×8 or 5×5 pixels, as shown in FIG. 25, or may have a general size of m×n (m and n are integers) pixels such as a size of 6×4 pixels. In addition, all the coefficients need not be "1", but may have different values. For example, as shown in FIG. 26, coefficients corresponding to pixels closer to a target pixel may have larger values. If the size of a coefficient matrix is set in accordance with the number of gradation levels of the pseudo-halftone expression of an original image, reproduction of a more faithful multivalue image can be expected. However, such an operation leads to an increase in cost. Therefore, it is preferable that the size of a coefficient matrix be properly selected.

The present invention may be applied to a system constituted by a plurality of devices or an apparatus constituted by one device. As is apparent, the present invention can be applied to a case wherein the above-described effects can be obtained by supplying programs to a system or an apparatus.

It is apparent, therefore, the present invention can be constituted by, e.g., a scanner unit for reading an original image, a host computer for processing the read image data, and a printer for forming an output image.

Variable magnification processing in each embodiment described above is performed for processing (resolution conversion processing) of equalizing the sizes of images having different resolutions, as in the case wherein an image input by the binary image acquiring unit 11 is different in resolution from an output from the binary image output unit 16, in addition to enlargement and reduction of images.

As described above, according to the first aspect of the present invention, when an image is to be magnified and output, a high-quality image can be obtained as a result of variable magnification processing by performing proper variable magnification processing with respect to a character/line draw component and a pseudo-halftone component, respectively.

In addition, each image area is variably magnified by two independent variable magnification processes instead of one variable magnification processing, and at least some portion of an image can be variably magnified by one variable magnification process demanding low memory consumption in place of the other variable magnification process demanding high memory consumption. Therefore, the overall memory consumption can be suppressed low.

Eighth Embodiment

FIG. 27 is a block diagram showing the functional arrangement of a high-image-quality resolution conversion apparatus using an outline smoothing method according to the eighth embodiment of the present invention.

Referring to FIG. 27, reference numeral 2100 denotes an image input unit for receiving binary image data in the form of a bit map according to the raster scanning scheme, and outputs the data to an outline extracting unit on the next stage. For example, the image input unit 2100 is realized by an image reader for reading an original image by a scanner, binarizing the read image, and outputting the binary data according to the raster scanning scheme, or an image decoding unit for demodulating coded image data received in an image communication unit via communication line and decoding the data into image data in the form of a bit map. Reference numeral 2107 denotes an image output unit for outputting a binary image obtained upon completion of high-image-quality resolution conversion. This image output unit is realized by a known laser beam sprinter, an image output unit (printer unit) for printing out an image received in an image processing communication unit, or the like.

Reference numeral 2101 denotes an outline extracting unit for extracting contour vectors along the contour of a black image (in a case wherein a binary image is constituted by a white or black image) of the binary image data input from the image input unit 2100. Extraction of contour vectors is performed in the same manner as described above, and hence a description thereof will be omitted.

In the image processing apparatus of the eighth embodiment, since isolated points, fine curves, or the like are detected by a contour vector counter 2104 (to be described later), isolated points, fine curves, or the like need not be smoothed in the first smoothing processing (first smoothing unit 2102).

Referring back to FIG. 27, reference numeral 2103 denotes a variable magnification unit for magnifying an output image from the first smoothing unit 2102 after the first smoothing processing at an arbitrary magnification. In this variable magnification processing, if contour vector data after the first smoothing processing are given as coordinate data, each coordinate data may be magnified at a desired magnification.

The contour vector counter 2104 counts contour vectors per vector loop. A large portion of a pseudo-halftone image is constituted by discontinues images such as isolated points and fine curves. In contrast to this, in a character/line draw image, image areas constituted by black pixels are relatively continuous. That is, in a pseudo-halftone image, the number of contour vectors constituting one vector loop is relatively small, whereas in a character/line draw image, the number of contour vectors constituting one vector loop is large.

If isolated points and fine curves of a pseudo-halftone portion are subjected to smoothing processing, the density value of the pseudo-halftone portion changes, resulting in a deterioration in image quality after resolution conversion. This phenomenon becomes conspicuous especially in the second smoothing processing described above. For this reason, the contour vector counter 2104 counts contour vectors constituting one vector loop, and determines whether to perform the second smoothing processing in accordance with the number of vectors.

The number of vectors as a reference must be set to be relatively small. This is because isolated points and fine curves constituting a pseudo-halftone image are constituted by a contour vector loop consisting of a relatively small number of contour vectors. In this embodiment, the reference number is set to be about 32. However, the reference number is not specifically limited and may be changed in accordance with the type of an image. If the number of contour vectors counted is smaller than a reference value, the contour vector counter 2104 determines that the contour vector loop is constituted by isolated points, fine curves, or the like constituting a pseudo-halftone image. Consequently, the second smoothing processing is not performed. In contrast to this, if the number of contour vectors counted is larger than the reference value, the contour vector counter 2104 determines that the contour vector loop is an image area other than an area consisting of isolate points, fine curves, or the like. As a result, the second smoothing processing is performed by a second smoothing unit 2105.

The first smoothing processing performed by the first smoothing unit 2102 described above is smoothing processing by unit of pattern matching. In contrast to this, in the second smoothing processing performed by the second smoothing unit 2105, weighted mean processing of the coordinated data of a target contour vector and the coordinate data of contour vectors before and after the target contour vector is performed to smooth an image. This second smoothing processing is performed in units of contour vector loops, as described above.

FIG. 24 is a view for explaining weighted mean processing in the second smoothing processing. Referring to FIG. 24, marks ⊚ (contour vector coordinates P0 and P4) are contour vector coordinates designated as corner points for which the second smoothing processing is not performed. In this case, if the end portion of a corner portion in an image is subjected to the second smoothing processing, the sharpness of the image may be lost. A corner point is designated in the pattern matching process in the first smoothing processing described above to prevent the second smoothing processing from being performed with respect to such a portion. Other contour vector coordinates P1, P2, and P3 indicate contour vector coordinates to be subjected to the second smoothing processing.

When weight mean processing is performed in the second smoothing processing, uneven portions between the contour vector coordinates designated as the corner points are eliminated to obtain a smoothing effect (as if the respective contour vector coordinates were connected to each other via a string, and the string was pulled from both the sides thereof). That is, the contour vector coordinates P1, P2, and P3 respectively move to Q1, Q2, and Q3. Therefore, in the second smoothing processing, especially the spaces between fine curves expressing a pseudo-halftone portion may be narrowed or expanded. As a result, if resolution conversion is performed by an outline smoothing method, the density of an image as a pseudo-halftone portion may not be maintained. The contour vector counter 2104 prevents the second smoothing processing from being performed with respect to isolated points, fine curves, or the like expressing a pseudo-halftone image, thereby preventing a change in density of a pseudo-halftone portion.

As described above, the contour vector counter 2104 in FIG. 27 counts contour vectors constituting one contour vector loop. If this count value is larger than a reference value, the second smoothing processing is performed. Otherwise, the following binary image reproduction is performed without performing the second smoothing processing.

Reference numeral 2106 denotes a binary image reproducing unit for reproducing a binary image from contour coordinate data. As described above, contour vector data after variable magnification/smoothing processing is just a boundary indicating a contour portion, of an image, assumed between white pixels and black pixels, but does not form a binary image without any modification. Therefore, the process of reproducing a binary image by painting the inside of a vector loop constituted by contour vectors in black (replacing white pixels with black pixels) is required.

Figure 32:
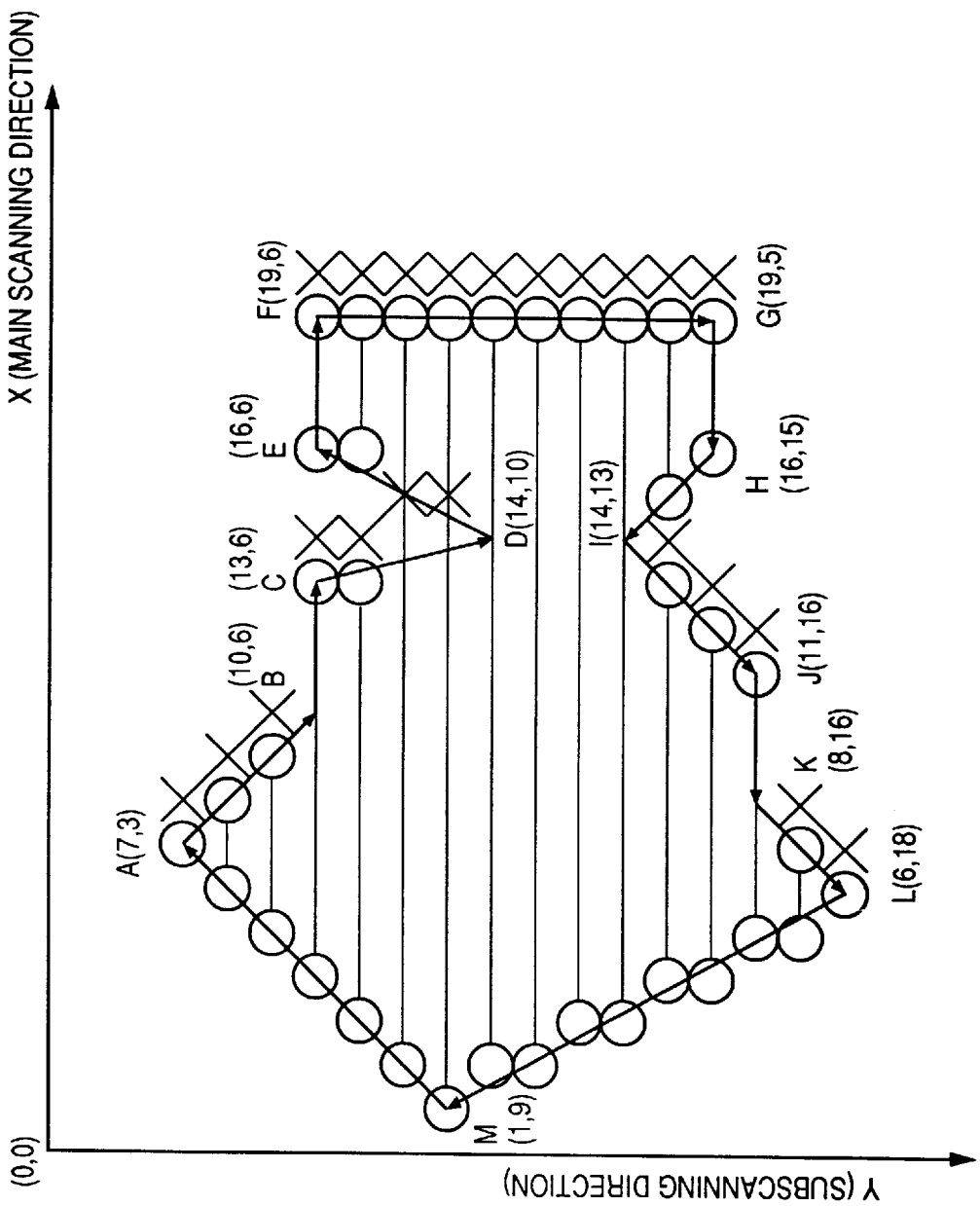
FIG. 32 is a view for explaining binary image reproduction processing in the ninth embodiment of the present invention.

FIG. 32 is a view for explaining binary image reproduction processing performed by the binary image reproducing unit 2106.

Referring to FIG. 32, reference symbols A to M denote contour vector coordinates. There are a total of 12 contour vectors, which constitute one contour vector loop. There are two methods of painting the inside of this contour vector loop: a method of defining boundary points (contour points defined on contour vectors and located on boundaries between images) on vectors while performing raster scanning, and determining/defining a white or black pixel every time a boundary point appears; and a method of defining all boundary points on a contour vector loop in advance, and replacing the inside of an area enclosed with the boundary points with black pixels at once. Either method can basically reproduce a binary image, but may not properly reproduce a binary image on the basis of contour vector coordinate points and the like located on horizontal vectors or end points of an image.

More specifically, if boundary points are defined on horizontal vectors, and a binary image is reproduced while raster-scanning the boundary points, black and white pixels are alternately produced. As a result, an image like an image constituted by dotted lines is reproduced. On the other hand, since only one boundary point is defined with respect to an end point of an image, a black horizontal line may be reproduced. For this reason, the binary image reproducing unit 2106 in the eighth embodiment employs a method of properly performing binary image reproduction with respect to a special case (horizontal vectors and end points of an image) by pattern matching in addition to the above-described technique. More specifically, a horizontal vector or an end point is detected by vector pattern matching, and an exceptional case is applied to only this detected portion. In an exceptional case of a horizontal vector, boundary points are defined at only the start and end points of the vector. With regard to an end point, two boundary points are continuously defined.

The above description is associated with the processing unit and process of the high-image-quality resolution conversion method using the outline smoothing method.

According to this method, in the contour vector counter 2104, the number of contour vectors constituting one contour vector loop is not specifically limited, but can be arbitrarily set in advance in accordance with the type of an image, thereby allowing high-image-quality resolution conversion with respect to various types of pseudo-halftone images (e.g., dither images and images obtained by the error diffusion method).

By using another known area determining method in addition to the above method, an image in a pseudo-halftone area and an image in a character/line draw area can be more reliably discriminated, and high-image-quality resolution conversion, which is the object of this embodiment, can be more properly performed.

The high-image-quality resolution conversion method using the outline smoothing method of this embodiment can be used for any image processing apparatus which performs resolution conversion. The ninth embodiment described next is associated with an image processing apparatus using the method of the eighth embodiment.

Ninth Embodiment

A high-image-quality resolution conversion method using an outline smoothing method according to the ninth embodiment can be applied to a case wherein an image having a specific low resolution, which is received in an image processing communication apparatus such as a facsimile apparatus, is converted into image data having a high resolution by resolution conversion in accordance with a printer to be printed out.

Figure 33:
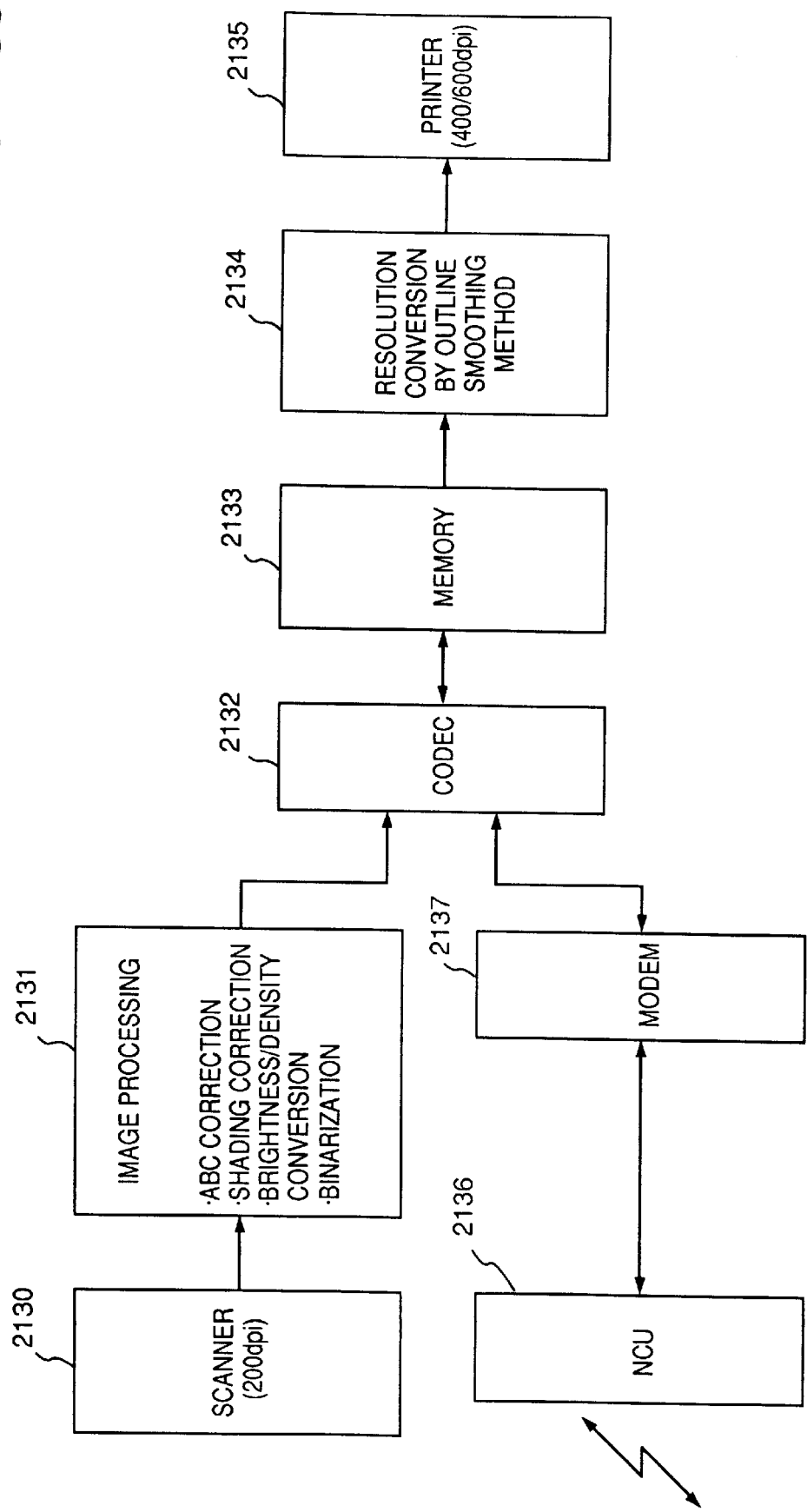
FIG. 33 is a block diagram showing the schematic arrangement of an image processing apparatus using an outline smoothing method according to the tenth embodiment of the present invention.

FIG. 33 is a block diagram showing the arrangement of an image processing communication apparatus to which the resolution conversion method using the outline smoothing method according to the ninth embodiment is applied.

Referring to FIG. 33, reference numeral 2130 denotes a scanner. The resolution of the scanner 2130 is not set to be very high but is set to be, e.g., about 200 dpi at most to minimize the transmission time of a read image. Reference numeral 2131 denotes an image processing unit for performing various kinds of image processing, e.g., ABC correction, shading correction, brightness/density conversion processing, and binarization processing. ABC correction is performed to correct a change in intensity of a read signal with a deterioration in a light source over years. Shading correction is performed to equalize the intensities of signals read at the central and end portions of the read portion of the scanner 2130. Brightness/density conversion is performed to convert read image data as brightness data into density data to be printed out. Binarization processing is performed to convert a read signal having a gradation level into image data having one (white or black) of the two gradation levels. As a method of performing this binarization processing, a known error diffusion method or dither method is available.

Figure 34:
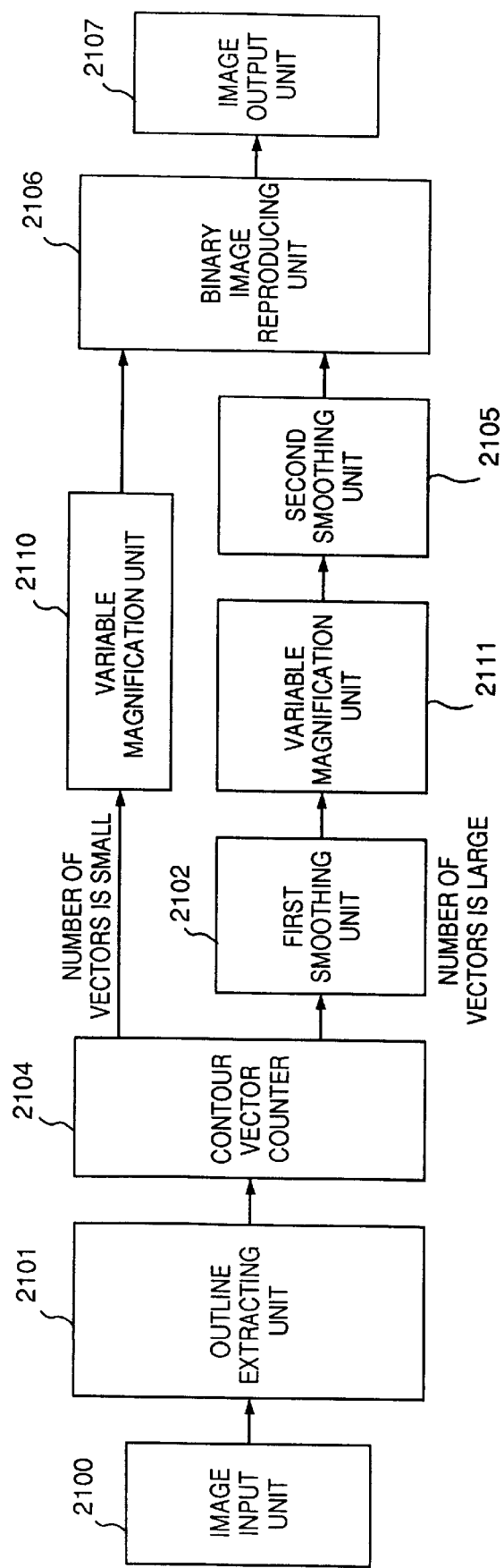
FIG. 34 is a block diagram showing the schematic arrangement of the image processing apparatus using the outline smoothing method according to the tenth embodiment.

Reference numeral 2132 denotes an encoding/decoding unit for compressing/expanding image information; 2133, a memory for temporarily storing image data received via a MODEM 2137; and 2134, a resolution converter having, for example, the arrangement shown in FIG. 27 or 34 (from which the image input unit 2100 and the image output unit 2107 are omitted). The resolution converter 2134 performs resolution conversion by using the outline/smoothing method. Since the recording density in a printer 2135 is generally higher than the reading density in the scanner 2130, resolution conversion of an image must be performed immediately before it is output from the printer 2135. As the printer 2135, a printer having a higher resolution than a scanner is generally used to output a beautiful image. In this case, the resolution of the printer 2135 is set to be 400 or 600 dpi.

Reference numeral 2136 denotes an NCU (Network Control Unit) for controlling connection to a communication line. Most facsimile apparatuses not only print out read image by themselves but also receive an image from a communication line to print out it. The NCU 136 serves to perform matching between this communication line and the facsimile apparatus at the time of connection. The MODEM 2137 modulates/demodulates image data to allow transmission/reception thereof via a communication line.

In the above arrangement, all the components other than the resolution converter 134 using the outline smoothing method are known portions in, e.g., a facsimile apparatus.

As described above, the resolution of a read image is often different from the resolution of the printer 2135 in a case wherein an original image is to be read by the scanner 2130 and is to be directly output to the printer 2135, or a case wherein the NCU 2136 is to output a received image to the printer 2135. Assume that a G3 facsimile apparatus is used. In this case, when the resolution of the printer 2135 is 400 dpi, the resolution of image data must be converted at a magnification of 2×4 (main scanning×subscanning) in a standard mode, or at a magnification of 2×2 in a fine mode. When the resolution of the printer 2135 is 600 dpi, the resolution of image data must be converted at a magnification of 3×6 in the standard mode, or at a magnification of 3×3 in the fine mode.

In the conventional facsimile apparatus as well, a known resolution conversion method is used. In the ninth embodiment, however, a resolution conversion method using the outline smoothing method is used in place of the conventional resolution conversion method. With this method, resolution conversion can be realized while high image quality is maintained, which cannot be realized by the conventional method. In addition, in a facsimile apparatus, a photographic image or the like as a pseudo-halftone expression is sometimes received. By applying the resolution conversion method using the outline smoothing method according to the embodiment to such a case, resolution conversion with high image quality can be performed with respect to a pseudo-halftone image.

Tenth Embodiment

In addition to the arrangement of the embodiment shown in FIG. 27, the arrangement of an image processing apparatus which can realize high-image-quality resolution conversion by using the outline smoothing method is shown in FIG. 34. The same reference numerals in FIG. 34 denote the same parts as in FIG. 27, and a description thereof will be omitted.

In the eighth embodiment, extracted contour vector coordinate data which has undergone outline smoothing is smoothed by the first smoothing unit 2102, and the second smoothing processing is selectively performed depending on the number of contour vectors. In the tenth embodiment, a first smoothing unit, a variable magnification unit, and a second variable magnification unit are systematically selected in accordance with the number of contour vectors constituting one contour vector loop.

As described above, isolated points, fine curves, and the like constituting a pseudo-halftone image are used for a pseudo-expression of the density of the pseudo-halftone image. Preferably, these elements are not be removed or smoothed. In the eighth embodiment, the first smoothing unit 2102 performs smoothing of pattern images other than isolated point removal patterns or smoothing patterns such as fine curves. In the tenth embodiment, however, any limitations need not be imposed on smoothing patterns because a contour vector counter 2104 is used before the first smoothing unit.

Referring to FIG. 34, the contour vector counter 2104 receives contour vector data extracted by an outline extracting unit 2101. When the image data is input to the contour vector counter 2104, the first smoothing processing has not been performed by the first smoothing unit 2102.

The contour vector counter 2104 counts contour vectors constituting each contour vector loop, and classifies vector loops into vector loops to be subjected to smoothing/variable magnification processing and vector loops to be simply magnified. More specifically, when the number of contour vectors constituting a vector loop is small, the contour vector counter 2104 directly outputs the contour vector data to a variable magnification unit 2110 so as to perform variable magnification processing of the data. When the number of contour vectors constituting a vector loop is large, the contour vector counter 2104 outputs the contour vector data to the first smoothing unit 2102 to execute the above-described processing through a variable magnification unit 2111 and a second smoothing unit 2105.

When one of the procedures for processing is selected by the contour vector counter 2104, each portion of the above-described embodiment is applied. Note that the first smoothing unit 2102 need not omit isolated point removal patterns and smoothing patterns such as fine curves, unlike in the eighth embodiment. The variable magnification unit 2111 uses the method of performing resolution conversion by multiplying contour vector coordinate data by a magnification as in the eighth embodiment.

The variable magnification unit 2110 serves to perform variable magnification processing of isolated points, fine curves, and the like constituting a pseudo-halftone portion, and may use the method of performing resolution conversion by multiplying contour vector coordinate data by a magnification. However, the variable magnification unit 2110 preferably magnifies the data while maintaining the density of the pseudo-halftone portion by using some density maintaining/variable magnification processing.

The tenth embodiment has been described above. The tenth embodiment can also prevent the second smoothing processing from being performed with respect to isolated points, fine curves, and the like constituting a pseudo-halftone portion. Therefore, the same effects as those of the eighth embodiment can be obtained.

The present invention may be applied to a system constituted by a plurality of devices or an apparatus constituted by one device. As is apparent, the present invention can be applied to a case wherein the above-described effects can be obtained by supplying programs to a system or an apparatus.

The eighth to tenth embodiments have been independently described above. However, these embodiments may be singly executed, or the constituent elements of the embodiments may be properly combined with each other.

As has been described above, according to this embodiment, in performing outline smoothing processing, smoothing processing is not performed with respect to isolated pixels, fine curves, and the like constituting a pseudo-halftone portion, while smoothing processing is performed with respect to a character/line draw image exhibiting a large number of contour vectors constituting each contour vector loop in the same manner as in the prior art, thereby realizing high-image-quality resolution conversion.

Resolution conversion, therefore, can be performed while the density value of a pseudo-halftone portion expressing pseudo-halftone is maintained. Hence, the high-image-quality resolution conversion method using the outline smoothing method can be applied to a pseudo-halftone image as well.

By applying the outline smoothing processing according to this embodiment to a facsimile apparatus, even a received or read pseudo-halftone image can be output to a high-resolution printer to print a high-quality image.

As described above, according to the present invention, the halftone density of image data can be maintained even after smoothing processing or resolution conversion.

In addition, according to the present invention, since resolution conversion is performed while no smoothing processing is performed with respect to isolated pixels and corner portions, the density of the image data upon resolution conversion can be maintained.

Eleventh Embodiment

Figure 35:
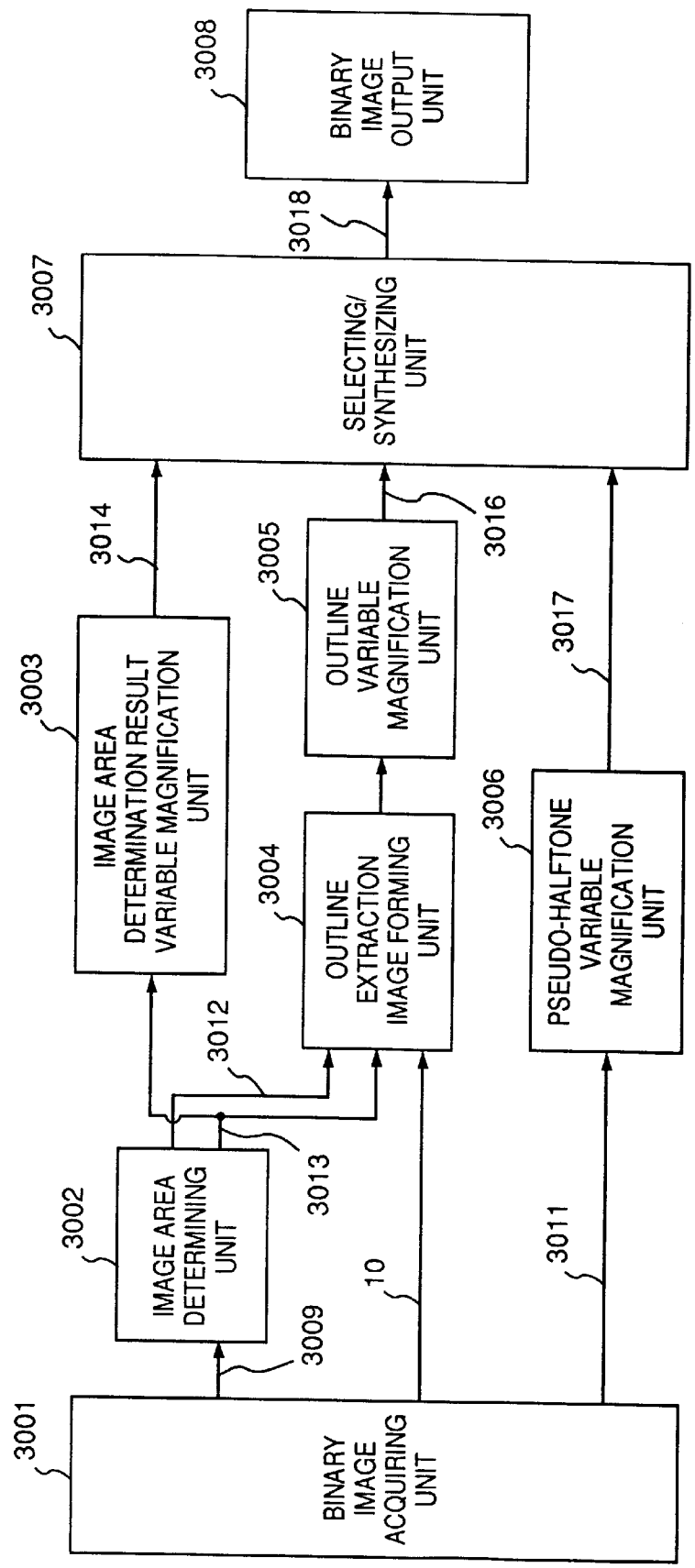
FIG. 35 is a block diagram showing the arrangement of an image processing apparatus according to the eleventh embodiment of the present invention.

FIG. 35 is a block diagram showing the arrangement of an image processing apparatus according to the eleventh embodiment of the present invention.

Referring to FIG. 35, reference numeral 3001 denotes a binary image acquiring unit for acquiring a digital binary image to be subjected to variable magnification processing, and outputting a binary image according to the raster scanning scheme; 3002, an image area determining unit for determining an image area including pseudo-halftone portions or an image area including other components (to be referred to as character/line draw components hereinafter) with respect to each pixel of the binary image data (signal) output from the binary image acquiring unit 3001 according to the raster scanning scheme; 3003, an image area determination result variable magnification unit for variably magnifying area information output from the image area determining unit 3002; 3004, an outline extraction image forming unit for forming binary image information consisting of a character/line draw component and black pixels adjacent thereto of the binary image data, output from the binary image acquiring unit 3001 according to the raster scanning scheme, in accordance with the image area determined by the image area determining unit 3002; and 3005, an outline variable magnification unit for receiving the binary image data output from the outline extraction image forming unit 3004 according to the raster scanning scheme, and extracting outline vectors from the input image information. In addition, smoothing and variable magnification processing of the image in the form of the extracted outline vector data are performed, and a binary image expressed by the smoothed/magnified outline data is reproduced as binary image data according to the raster scanning scheme from the outline data, thereby obtaining a magnified image.

Reference numeral 3006 denotes a pseudo-halftone variable magnification unit for receiving the binary image data from the binary image acquiring unit 3001 according to the raster scanning scheme, and variably magnifying the data by a scheme different from that used by the outline variable magnification unit 3005; 3007, a selecting/synthesizing unit for receiving an output 3016 from the outline variable magnification unit 3005 and an output 3017 from the pseudo-halftone variable magnification unit 3006, and selecting one of the outputs 3016 and 3017 in accordance with an image area determination result 3014 from the image area determination result variable magnification unit 3003, thereby obtaining a magnified synthesized image; and 3008, a binary image output unit for displaying the magnified image obtained by the selecting/synthesizing unit 3007, producing a hard copy of the data, or outputting the data to a communication line.

The arrangements and operations of the respective units will be sequentially described below.

The binary image acquiring unit 3001 is a binary image output unit or the like for reading an image by, e.g., an image reader, and binarizing and outputting the read image according to the raster scanning scheme. The binary image acquiring unit 3001 may be an apparatus for loading data from a storage medium in which a binary image is stored, or an apparatus for converting an image photographed by a still camera into a binary image.

Figure 36:
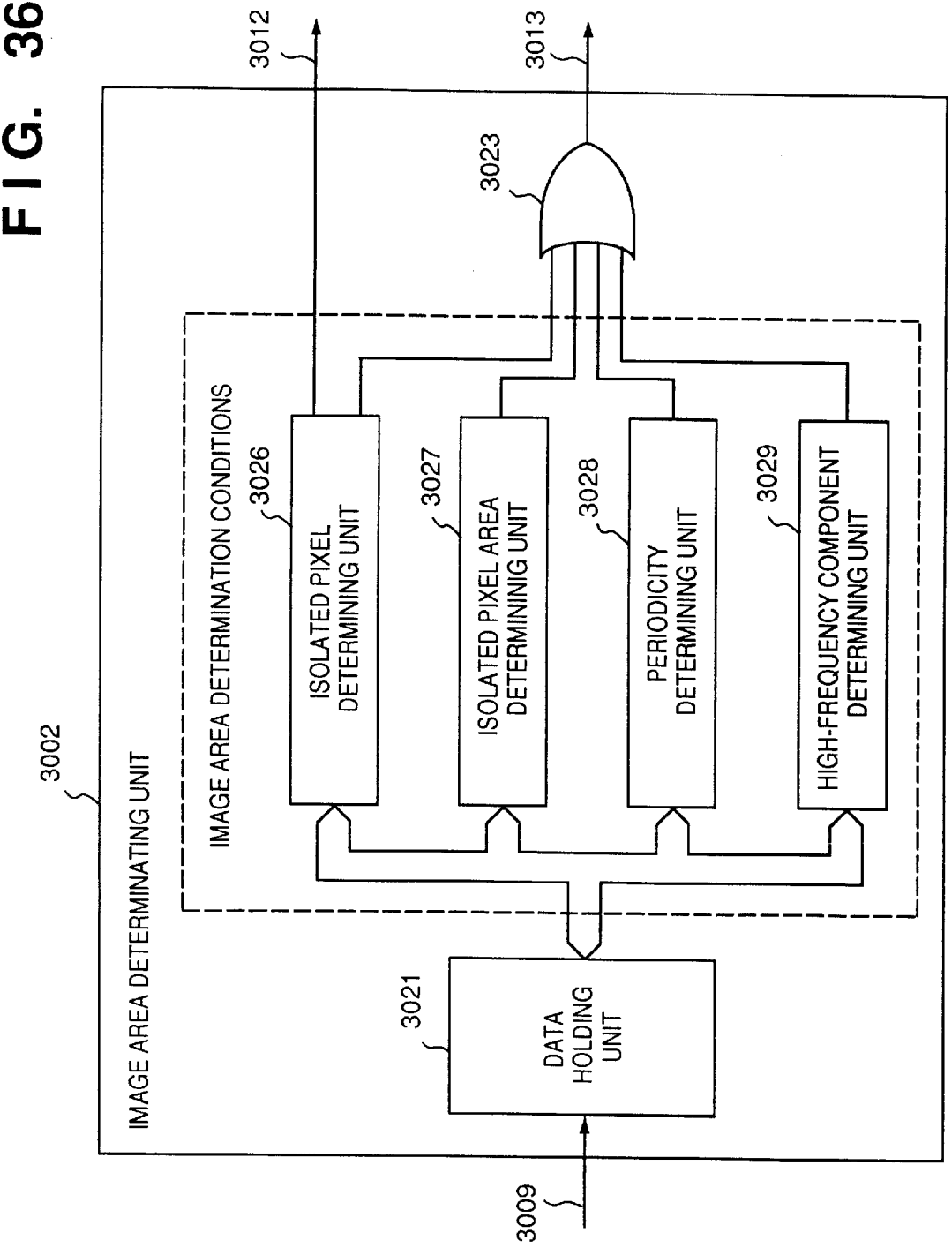
FIG. 36 is a block diagram showing the arrangement of an image area determining unit in the eleventh embodiment.

FIG. 36 shows an arrangement of the image area determining unit 3002.

Referring to FIG. 36, reference numeral 3021 denotes a data holding unit for sequentially updating and holding each pixel value in a small area required for image area determination processing. The data holding unit 3021 holds a data group 324 consisting of a maximum of 8×8=64 pixels around a target pixel 321, as shown in, e.g., FIG. 5, with respect to digital image data input according to the raster scanning scheme. In synchronism with updating of the target pixel position (sequentially moved according to the raster scanning scheme), the data holding unit 3021 updates the contents of the data held to data of a corresponding area.

The arrangement of the data holding unit 3021 is the same as that shown in FIG. 7, and hence a description thereof will be omitted.

Referring back to FIG. 2, reference numeral 3022 denotes an image area determination condition unit for determining, on the basis of the data of a pixel group constituting a small area and including a target pixel, which data is output from the data holding unit 3021, whether the target pixel in the small area is a pixel in a pseudo-halftone area. The image area determination condition unit 3022 is constituted by four types of determining units, i.e., an isolated pixel determining unit 3026, an isolated pixel area determining unit 3027, a periodicity determining unit 3028, and a high-frequency component determining unit 3029 for respectively determining whether different conditions are satisfied. If at least one of these conditions is satisfied, it is determined that the target pixel is a pixel of a pseudo-halftone component.

The isolated pixel determining unit 3026 determines whether a target pixel is an isolated pixel.

Figure 37:
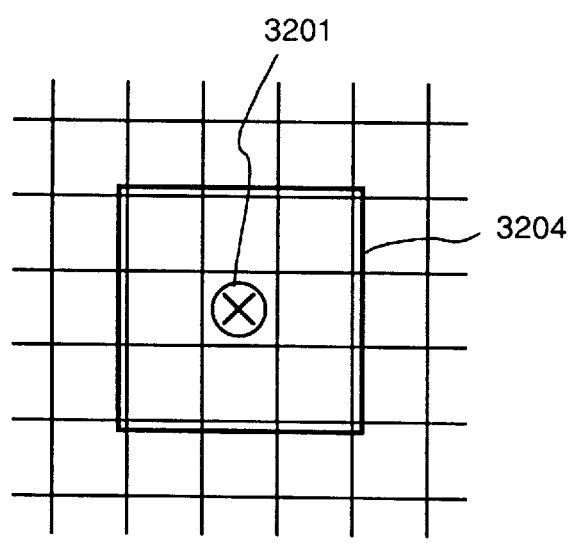
FIG. 37 is a view for explaining isolated central pixel determination processing in image area determination.

FIG. 37 shows a pixel matrix 3204 of a 3×3 pixel area having a width of three pixels in the main scanning direction and a width of three pixels in the subscanning direction, with a target pixel 3201 in the center of the matrix. When all the pixels in this matrix except for the target pixel 3201 have the same pixel value (all are white or black pixels), and the pixel value of the target pixel is different from that of the adjacent pixels, it is determined that the target pixel 3201 is an isolated pixel.

Assume that V(i,j) represents the pixel value corresponding to the ith row and the jth column, V(i,j)=1 indicates a black pixel, and V(i,j)=0 indicates a white pixel. In this case, a determination result R(i,j) obtained by the isolated pixel determining unit 3026 can be realized by a logic circuit for executing the following logical expression:

$$R(i, j) = (V(i, j) \cdot NOT(V(i-1, j-1)) \cdot NOT(V(i-1, j)) \cdot$$

$$NOT(V(i-1, j+1)) \cdot NOT(V(i, j-1)) \cdot NOT(V(i, j+1)) \cdot$$

$$NOT(V(i+1, j-1)) \cdot NOT(V(i+1, j)) \cdot NOT(V(i+1, j+1)))) +$$

$$(NOT(V(i, j)) \cdot V(i-1, j-1)) \cdot V(i-1, j) \cdot V(i-1, j+1) \cdot$$

$$V(i, j-1) \cdot V(i, j+1) \cdot V(i+1, j-1) \cdot V(i+1, j) \cdot V(i+1, j+1))$$

In this logical expression, "·" indicates logical AND; "+", logical OR; and "NOT(x)", inversion of a logical value x. The order of priority of operations is "NOT(x)" >"·" >"+". This embodiment is different from the first embodiment in that pixels located in oblique directions with respect to a target pixel are also taken into consideration.

The isolated pixel area determining unit 3027 determines whether a target pixel is located in an isolated pixel area. FIG. 3 shows a detailed example of the determining operation. Referring to FIG. 3, a pixel matrix 322 is constituted by 16 pixels in a 4×4 pixel area having a width of four pixels in the main scanning direction and a width of four pixels in the subscanning direction.

As shown in FIG. 4, with respect to each pixel in this pixel matrix 322, the isolated pixel area determining unit 3027 detects whether four pixels, i.e., upper, lower, left, and right pixels (a position (k,L−1) is an upper position; a position (k,L+1), a lower position; a position (k−1,L), a left position; and a position (k+1,L), a right position) are pixels having the same pixel value (i.e., white or black pixels), and also differ in pixel value from a pixel at a position (k,L). If each pixel in a 4×4 pixel area is set at the position (k,L), 16 results are obtained. If two or more results of these results satisfy the above condition, it is determined that the target pixel 321 in the 4×4 pixel area 322 is in an isolated pixel area. That is, if the pixel 321 is a target pixel, it is checked whether two or more isolated pixels (i.e., an isolated pixel is a black or white pixel isolated from other pixels in the vertical and horizontal directions) are present in the 16 pixels in the adjacent pixel area 322. If two or more isolated pixels are present, it is determined that the target pixel 322 is located within an isolated pixel area.

The periodicity determining unit 3028 determines whether pixel values become the same at a predetermined pixel period. The arrangement of the periodicity determining unit 3028 is the same as that of the periodicity determining unit 42 in the first embodiment.

The high-frequency component determining unit 3029 determines whether a change in density occurs between adjacent pixels. The arrangement of the high-frequency component determining unit 3029 is also the same as that of the high-frequency component determining unit 43 in the first embodiment, and hence a description thereof will be omitted.

Referring to FIG. 36, reference numeral 3023 denotes a four-input OR circuit for receiving outputs from the isolated pixel determining unit 3026, the isolated pixel area determining unit 3027, the periodicity determining unit 3028, and the high-frequency component determining unit 3029, and outputting the logical OR of the outputs. This logical OR is an output from the image area determining unit 3002. That is, the OR circuit 3023 outputs a signal indicating that a target pixel is in a pseudo-halftone area when it is determined that the target pixel is located in at least one of the following areas: an isolated pixel area, a periodic pixel area, and a high-frequency component area.

The above description is associated with the arrangement and processing contents of the image area determining unit 3002 in FIG. 36. Note that the various threshold values used for determination processing in the image area determining unit 3002 are not limited to the above values, but are set in accordance with, e.g., the resolution of an input image and other states.

The image area determination result variable magnification unit 3003 receives an output 3013 (can be regarded as a binary image of the raster scanning scheme which has a determination result as a pixel value) from the image area determining unit 3002, magnifies the output at a desired magnification (equal to a magnification used by the outline variable magnification unit 3005), and outputs it. The image area determination result variable magnification unit 3003 performs variable magnification processing of repeatedly outputting the same input pixel value to enlarge an image or thinning the same input pixel value to reduce an image, the number of times corresponding to a desired magnification.

The outline extraction image forming unit 3004 reduces the number of input pixels to the outline variable magnification unit 3005 by using a method which rarely influences a variable magnification result obtained by the outline variable magnification unit 3005. The outline extraction image forming unit 3004 receives an output 3012 from the isolated pixel determining unit 3026 of the image area determining unit 3002, an output 3013 from the image area determining unit 3002, and an output 3010 from the binary image acquiring unit 3001, and outputs binary image data 3015 as an input to the outline variable magnification unit 3005. That is, the outline extraction image forming unit 3004 outputs only the pixels of a character/line draw component and black pixels adjacent thereto of an input image.

Figure 38:
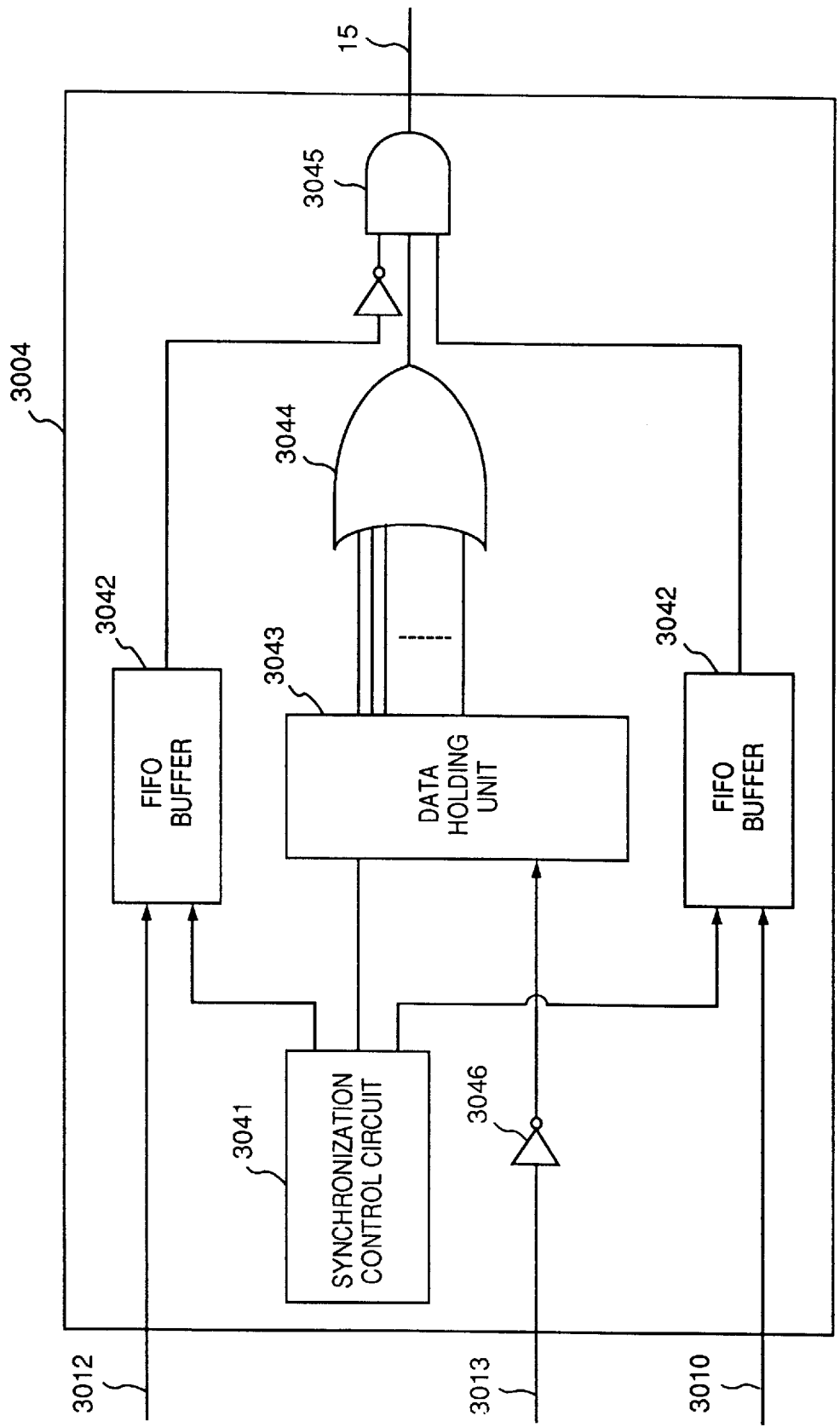
FIG. 38 is a block diagram showing the arrangement of an outline extraction image forming unit in the eleventh embodiment.

FIG. 38 shows an arrangement of the outline extraction image forming unit 3004.

Figure 39:
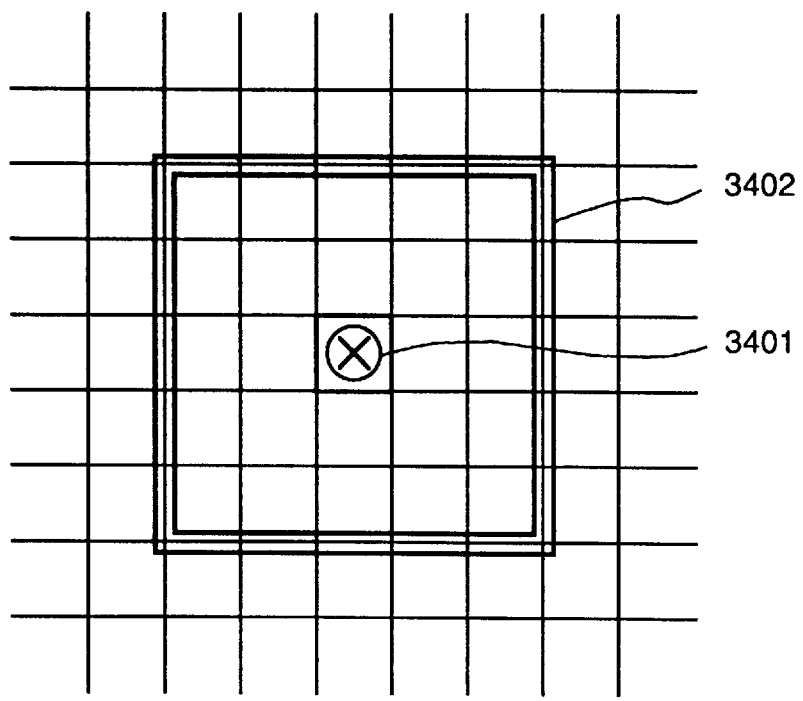
FIG. 39 is a view for explaining the contents of processing performed by a data holding unit of the outline extraction image forming unit.

The outline extraction image forming unit 3004 outputs a signal indicating a black pixel only when a target pixel satisfies the following three conditions. The first condition is that the target pixel should not be an isolated point. Information about this condition can be obtained by inverting the output 3012 from the isolated pixel determining unit 3026 of the image area determining unit 3002. The second condition is that at least one of 25 pixels in a 5×5 pixel area 3402 having a width of five pixels in the main scanning direction and a width of five pixels in the subscanning direction, with a target pixel 3401 in the center of the area, as shown in FIG. 39, should be a character/line draw component. A circuit for this condition can be constituted by a data holding unit 3043 equivalent to the one shown in FIG. 7, and an OR circuit 3044 for receiving a signal corresponding to the above 25 pixels. The data holding unit 3043 receives a result obtained by inverting an output from the image area determining unit 3002 by unit of an inverter 3046, and outputs output inversion results, associated with a total of 25 pixels in the 5×5 pixel area, from the image area determining unit 3002. The third condition is that the target pixel of an input image should be a black pixel. Information about this condition can be obtained by using the output 3010 from the image area determining unit 3002. Signals indicating the above three conditions are input to an AND circuit 3045 in synchronism with each other via FIFO buffers 3042 and 3047 and a synchronization control circuit 3041. An output from the AND circuit 3045 is used as the output 3015 from the outline extraction image forming unit 3004. In this case, the second condition is described with reference to the 5×5 pixel area with a target pixel in the center of the area. However, the size of the pixel area may be changed to, e.g., a size of 7×7 pixels.

The outline variable magnification unit 3005 will be described next.

Figure 40:
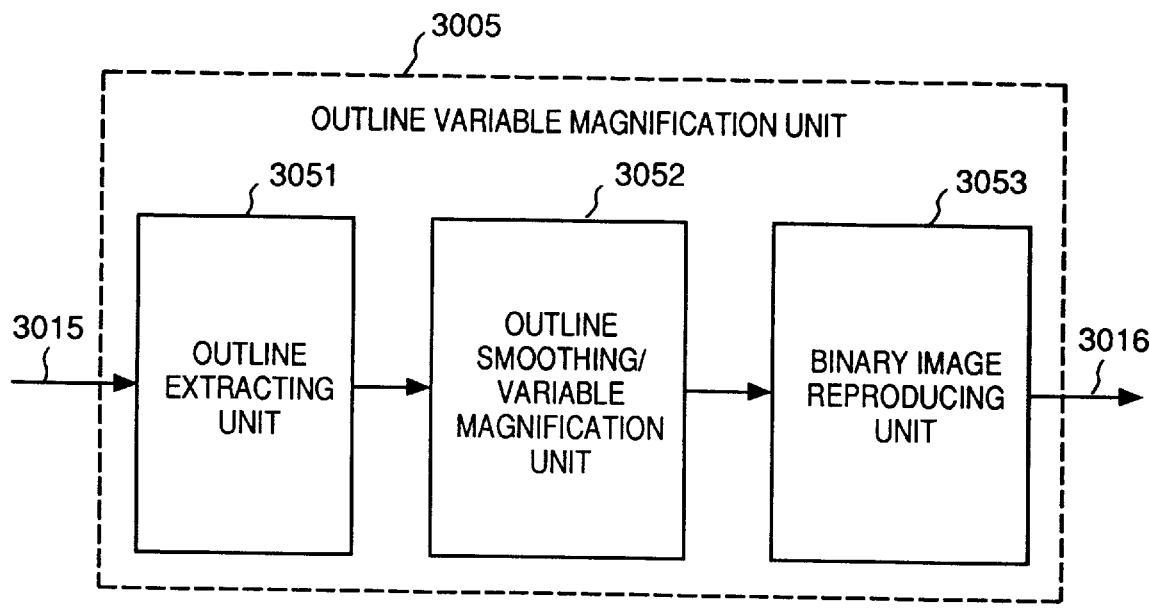
FIG. 40 is a block diagram showing the arrangement of an outline variable magnification unit in the eleventh embodiment.

As shown in FIG. 40, the outline variable magnification unit 3005 comprises an outline extracting unit 3051, an outline smoothing/variable magnification unit 3052, and a binary image reproducing unit 3053. More specifically, in the outline variable magnification unit 3005, upon reception of an output from the outline extraction image forming unit 3004, the outline extracting unit 3051 extracts outline vectors (coarse contour vectors) from this output. The outline smoothing/variable magnification unit 3052 then forms outline vectors which are smoothly magnified at a desired (arbitrary) magnification in the state of the extracted outline vector expression. The binary image reproducing unit 3053 reproduces a binary image from the smoothly magnified outline vectors. With this operation, a high-quality image magnified at the desired magnification is formed.

The scanning scheme for binary data of raster scanning scheme output from the outline extraction image forming unit 3004 in the eleventh embodiment is the same as that of binary image data output from the binary image acquiring unit 11 in the first embodiment. In the first embodiment, however, the binary image acquiring unit outputs an original image without any modification, whereas in the eleventh embodiment, the outline extraction image forming unit 3004 does not output an image in a halftone image area. Subsequently, outline vector data extraction and smoothing processing are performed by the outline variable magnification unit 3005. The contents of such processing are the same as those described with reference to FIGS. 15 to 24 and 28 to 31.

The pseudo-halftone variable magnification unit 3006 in FIG. 35 receives an output 3011 from the binary image acquiring unit 3001, and outputs an image which is magnified at a desired magnification (equal to a magnification used by the outline variable magnification unit) by using a variable magnification method different from the outline variable magnification method. The pseudo-halftone variable magnification unit 3006 is identical to the pseudo-halftone image variable magnification unit 14 in the first embodiment (see FIG. 8).

The output 3017 from a pseudo-halftone processing unit 80 is used as an output from the pseudo-halftone variable magnification unit 3006.

Note that a coefficient matrix in an inverse quantization processing unit 60 of the pseudo-halftone variable magnification unit 3006 is not limited to a size of 4×4 pixels described with reference to FIG. 9. For example, the coefficient matrix may have a size of 8×8 or 5×5 pixels, as shown in FIG. 41, or may have a general size of m×n (m and n are integers) pixels such as a size of 6×4 pixels. In addition, all the coefficients need not be "1", but may have different values. For example, as shown in FIG. 42, coefficients corresponding to pixels closer to a target pixel may have larger values. If the size of a coefficient matrix is set in accordance with the number of gradation levels of the pseudo-halftone expression of an original image, reproduction of a more faithful multivalue image can be expected. However, such an operation leads to an increase in cost.

Therefore, it is preferable that the size of a coefficient matrix be properly selected.

In the selecting/synthesizing unit 3007 in FIG. 35, the outputs 3016 and 3017 from the outline variable magnification unit 3005 and the pseudo-halftone variable magnification unit 3006 are selected and synthesized on the basis of the output 3014 from the image area determination result variable magnification unit 3003.

Figure 43:
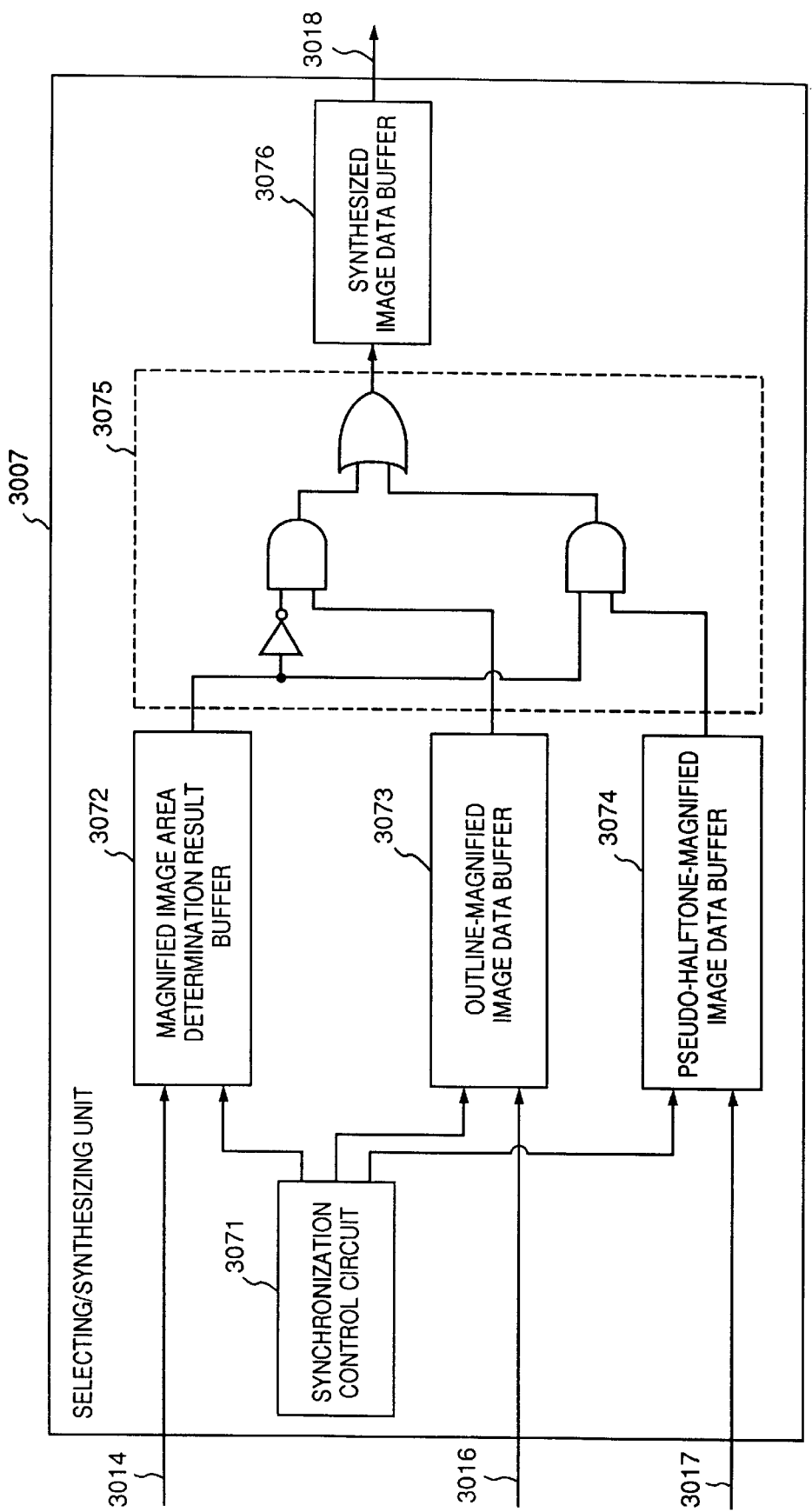
FIG. 43 is a block diagram showing the arrangement of a selecting/synthesizing unit in the eleventh embodiment.

FIG. 43 is a block diagram showing the arrangement of the selecting/synthesizing unit 3007.

Reference numeral 3072 denotes a magnified image area determination result buffer for holding a magnified image area determination result (binary image data having a determination result as a pixel value) obtained from the image area determination result variable magnification unit 3003; 3073, an outline-magnified image data buffer for holding magnified binary image data obtained from the outline variable magnification unit 3005; 3074, a pseudo-halftone-magnified image data buffer for holding magnified binary image data obtained from the pseudo-halftone variable magnification unit 3006; 3076, a synthesized image data buffer for temporarily holding image data obtained by selecting/synthesizing image data from the image data buffers 3073 and 3074; and 3071, an synchronization control circuit for performing synchronization control to read out the magnified image area determination result in the buffer 3072, the outline-magnified image data in the buffer 3073, and the pseudo-halftone-magnified image data in the buffer 3074 according to the raster scanning scheme. The magnified image data read out from the buffers 3073 and 3074 are selected/synthesized for each pair of corresponding pixels on the basis of the magnified image area determination result read out according to the raster scanning scheme. The synthesized image is temporarily stored in the synthesized image data buffer 3076. Selection/synthesis of magnified image data is performed by a logic circuit 3075. More specifically, when the magnified image area determination result is "1" (indicating a pseudo-halftone component), pseudo-halftone-magnified image data is selected. When the magnified image area determination result is "0" (indicating a character/line draw component), outline-magnified image data is selected.

The binary image output unit 3008 in FIG. 35 is constituted by a hard copy unit such as a laser beam printer or a thermal printer, a display unit such as a liquid crystal display or a CRT, or the like, which receives an magnified image stored in the synthesized image data buffer 3076. The binary image output unit 3008 serves to display binary image data or record/output binary image data on a paper sheet as a hard copy.

Twelfth Embodiment

The binary image acquiring unit 3001 in the eleventh embodiment need not be an image reader but may be a binary image receiving unit, such as the receiving unit of a facsimile apparatus, which receives a binary image from an external unit via a communication unit. The binary image output unit 3008 in the eleventh embodiment need not be a hard copy unit but may be a binary image transmitting unit, such as the transmitting unit of a facsimile apparatus, which outputs a binary image (as coded data) to an external unit via a communication unit. The binary image output unit 3008 may be an interface unit for receiving a binary image from an external storage unit such as a magnetic disc.

Thirteenth Embodiment

Figure 44:
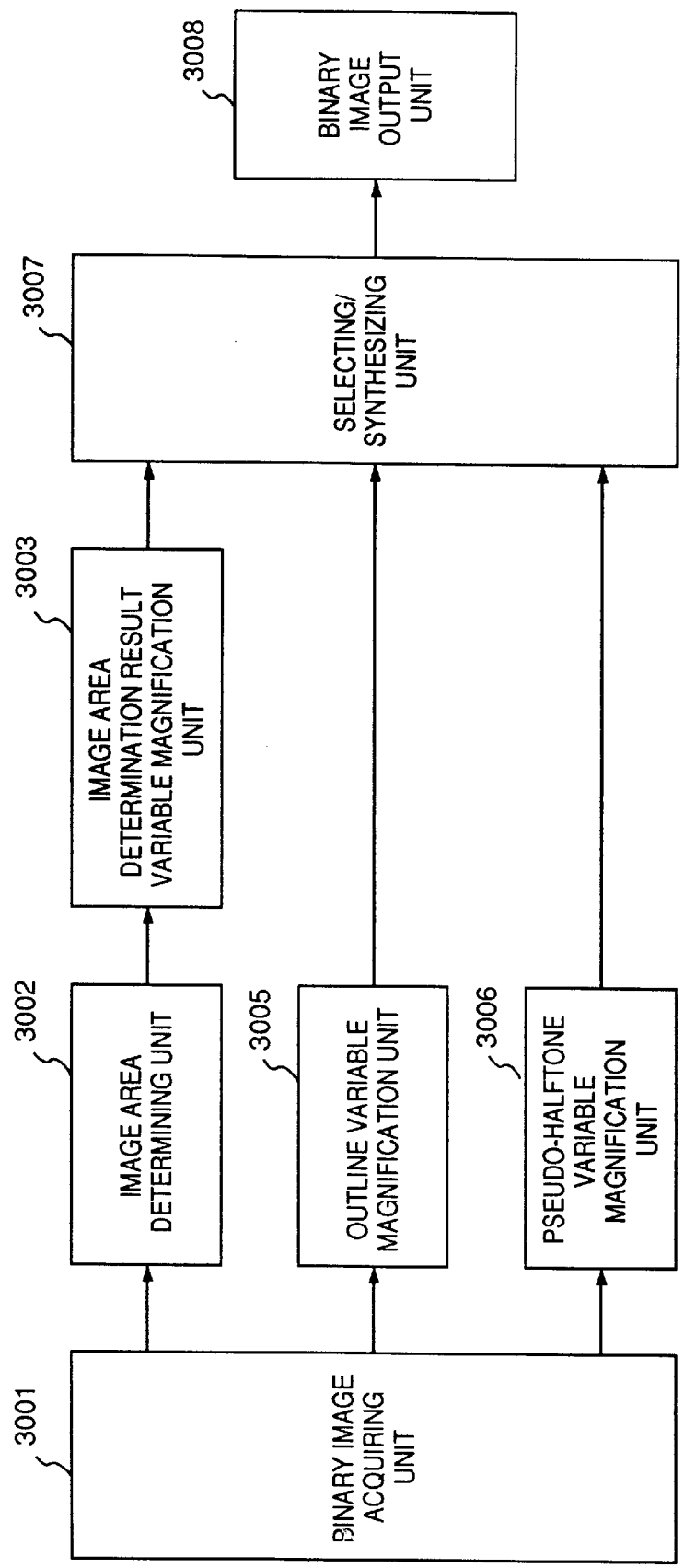
FIG. 44 is a block diagram showing the arrangement of an image processing apparatus according to the thirteenth embodiment of the present invention.

In addition to the arrangement of the eleventh embodiment, the present invention can be realized by an apparatus having an arrangement like the one shown in FIG. 44. That is, an output from the binary image acquiring unit 3001 may be directly input to the outline variable magnification unit 3005, instead of an output from the outline extraction image forming unit 3004, in the eleventh embodiment. In this case, the memory capacity required for the outline variable magnification unit 3005 and the processing time may be increased as compared with the eleventh embodiment. However, the outline extraction image forming unit 3004 is not required. Therefore, the apparatus arrangement except for the outline variable magnification unit 3005 can be simplified, and the processing speed can be increased. This arrangement is especially effective for an apparatus designed to treat an image having few pseudo-halftone components.

Fourteenth Embodiment

Figure 45:
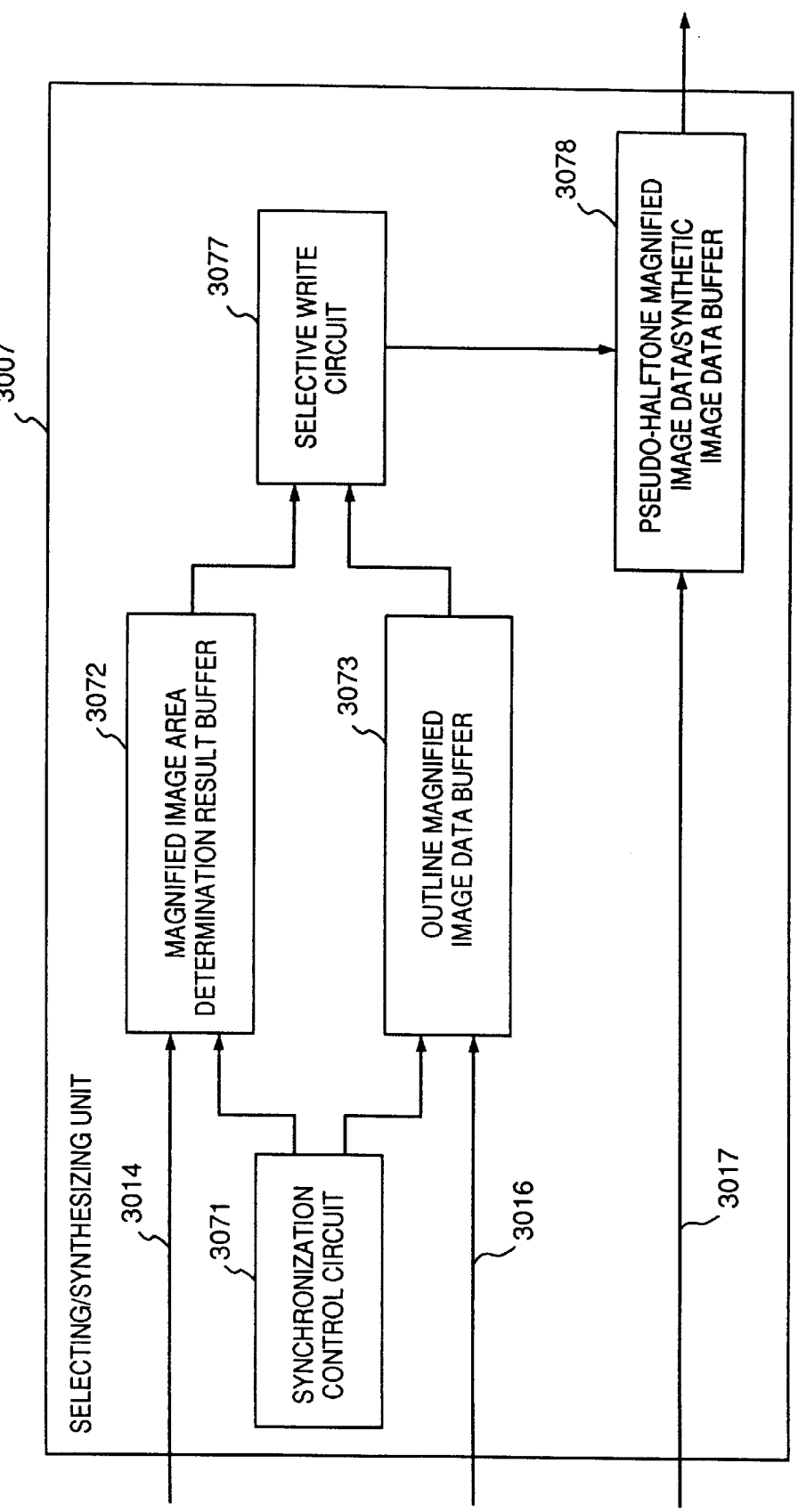
FIG. 45 is a block diagram showing the arrangement of a selecting/synthesizing unit in the fourteenth embodiment of the present invention.

The selecting/synthesizing unit 3007 in the eleventh embodiment shown in FIG. 43 can also be realized by the arrangement shown in FIG. 45.

That is, the pseudo-halftone-magnified image data buffer 3074 and the synthesized image data buffer 3076 in FIG. 43 are integrated into one buffer to decrease the number of buffers.

Referring to FIG. 45, a selective write circuit 3077 writes an output from an outline-magnified image data buffer 3073 in a pseudo-halftone-magnified image data/synthesized image data buffer 3078 according to the raster scanning scheme only when it is determined that a target pixel is a character/line draw component, on the basis of an image area determination result output from a magnified image area determination result buffer 3072. In this case, although the arrangement of the circuit (selective write circuit 3077) for performing a selecting/synthesizing operation is complicated, the number of buffers can be decreased by one.

In each embodiment described above, variable magnification processing performed by the pseudo-halftone variable magnification unit 3006 may be performed by using the mean density retention method (MD method) described in NIKKEI ELECTRONICS, 1992. 5. 25 Issue (No. 555), pp. 207–210.

The pseudo-halftone variable magnification unit 3006 may directly magnify an input image as binary image data by SPC processing, instead of temporarily converting the input image into multivalue image by inverse quantization, and may output binary data obtained as a result of the SPC processing.

In this case, the arrangement of the corresponding portion can be simplified so that fairly good image quality can be realized at a low cost.

The present invention may be applied to a system constituted by a plurality of devices or an apparatus constituted by one device. As is apparent, the present invention can be applied to a case wherein the abovedescribed effects can be obtained by supplying programs to a system or an apparatus.

It is, therefore, apparent that the present invention can be constituted by a scanner unit for reading an original image, a host computer for processing the read image data, and a printer for forming a corresponding output image. In addition, the present invention can be applied to a facsimile apparatus for receiving an image, performing processing according to this embodiment with respect to the input image, and outputting the processed image.

Variable magnification processing in each embodiment described above is performed for processing (resolution conversion processing) of equalizing the sizes of images having different resolutions, as in the case wherein an image input by the binary image acquiring unit 3001 is different in resolution from an output from the binary image output unit 3008, in addition to enlargement and reduction of images.

As has been described above, according to this embodiment, when an image is to be magnified by performing proper variable magnification processing with respect to a character/line draw component and a pseudo-halftone component, respectively, variable magnification processing suitable for the character/line draw component and variable magnification processing suitable for the pseudo-halftone component are performed with respect to the input image so as to form two images. Thereafter, the two images are selected/synthesized by image area determination. With this processing, a magnified image having good image quality can be obtained even if a determination error occurs with respect to the character/line draw component and the pseudo-halftone component.

In addition, according to this embodiment, since black pixels to be input for variable magnification suitable for a character/line draw component are limited to a black pixel determined as a character/line draw component and black pixels adjacent thereto, variable magnification processing can be performed without increasing the required memory capacity and the processing time.

As has been described above, according to the present invention, even if a determination error occurs with respect to a character/line draw component and a pseudo-halftone component, a magnified image having good image quality can be obtained.

In addition, according to the present invention, after two images are formed by performing variable magnification processing suitable for a character/line draw component and variable magnification processing suitable for a pseudo-halftone component with respect to an input image, the two images are selected/synthesized by image area determination, thereby obtaining a magnified image having good image quality.

Furthermore, according to the present invention, black pixels to be input for variable magnification suitable for a character/line draw component are limited to a black pixel determined as a character/line draw component and black pixels adjacent thereto. Therefore, variable magnification processing can be performed while an increase in required memory capacity and processing time is suppressed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    image area separating means for separating a binary image into a character/line draw area and a pseudo-halftone area by determining whether each pixel of the binary image belongs to the character/line draw area or the pseudo-halftone area;
    first variable magnification means for variably magnifying an image in the character/line draw area, separated by said image area separating means, according to a scheme corresponding the character/line draw area;
    second variable magnification means for variably magnifying an image in the pseudo-halftone area, separated by said image area separating means, according to a scheme corresponding to the pseudo-halftone area; and
    synthesizing means for synthesizing the images variably magnified by said first and second variable magnification means to form a synthesized binary image.

2. The apparatus according to claim 1, wherein said first and second variable magnification means have variable magnifications set therein.

3. The apparatus according to claim 1, wherein said image area separating means includes
    isolated area determining means for determining whether a target pixel is in an isolated pixel area,
    periodicity determining means for determining whether a halftone pixel is present in a target pixel and the same binary density appears at a predetermined pixel period, and
    high-frequency component determining means for determining whether a change in density frequently occurs between adjacent pixels, and
    determines, on the basis of determination results obtained by said isolated area determining means, said periodicity determining means, and said high-frequency component determining means, whether a target pixel is in a character/line draw area or a pseudo-halftone area, and separates an image area on the basis of the determination result.

4. The apparatus according to claim 1, wherein said first variable magnification means includes
    contour vector extracting means for extracting contour vector data along an edge of a provided binary image,
    smoothing means for smoothing the extracted contour vector data, and
    means for performing variable magnification processing of coordinate data constituting the smoothed vector data, drawing contours on the basis of the coordinate data after the variable magnification processing, and filling an area surrounded by the contours with dots.

5. The apparatus according to claim 1, wherein said second variable magnification means includes
    multivalue conversion means for converting a target binary pixel of a provided binary image into multivalue pixel data on the basis of the target pixel and a binary pixel group adjacent to the target pixel,
    variable magnification means for variably magnifying the multivalue pixel data obtained by said multivalue conversion means, and
    binarization means for binarizing the variably magnified multivalue pixel data with a pseudo-gradation expression again.

6. The apparatus according to claim 1, further comprising output means for outputting the binary image synthesized by said synthesizing means.

7. The apparatus according to claim 6, wherein said output means is a printer.

8. The apparatus according to claim 6, wherein said output means is communication means for coding the binary image synthesized by said synthesizing means and outputting the coded image via a line.

9. An image processing method comprising:
    the image area separating step of separating a binary image into a character/line draw area and a pseudo-halftone area by determining whether each pixel of the binary image belongs to the character/line draw area or the pseudo-halftone area;
    the first variable magnification step of variably magnifying an image in the character/line draw area, separated in the image area separating step, according to a scheme corresponding the character/line draw area;

the second variable magnification step of variably magnifying an image in the pseudo-halftone area, separated in the image area separating step, according to a scheme corresponding to the pseudo-halftone area; and the synthesizing step of synthesizing the images variably magnified in the first and second variable magnification steps to form a synthesized binary image.

10. The method according to claim 9, wherein the image area separating step includes the isolated area determining step of determining whether a target pixel is in an isolated pixel area, the periodicity determining step of determining whether a halftone pixel is present in a target pixel and the same binary density appears at a predetermined pixel period, and the high-frequency component determining step of determining whether a change in density frequently occurs between adjacent pixels, and determines, on the basis of determination results obtained in the isolated area determining step, the periodicity determining step, and the high-frequency component determining step, whether a target pixel is in a character/line draw area or a pseudo-halftone area, and separates an image area on the basis of the determination result.

11. The method according to claim 9, wherein the first variable magnification step includes the contour vector extracting step of extracting contour vector data along an edge of a provided binary image, the smoothing step of smoothing the extracted contour vector data, and the step of performing variable magnification processing of coordinate data constituting the smoothed vector data, drawing contours on the basis of the coordinate data after the variable magnification processing, and filling an area surrounded by the contours with dots.

12. The method according to claim 9, wherein the second variable magnification step includes the multivalue conversion step of converting a target binary pixel of a provided binary image into multivalue pixel data on the basis of the target pixel and a binary pixel group adjacent to the target pixel, the variable magnification step of variably magnifying the multivalue pixel data obtained in the multivalue conversion step, and the binarization step of binarizing the variably magnified multivalue pixel data with a pseudo-gradation expression again.

13. The method according to claim 9, further comprising the output step of outputting the binary image synthesized in the synthesizing step.

14. The method according to claim 13, wherein the output step includes the step of outputting a synthesized image to a printer.

15. The method according to claim 13, wherein the output step includes the step of coding the binary image synthesized in the synthesizing step to output the coded image to predetermined communication means via a line.

16. An image processing apparatus which processes binary image data inputted by a predetermined input means, comprising:

image area determining means for determining whether each pixel of an inputted binary image belongs to a character/line draw area or a pseudo-halftone area;

first variable magnification means for variably magnifying an area determined as a character/line draw area by said image area determining means;

second variable magnification means for variably magnifying the inputted binary image;

third variable magnification means for variably magnifying the determination result obtained by said image area determining means; and selecting/synthesizing means for selecting and synthesizing images respectively magnified by said first and second variable magnification means in accordance with a determination result variably magnified by said third variable magnification means.

17. The apparatus according to claim 16, further comprising limiting means for limiting black pixels of an image determined as a character/line draw area by said image area determining means to black pixels including a character/line draw component and pixels adjacent thereto.

18. The apparatus according to claim 16, wherein said first and second variable magnification means perform variable magnification processing at an arbitrary magnification.

19. The apparatus according to claim 16, wherein said image area determining means includes isolated pixel determining means for determining whether a target pixel is an isolated pixel, isolated pixel area determining means for determining whether the target pixel is in an isolated pixel area, periodicity determining means for determining whether pixel values of pixels adjacent to the target pixel become the same at a predetermined pixel period, and high-frequency determining means for determining whether a change in density frequency occurs between adjacent pixels, and determines, on the basis of determination results respectively obtained by said isolated pixel area determining means, said isolated pixel area determining means, said periodicity determining means, and said high-frequency component determining means, whether the target pixel is in a character/line draw area or a pseudo-halftone area.

20. The apparatus according to claim 16, wherein said first variable magnification means includes contour vector extracting means for extracting contour vector data along an edge of a provided binary image, smoothing means for smoothing the extracted contour vector data, and means for performing variable magnification processing with respect to coordinate data constituting the smoothed vector data, drawing contours on the basis of the coordinate data after the variable magnification processing, and filling an area surrounded by the contours with dots.

21. The apparatus according to claim 20, wherein said smoothing means changes a degree of smoothing in accordance with a length of each contour vector extracted by said contour vector extracting means.

22. The apparatus according to claim 16, wherein said second variable magnification means includes multivalue conversion means for converting a target binary pixel of a provided binary image into multivalue pixel data on the basis of the target pixel and a binary pixel group adjacent to the target pixel, and binarization means for binarizing the multivalue pixel data, obtained by said multivalue conversion means, with a pseudo-halftone expression again.

23. The apparatus according to claim 16, wherein said selecting/synthesizing means selects and synthesizes each pair of pixels respectively magnified by said first and second variable magnification means by using an output from said image area determining means.

24. The apparatus according to claim 16, wherein said selecting/synthesizing means comprises third variable magnification means for magnifying an output from said image area determining means at the same magnification as that set in said first and second variable magnification means.

25. The apparatus according to claim 16, further comprising output means for outputting a binary image synthesized by said selecting/synthesizing means.

26. The apparatus according to claim 25, wherein said output means is communication means for coding the binary image synthesized by said selecting/synthesizing means, and outputting the coded image via a line.

27. An image processing method for processing input binary image data comprising:

the image area determining step of determining whether each pixel of an inputted binary image belongs to a character/line draw area or a pseudo-halftone area;

the first variable magnification step of variably magnifying an area determined as a character/line draw area;

the second variable magnification step of variably magnifying the inputted binary image;

the third variable magnification step for variably magnifying the determination result obtained in said image area determining step; and the step of selecting and synthesizing each pair of pixels of images respectively magnified in the first and second variable magnification steps by using a result variably magnified in said third variable magnification step.

28. The method according to claim 27, wherein the black pixels, of the image, which are to be variably magnified in the first variable magnification step are limited to a black pixel determined as a pixel in a character/line draw area by using the result in the image area determining step, and black pixels adjacent the black pixel.

29. The method according to claim 27, wherein a magnification in each of the first and second variable magnification steps can be set to be an arbitrary value.

30. The method according to claim 27, wherein the image area determining step includes the isolated central pixel determining step of determining whether a target pixel is an isolated pixel, the isolated pixel area determining step of determining whether the target pixel is in an isolated pixel area, the periodicity determining step of determining whether pixel values become the same at a predetermined pixel period, and high-frequency component determining step of determining whether a change in density frequency occurs between adjacent pixels, and determines, on the basis of determination results respectively obtained in the isolated central pixel determining step, the isolated pixel area determining step, the periodicity determining step, and the high-frequency component determining step, whether the target pixel is in a character/line draw area or a pseudo-halftone area.

31. The method according to claim 27, wherein the first variable magnification step includes the contour vector extracting step of extracting contour vector data along an edge of a provided binary image, the smoothing step of smoothing the extracted contour vector data, and the step of performing variable magnification processing with respect to coordinate data constituting the smoothed vector data, drawing contours on the basis of the coordinate data after the variable magnification processing, and filling an area surrounded by the contours with dots.

32. The method according to claim 27, wherein the smoothing step includes changing a degree of smoothing in accordance with a length of each contour vector extracted in the contour vector extracting step.

33. The method according to claim 27, wherein the second variable magnification step includes the multivalue conversion step of converting a target binary pixel of a provided binary image into multivalue pixel data on the basis of the target pixel and a binary pixel group adjacent to the target pixel, and binarization step of binarizing the multivalue pixel data, obtained in the multivalue conversion step, with a pseudo-halftone expression again.

34. The method according to claim 27, wherein the selecting/synthesizing step includes selecting and synthesizing each pair of pixels respectively magnified in the first and second variable magnification steps by using a result obtained in the image area determining step.

35. The method according to claim 27, wherein the selecting/synthesizing step comprises the third variable magnification step of magnifying a result obtained in the image area determining step at the same magnification as that set in the first and second variable magnification steps.

* * * * *

UNITED STATES PATENT AND TRADEMARK OFFICE
CERTIFICATE OF CORRECTION

PATENT NO. : 5,832,141

DATED : November 3, 1998

INVENTOR(S): YOSHIHIRO ISHIDA ET AL.                    Page 1 of 3

It is certified that error appears in the above-identified patent and that said Letters Patent is hereby corrected as shown below:

[54] TITLE

"PSEUDOHALF TONE" should read --A PSEUDO-HALFTONE

[56] REFERENCES CITED

"A1106671  4/1989 Japan" should read
     --1-106671  4/1989 Japan--.
   "4157578  5/1992 Japan" should read
     --4-157578  5/1992 Japan--.
   "5174140  7/1993 Japan" should read
     --5-174140  7/1993 Japan--.

[57] ABSTRACT

Line 17, "these" should read --the--.

SHEET 32

Figure 36, "DETERMINATING" should read --DETERMINING--.

COLUMN 1

Line 3, "PSEUDOHALF TONE" should read
    --A PSEUDO-HALFTONE--.

UNITED STATES PATENT AND TRADEMARK OFFICE
CERTIFICATE OF CORRECTION

PATENT NO. : 5,832,141

DATED : November 3, 1998

INVENTOR(S) : YOSHIHIRO ISHIDA ET AL.

It is certified that error appears in the above-identified patent and that said Letters Patent is hereby corrected as shown below:

COLUMN 2

Line 47, "as its" should be deleted.
Line 58, "as its" should be deleted.

COLUMN 8

Line 42, "Referring" should read --Referring to--.

COLUMN 10

Line 22, "respect" should read --respect to--.

COLUMN 18

Line 49, "sprinter" should read --printer--.

COLUMN 19

Line 9, "discontinues" should read --discontinuous--.

COLUMN 23

Line 9, "not be" should read --not to be--.

COLUMN 26

Line 10, "NOT(V(i+1, j+1))))" should read
   --NOT(V(i+1, j+1)))--.

UNITED STATES PATENT AND TRADEMARK OFFICE
CERTIFICATE OF CORRECTION

PATENT NO.  : 5,832,141

DATED       : November 3, 1998

INVENTOR(S) : YOSHIHIRO ISHIDA ET AL.

It is certified that error appears in the above-identified patent and that said Letters Patent is hereby corrected as shown below:

COLUMN 29

Line 24, "an "should read --a--.
  Line 45, "an "should read --a--.

COLUMN 31

Line 63, "corresponding" should read --corresponding to--.

COLUMN 32

Line 67, "corresponding" should read --corresponding to--.

Signed and Sealed this

Fourth Day of January, 2000

Attest:

Attesting Officer

Acting Commissioner of Patents and Trademarks